(12) United States Patent
Nesler et al.

(10) Patent No.: US 11,536,476 B2
(45) Date of Patent: Dec. 27, 2022

(54) BUILDING SYSTEM WITH FLEXIBLE FACILITY OPERATION

(71) Applicant: Johnson Controls Tyco IP Holdings LLP, Auburn Hills, MI (US)

(72) Inventors: Clay G. Nesler, Washington, DC (US); Jonathan Douglas, Mequon, WI (US); Kirk H. Drees, Cedarburg, WI (US); Bernard P. Clement, Mequon, WI (US); Joseph Pustai, Jr., Cleveland Heights, OH (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 0 days.

(21) Appl. No.: 17/013,273

(22) Filed: Sep. 4, 2020

(65) Prior Publication Data

US 2021/0356153 A1    Nov. 18, 2021

Related U.S. Application Data

(60) Provisional application No. 63/050,465, filed on Jul. 10, 2020, provisional application No. 63/023,628, filed on May 12, 2020.

(51) Int. Cl.
*F24F 11/32* (2018.01)
*F24F 11/65* (2018.01)
(Continued)

(52) U.S. Cl.
CPC .............. *F24F 11/32* (2018.01); *F24F 3/16* (2013.01); *F24F 11/46* (2018.01); *F24F 11/52* (2018.01);
(Continued)

(58) Field of Classification Search
CPC ..... G08B 21/22; G08B 25/00; G08B 13/2451; G16H 50/80; G16H 40/67; G05B 15/02;
(Continued)

(56) References Cited

U.S. PATENT DOCUMENTS 6,148,306 A    11/2000   Seidl et al.
6,293,861 B1 *  9/2001   Berry ....................... F24F 11/30
                                                      454/255
(Continued)

FOREIGN PATENT DOCUMENTS

EP     1 770 454 A1    4/2007
JP    2010-128976 A    6/2010
(Continued)

OTHER PUBLICATIONS

U.S. Appl. No. 16/927,759, filed Jul. 13, 2020, Johnson Controls Technology Co.
(Continued)

*Primary Examiner* — Darrin D Dunn
(74) *Attorney, Agent, or Firm* — Foley & Lardner LLP

(57) ABSTRACT

A building system for a building including one or more storage devices storing instructions thereon that, when executed by one or more processors, cause the one or more processors to operate one or more pieces of building equipment associated with a building space based on a first operating mode. The instructions cause the one or more processors to receive an indication to update operation of the building space based on an emergency situation and responsive to receiving the indication to update operation of the building space based on the emergency situation, operate the one or more pieces of building equipment based on a second operating mode, wherein the second operating mode defines one or more second parameters for the one or more pieces of building equipment and is adapted to reconfigure the (Continued)

operation of the building space to address or mitigate the emergency situation.

27 Claims, 41 Drawing Sheets

(51) Int. Cl.
| | |
|---|---|
| *G05B 15/02* | (2006.01) |
| *F24F 11/52* | (2018.01) |
| *F24F 11/46* | (2018.01) |
| *F24F 3/16* | (2021.01) |
| *F24F 11/58* | (2018.01) |
| *F24F 13/10* | (2006.01) |
| *F24F 110/70* | (2018.01) |
| *F24F 120/10* | (2018.01) |
| *F24F 110/64* | (2018.01) |
| *F24F 130/10* | (2018.01) |
| *F24F 8/22* | (2021.01) |

(52) U.S. Cl.
CPC .............. *F24F 11/58* (2018.01); *F24F 11/65* (2018.01); *F24F 13/10* (2013.01); *G05B 15/02* (2013.01); *F24F 8/22* (2021.01); *F24F 2110/64* (2018.01); *F24F 2110/70* (2018.01); *F24F 2120/10* (2018.01); *F24F 2130/10* (2018.01); *G05B 2219/2642* (2013.01)

(58) Field of Classification Search
CPC .... G05B 2219/2614; G05B 2219/2642; G05B 23/0208; F24F 11/30; F24F 2110/50; F24F 2120/10; F24F 11/0001; F24F 11/32; F24F 11/65; F24F 11/46; F24F 11/52; F24F 3/16; F24F 13/10; F24F 11/58; F24F 2003/1667; F24F 2110/70; F24F 2130/10; F24F 2110/64; H04L 67/125

See application file for complete search history.

(56) References Cited

U.S. PATENT DOCUMENTS

| | | | |
|---|---|---|---|
| 6,792,319 B1 | 9/2004 | Bilger | |
| 6,909,921 B1 | 6/2005 | Bilger | |
| 7,099,895 B2 | 8/2006 | Dempsey | |
| 7,394,370 B2 | 7/2008 | Chan | |
| 7,817,046 B2 | 10/2010 | Coveley et al. | |
| 7,941,096 B2 | 5/2011 | Perkins et al. | |
| 8,049,614 B2 | 11/2011 | Kahn et al. | |
| 8,405,503 B2 | 3/2013 | Wong | |
| 8,560,339 B2 | 10/2013 | Khan | |
| 8,589,214 B1 | 11/2013 | Scott et al. | |
| 8,867,993 B1 | 10/2014 | Perkins et al. | |
| 8,936,944 B2 * | 1/2015 | Peltz | C12Q 3/00 436/174 |
| 9,075,909 B2 | 7/2015 | Almogy et al. | |
| 9,087,204 B2 | 7/2015 | Gormley et al. | |
| 9,435,659 B1 | 9/2016 | Kozloski et al. | |
| 9,459,607 B2 | 10/2016 | Frazer et al. | |
| 9,475,359 B2 | 10/2016 | Mackay | |
| 9,491,574 B2 | 11/2016 | O'Sullivan et al. | |
| 9,521,009 B1 | 12/2016 | Skeffington | |
| 9,618,224 B2 * | 4/2017 | Emmons | G05B 19/048 |
| 9,733,656 B2 | 8/2017 | Janoso et al. | |
| 9,945,688 B2 | 4/2018 | Kozloski et al. | |
| 10,068,116 B2 | 9/2018 | Good et al. | |
| 10,156,833 B2 | 12/2018 | Ray et al. | |
| 10,198,779 B2 | 2/2019 | Pittman et al. | |
| 10,234,836 B2 | 3/2019 | Duchene et al. | |
| 10,251,610 B2 | 4/2019 | Parthasarathy et al. | |
| 10,339,484 B2 | 7/2019 | Pai et al. | |
| 10,389,518 B2 | 8/2019 | Chen et al. | |
| 10,885,170 B1 | 1/2021 | Maliani | |
| 2002/0084900 A1 * | 7/2002 | Peterson | G06Q 10/06 340/573.1 |
| 2004/0163325 A1 * | 8/2004 | Parrini | B66B 5/024 52/1 |
| 2004/0172277 A1 * | 9/2004 | Dione | G06Q 30/02 705/324 |
| 2004/0267385 A1 | 12/2004 | Lingemann | |
| 2006/0218010 A1 | 9/2006 | Michon et al. | |
| 2007/0219645 A1 | 9/2007 | Thomas et al. | |
| 2007/0222599 A1 * | 9/2007 | Coveley | G16H 40/63 340/572.4 |
| 2007/0226291 A1 | 9/2007 | Lundblad et al. | |
| 2008/0277486 A1 | 11/2008 | Seem et al. | |
| 2008/0281472 A1 | 11/2008 | Podgorny et al. | |
| 2009/0070134 A1 * | 3/2009 | Rodgers | G16H 50/80 705/2 |
| 2009/0105995 A1 * | 4/2009 | Harrington | G06Q 10/06 703/1 |
| 2009/0210262 A1 | 8/2009 | Rines et al. | |
| 2009/0299767 A1 | 12/2009 | Michon et al. | |
| 2009/0300174 A1 | 12/2009 | Floris et al. | |
| 2010/0179832 A1 | 7/2010 | Van Deursen et al. | |
| 2010/0262298 A1 | 10/2010 | Johnson et al. | |
| 2010/0280636 A1 | 11/2010 | Holland et al. | |
| 2010/0307731 A1 | 12/2010 | Yonezawa et al. | |
| 2010/0324962 A1 | 12/2010 | Nesler et al. | |
| 2011/0047418 A1 | 2/2011 | Drees et al. | |
| 2011/0087650 A1 | 4/2011 | Mackay et al. | |
| 2011/0093126 A1 | 4/2011 | Toba et al. | |
| 2011/0178977 A1 | 7/2011 | Drees | |
| 2011/0313808 A1 * | 12/2011 | Kavanagh | G06Q 10/06313 705/7.23 |
| 2012/0001487 A1 | 1/2012 | Pessina | |
| 2012/0029661 A1 | 2/2012 | Jones et al. | |
| 2012/0029970 A1 | 2/2012 | Stiles et al. | |
| 2012/0079407 A1 * | 3/2012 | Holmes | G05B 23/0216 715/772 |
| 2012/0083937 A1 | 4/2012 | Kong et al. | |
| 2012/0197896 A1 | 8/2012 | Li et al. | |
| 2013/0036139 A1 | 2/2013 | Kung et al. | |
| 2013/0079471 A1 * | 3/2013 | Brown | C08L 53/02 525/241 |
| 2013/0166607 A1 | 6/2013 | Turk et al. | |
| 2013/0218349 A1 | 8/2013 | Coogan et al. | |
| 2013/0257626 A1 | 10/2013 | Masli et al. | |
| 2013/0268128 A1 | 10/2013 | Casilli et al. | |
| 2013/0297259 A1 | 11/2013 | Tsao et al. | |
| 2014/0023363 A1 | 1/2014 | Apte | |
| 2014/0167917 A2 * | 6/2014 | Wallace | G16H 40/67 340/10.1 |
| 2014/0188541 A1 | 7/2014 | Goldsmith et al. | |
| 2014/0195664 A1 | 7/2014 | Rahnama | |
| 2014/0277765 A1 | 9/2014 | Karimi et al. | |
| 2014/0316582 A1 | 10/2014 | Berg-Sonne et al. | |
| 2014/0350970 A1 | 11/2014 | Schumann et al. | |
| 2014/0368601 A1 | 12/2014 | Decharms | |
| 2015/0005900 A1 | 1/2015 | Steele et al. | |
| 2015/0032265 A1 | 1/2015 | Herring et al. | |
| 2015/0066169 A1 | 3/2015 | Nakano et al. | |
| 2015/0088570 A1 | 3/2015 | Yenni et al. | |
| 2015/0100330 A1 | 4/2015 | Shpits | |
| 2015/0140990 A1 | 5/2015 | Kim et al. | |
| 2015/0159893 A1 | 6/2015 | Daubman et al. | |
| 2015/0168926 A1 | 6/2015 | Wood | |
| 2015/0285527 A1 | 10/2015 | Kim et al. | |
| 2015/0293508 A1 | 10/2015 | Piaskowski et al. | |
| 2015/0312696 A1 | 10/2015 | Ribbich et al. | |
| 2015/0319176 A1 | 11/2015 | Yahalom et al. | |
| 2015/0370927 A1 | 12/2015 | Flaherty et al. | |
| 2016/0005300 A1 | 1/2016 | Laufer et al. | |
| 2016/0020918 A1 | 1/2016 | Lu | |
| 2016/0095188 A1 | 3/2016 | Verberkt et al. | |
| 2016/0117616 A1 | 4/2016 | Wang et al. | |
| 2016/0127174 A1 | 5/2016 | Fu et al. | |
| 2016/0147207 A1 | 5/2016 | Park et al. | |
| 2016/0258641 A1 | 9/2016 | Cheatham et al. | |
| 2016/0282825 A1 | 9/2016 | Kariguddaiah | |

(56) References Cited

U.S. PATENT DOCUMENTS

| | | | |
|---|---|---|---|
| 2016/0306934 A1* | 10/2016 | Sperry | G06F 3/147 |
| 2016/0320760 A1 | 11/2016 | Brun et al. | |
| 2017/0026194 A1 | 1/2017 | Vijayrao et al. | |
| 2017/0041296 A1 | 2/2017 | Ford et al. | |
| 2017/0076042 A1* | 3/2017 | Katz | G06K 9/00355 |
| 2017/0103633 A1* | 4/2017 | Khire | A62C 37/40 |
| 2017/0124842 A1 | 5/2017 | Sinha et al. | |
| 2017/0178037 A1 | 6/2017 | Kaye et al. | |
| 2017/0191695 A1 | 7/2017 | Bruhn et al. | |
| 2017/0195130 A1 | 7/2017 | Landow et al. | |
| 2017/0206334 A1 | 7/2017 | Huang | |
| 2017/0234067 A1 | 8/2017 | Fasi et al. | |
| 2017/0281819 A1 | 10/2017 | Jones et al. | |
| 2017/0350615 A1 | 12/2017 | Ashar | |
| 2017/0351831 A1 | 12/2017 | Cahan et al. | |
| 2017/0351832 A1 | 12/2017 | Cahan et al. | |
| 2017/0351833 A1 | 12/2017 | Cahan et al. | |
| 2017/0351834 A1 | 12/2017 | Cahan et al. | |
| 2017/0352119 A1* | 12/2017 | Pittman | G16H 50/80 |
| 2017/0366414 A1 | 12/2017 | Hamilton et al. | |
| 2018/0005195 A1 | 1/2018 | Jacobson | |
| 2018/0046766 A1 | 2/2018 | Deonarine et al. | |
| 2018/0052970 A1 | 2/2018 | Boss et al. | |
| 2018/0101146 A1 | 4/2018 | Hariharan et al. | |
| 2018/0113897 A1 | 4/2018 | Donlan et al. | |
| 2018/0120778 A1 | 5/2018 | Billings | |
| 2018/0120788 A1 | 5/2018 | Billings | |
| 2018/0191197 A1 | 7/2018 | Carr et al. | |
| 2018/0210438 A1 | 7/2018 | Ashar et al. | |
| 2018/0225606 A1 | 8/2018 | Curcic et al. | |
| 2018/0247476 A1 | 8/2018 | Kusens et al. | |
| 2018/0270063 A1 | 9/2018 | Bard et al. | |
| 2018/0276775 A1 | 9/2018 | Khurana et al. | |
| 2018/0299845 A1 | 10/2018 | Ray et al. | |
| 2018/0314277 A1 | 11/2018 | Moore et al. | |
| 2018/0375444 A1 | 12/2018 | Gamroth | |
| 2019/0011894 A1 | 1/2019 | Meyer et al. | |
| 2019/0033802 A1 | 1/2019 | Chatterjee et al. | |
| 2019/0079471 A1* | 3/2019 | Ray | G06Q 10/063 |
| 2019/0095874 A1 | 3/2019 | Bellrose et al. | |
| 2019/0122759 A1* | 4/2019 | Wakimoto | G16H 50/30 |
| 2019/0155268 A1* | 5/2019 | Cohen | G05B 23/0208 |
| 2019/0158431 A1 | 5/2019 | Meyer et al. | |
| 2019/0188616 A1 | 6/2019 | Urban et al. | |
| 2019/0188977 A1* | 6/2019 | Moses | H04L 67/18 |
| 2019/0203532 A1 | 7/2019 | Feldstein | |
| 2019/0250575 A1 | 8/2019 | Jonsson | |
| 2020/0009280 A1* | 1/2020 | Kupa | A61L 2/24 |
| 2020/0176124 A1 | 6/2020 | Chatterjea et al. | |
| 2020/0176125 A1* | 6/2020 | Chatterjea | G16H 50/30 |
| 2020/0194103 A1 | 6/2020 | Weldemariam et al. | |
| 2020/0219623 A1* | 7/2020 | Kushida | G06K 9/00335 |
| 2020/0225313 A1* | 7/2020 | Coles | G08B 13/1672 |
| 2020/0226892 A1* | 7/2020 | Coles | G08B 25/14 |
| 2020/0227160 A1 | 7/2020 | Youngblood et al. | |
| 2020/0264572 A1* | 8/2020 | Sha | G05B 15/02 |
| 2020/0294680 A1* | 9/2020 | Gupta | G06N 7/005 |
| 2020/0327434 A1 | 10/2020 | Maeser | |
| 2020/0365260 A1* | 11/2020 | Sperry | G06F 3/14 |
| 2021/0018884 A1* | 1/2021 | Kupa | H04L 67/22 |
| 2021/0020285 A1 | 1/2021 | Hall | |
| 2021/0318010 A1* | 10/2021 | Federspiel | F24F 11/64 |

FOREIGN PATENT DOCUMENTS

| | | |
|---|---|---|
| KR | 20200047457 A | 5/2020 |
| WO | WO-2010/141601 A2 | 12/2010 |
| WO | WO-2016/180754 A1 | 11/2016 |
| WO | WO-2017/007418 | 1/2017 |

OTHER PUBLICATIONS

U.S. Appl. No. 16/927,766, filed Jul. 13, 2020, Johnson Controls Technology Co.

U.S. Appl. No. 16/984,945, filed Aug. 4, 2020, Johnson Controls Technology Co.

"Ambient (outdoor) air pollution," WHO, URL: https://www.who.int/en/news-room/fact-sheets/detail/ambient-(outdoor)-air-quality-and-health, May 2, 2018, 9 pages.

"ASHRAE Epidemic Task Force Established," ASHRAE, URL: https://www.ashrae.org/about/news/2020/ashrae-epidemic-task-force-established, Mar. 31, 2020, 6 pages.

"ASHRAE Issues Statements on Relationship Between COVID-19 and HVAC in Buildings," ASHRAE, URL: https://www.ashrae.org/about/news/2020/ashrae-issues-statements-on-relationship-between-covid-19-and-hvac-in-buildings, Apr. 20, 2020, 6 pages.

"ASHRAE Offers COVID-19 Building Readiness/Reopening Guidance," ASHRAE, URL: https://www.ashrae.org/about/news/2020/ashrae-offers-covid-19-building-readiness-reopening-guidance, May 7, 2020, 6 pages.

"ASHRAE Resources Available to Address COVID-19 Concerns," ASHRAE, URL: https://www.ashrae.org/about/news/2020/ashrae-resources-available-to-address-covid-19-concerns, Feb. 27, 2020, 6 pages.

"Building Readiness," ASHRAE Epidemic Task Force, URL: https://www.ashrae.org/file%20library/technical%20resources/covid-19/ashrae-building-readiness.pdf, Aug. 19, 2020, 119 pages.

"Carbon Monoxide Levels & Risks," The National Comfort Institute, URL: https://www.myhomecomfort.org/carbon-monoxide-levels-risks/, Retrieved on Sep. 3, 2020, 4 pages.

"Coronavirus (COVID-19) Response Resources from ASHRAE and Others," ASHRAE, URL: https://www.ashrae.org/technical-resources/resources, Retrieved Sep. 3, 2020, 27 pages.

"Environmental Health Committee (EHC) Emerging Issue Brief: Pandemic COVID-19 and Airborne Transmission," ASHRAE, URL: https://www.ashrae.org/file%20library/technical%20resources/covid-19/eiband-airbornetransmission.pdf, Apr. 17, 2020, 3 pages.

"Filtration & Disinfection," ASHRAE Epidemic Task Force, URL: https://www.ashrae.org/file%20library/technical%20resources/covid-19/ashrae-filtration_disinfection-c19-guidance.pdf, Aug. 7, 2020, 37 pages.

"Guidance for Polling Place HVAC Systems," ASHRAE, URL: https://www.ashrae.org/file%20library/technical%20resources/covid-19/guidance-for-polling-place-hvac-systems.pdf, Retrieved Sep. 3, 2020, 2 pages.

"Guidance for the Re-Opening of Schools," ASHRAE, URL: https://www.ashrae.org/file%20library/technical%20resources/covid-19/guidance-for-the-re-opening-of-schools.pdf, Retrieved Sep. 3, 2020, 1 page.

"Making Polling Places Safer," ASHRAE, URL: https://www.ashrae.org/about/news/2020/making-polling-places-safer, Aug. 20, 2020, 6 pages.

"Researchers are working to develop smart ventilation control system for buildings," News Medical, URL: https://www.news-medical.net/news/20200520/Researchers-are-working-to-develop-smart-ventilation-control-system-for-buildings.aspx?MvBriefArticleId=1693, May 20, 2020, 2 pages.

"Schools & Universities," ASHRAE Epidemic Task Force, URL: https://www.ashrae.org/file%20library/technical%20resources/covid-19/ashrae-reopening-schools.pdf, May 5, 2020, 33 pages.

"Science has shown us three reasons why we should always maintain 40-60%RH in public buildings like hospitals, schools and offices, throughout the year," URL: https://40to60rh.com/, Retrieved Sep. 3, 2020, 9 pages.

Anonymous: "Delta Building Management and Controls System". Internet Article. Retrieved from the Internet: URL:http://www.deltaww.com/filecenter/solu tions/download/05/Delta BMCS LDALISolution Guide 201608 eng.pdf?CID=23, Sep. 1, 2016, 17 pages.

Goldstein, "Increased indoor humidity may decrease #Coronavirus #COVID-19 transmission," WUWT: Watts Up With That?, URL: 2https://wattsupwiththat.com/2020/03/28/increased-indoor-humidity-may-decrease-coronavirus-covid-19-transmission/, Mar. 28, 2020, 91 pages.

International Search Report and Written Opinion on PCT/US2018/027396, dated Jun. 27, 2018. 16 pages.

(56) References Cited

OTHER PUBLICATIONS

International Search Report and Written Opinion on PCT/US2018/051182, dated Nov. 22, 2018, 17 pages.
Levin, "Preprocessing Data", URL: https://www.percona.com/blog/2011/08/08/preprocessingdata/, Aug. 8, 2011, 5 pages.
Office Action on EP 18721926.6, dated Aug. 12, 2020, 8 pages.
Riley et al., "Airborne Spread of Measles in a Suburban Elementary School," American Journal of Epidemiology, 1978, 107:5, pp. 421-432.
Rowland, "Designing Connected products: UX for the Consumer Internet of Things," May 31, 2015, pp. 2, 5-6, 8-14, 32-35, 48-49, 52, 93, 95-99, 123, 307, 312, 395, 532, 613-625.
Sinopoli, "Smart Buildings Systems for Architects, Owners and Builders," Nov. 18, 2009, chapters 3, 4, 5 and 6, pp. 3-8, 129-136.
Sterling et al., "Criteria for Human Exposure to Humidity on Occupied Buildings," ASHRAE Transactions, 1985, vol. 91, Part 1, CH85-13 No. 1, pp. 611-622.
Wikipedia: "Building automation," URL:https://en.wikipedia.org/w/index.php?title=Buildingautomation&oldid=799424260, Sep. 7, 2017. 12 pages.
Wikipedia: "Building management system," URL:https://en.wikipedia.org/w/index.php?title=Building management system&oldid=797980461, Aug. 30, 2017, 4 pages.
Yeh et al., "iPower: An Energy Conservation System for Intelligent Buildings by Wireless Sensor Networks," Inderscience Intl Jrnl of Sensor Networks, 2009, 9 pages.
Angelopoulos, et al., "DHP Framework: Digital Health Passports Using Blockchain—Use case on international tourism during the COVID-19 pandemic," retrieved from https://arxiv.org/abs/2005.08922, 8 pages (2020).
Brownstein, et al., "Empirical Evidence for the Effect of Airline Travel on Inter-Regional Influenza Spread in the United States," PLoS Medicine, 3(10), e401, pp. 1826-1835 (Oct. 2006).
Conley, "Encryption, Hashing, PPK, and Blockchain: A Simple Introduction," Vanderbilt University Department of Economics Working Papers, VUECON-19-00013, 14 pages (Aug. 17, 2019).
Jacobson, et al., "A double-risk monitoring and movement restriction policy for Ebola entry screening at airports in the United States," Preventative Medicine, 88, pp. 33-38 (2016).
Miraz et al., "Applications of Blockchain Technology beyond Cryptocurrency," Annals of Emerging Technologies in Computing, 2(1), pp. 1-6 (2018).
Sandhu, et al., "An intelligent system for predicting and preventing MERS-CoV infection outbreak," The Journal of Supercomputing, 72, pp. 3033-3056 (2016).
Wikipedia, "Manifest (transportation)," retrieved from https://en.wikipedia.org/wiki/Manifest(transportation), 3 pages (2020).
Rifi et al., "Towards Using Blockchain Technology for eHealth Data Access Management," 2017 Fourth International Conference on Advances in Biomedical Engineering (ICABME), 2017, 4 pages.
Wikipedia, "Cryptographic hash function," URL: https://en.wikipedia.org/wiki/Cryptographic_hash_function, retrieved Jan. 7, 2022, (14 pages).
Wikipedia, "Hash function," URL: https://en.wikipedia.org/wiki/Hash_function, retrieved Jan. 7, 2022 (15 pages).
Xu et al., "Healthchain: A Blockchain-Based Privacy Preserving Scheme for Large-Scale Health Data," IEEE Internet of Things Journal, Oct. 2019, vol. 6, No. 5, (pp. 8770-8781).

* cited by examiner

| Capabilities | Product and Service Offerings | Energy Efficiency | Health and Safety | Resilience | Technology | Flexibility | Energy Savings | Operational Savings |
|---|---|---|---|---|---|---|---|---|
| HVAC & Lighting | HVAC, lighting, plug load control, building envelope, smart equipment | X | X | X | X | X | X | X |
| Indoor Environmental Quality | high performance filtration, bi-polar ionization, IAQ sensing, demand controlled ventilation | X | X | | X | | X | X |
| Building Technology Systems | Building management, fire detection, security, access control, energy management, systems integration, occupant fever detection, people and asset tracking | X | X | | X | X | X | X |
| Remote Services | Remote monitoring, maintenance, service, operations and compliance services for core building and IT systems | X | | X | X | | X | X |
| Distributed Energy Resources | Solar PV, EV charging, electric storage, thermal storage, backup generation, CHP and microgrids | X | | X | X | | X | X |
| IT Infrastructure | Segmented, cyber-secure and HIPAA compliant wired and wireless infrastructure sized for core and emergency services, distance learning compatibility, clinical equipment compatibility (nurse call, patient monitoring, electronic health records, etc.) | X | X | X | X | X | | X |
| Power Distribution | Capacity sized for core and emergency service requirements, uninterruptable power supplies for ventilators and other medical equipment, back-up generation, electrical sub-metering | | X | X | | X | | |
| Healthcare Emergency Response | Ability to quickly add critical healthcare HVAC capabilities (filtration, UV light treatment, space pressurization, supplemental cooling), temporary supplemental cooling, temporary supplemental power, clinical equipment, medical gases, privacy curtains, nursing station, medical supply storage, etc. | | X | X | | | | |

FIG. 10

|  | MERV 1-4 | MERV 5-8 | MERV 9-12 | MERV 13-16 | MERV 17-20 |
|---|---|---|---|---|---|
| Size | >10 μm | 3-10 μm | 1-3 μm | 0.3-1 μm | <0.3 μm |
| Source | Particles<br>Pollen<br>Dust Mites | Particles<br>Mold<br>Pet Dander | Particles<br>Lead Dust<br>Automobile<br>Exhaust | Particles<br>Bacteria<br>Smoke<br>Sneeze | Particles<br>Virus |
| Application | Residential | High End<br>Residential<br>Light<br>Commercial | Commercial | Hospitals | Surgical Suites |
| Typical Pressure Drop | MERV 1 ~ 0.3"<br>$H_2O$ | MERV 5 ~ 0.6"<br>$H_2O$ | MERV 9 ~ 1.0"<br>$H_2O$ | MERV 13 ~ 1.5"<br>$H_2O$ |  |

FIG. 13

| | Heat Valve | Cool Valve | Damper Actuator |
|---|---|---|---|
| Heating | Control | 0% | Minimum |
| Maximum Air Heating | 100% | 0% | Control |
| Cooling | 0% | Control | Minimum |
| Economizer | 0% | 0% | Control |
| Economizer + Cooling | 0% | Control | 100% |
| Maximum Air Cooling | 0% | 100% | Control |

Temperature Control Parameters

FIG. 15

| Spaces | Network |

2010 →

| ☰ OFFLINE | Lobby 101 | | Search 🔍 | 👤 xxx... ▾ |Page 1 ▾ |

Enterprise

Medical Center

First Floor

Second Floor

GRAPHICS

AHU-1 Operating Modes

Mode Command Dashboard

☀ Comfort and Efficiency Modes

- ●○ Economizer
  When outdoor air is suitable, prioritize outdoor air cooling over mechanical cooling to save energy. This mode is enabled by default.
- ●○ Outdoor Air Pollution
  Reduce outdoor ingress if outdoor air pollutant concentrations exceed predetermined (safe) limits. This overrides economizer controls. This mode by default but active only when appropriate sensors detects inappropriate outdoor air condition.
- ○● Demand Control Ventilation ⟲ ― 2012
  Maintain indoor air quality and save energy by adjusting minimum outdoor air ventilation. Settings can be based on occupancy counts, occupant proxy measurements (e.g., CO2) Occupant prox. measurements (e.g., CO2) or level of indoor pollutants (e.g., VOC). This mode is enabled by default.

⚠ Emergency Environmental Control Modes

- ●○ Flush
  On a predetermined schedule while the space is unoccupied, the HVAC system will displace the air in the space with outdoor air to reduce the pollutant concentrations to low levels without concern for comfort. This mode is disabled by default.
- ●○ Thermal Flush
  On a predetermined schedule while the space is unoccupied, the HVAC system will both displace the air in the space with outdoor air and increase relative humidity without concern for comfort. This will reduce pathogen concentrations to low level and pathogen viability. This mode is disabled by default.
- ●○ Increased Outdoor Ventilation
  Minimum outdoor air ventilation settings are increased to dilute space contaminant concentrations during occupied periods. This can increase energy consumption. This mode is disabled by default.
- ○● Pandemic Pressurization Room ⟲ ― 2016
  Enable pressurization of space to isolate infected or potentially infected people during pandemic. This mode is enable by default, and can be disabled for long period of unoccupied building such as vacation.
- ○● Shutdown Cross Contaminatoin
  Shutdown equipment previously identified risk of contamination between return and supply air. Example: heat recovery wheels. This mode is disabled by default.

🏠 Outdoor Emergency Override

- ●○ Emergency VentillationShut-Off ⟲ ― 2018
  Turn-off all outdoor air in response to severe outdoor pollution (chemical, bio-hazard, etc.). Indoor ventilation is maintained. This mode is to be used until the building is evacuated. This mode is disabled by default.

[ + ] [ ⤢ ] [ − ]

Legend: ○ Off  ● On

Parameters to Enter

| | Parameter 1 | Parameter 2 | Parameter 3 | Parameter 4 |
|---|---|---|---|---|
| Outdoor Air Pollution | CO | PM 2.5 | | |
| Demand Control Ventilation | CO2 | | | |
| Performance Ventilation | CO2 | | | |
| Flush | OA Flow Level | Cycle Duration | | |
| Thermal Flush | OA Flow Level | Cycle Duration | RH | Supply Air Temperature |
| Increased Ventilation | OA Flow Level | | | |
| Outdoor Emergency | NA | | | |
| Pressurization | | | | |

FIG. 21

BUILDING SYSTEM WITH FLEXIBLE FACILITY OPERATION

CROSS-REFERENCE TO RELATED PATENT APPLICATIONS

This application claims the benefit of and priority to U.S. Provisional Application No. 63/023,628 filed May 12, 2020 and U.S. Provisional Application No. 63/050,465 filed Jul. 10, 2020. The disclosures of each of the foregoing patent applications are incorporated by reference herein in their entireties.

BACKGROUND

Emergency situations, such as a pandemic where an infectious disease is spreading, can create stress on healthcare organizations that respond to the pandemic. The pandemic can further disrupt the activities of occupants within office buildings, schools, apartments or other buildings where occupants live, work, learn, or otherwise congregate. Emergency situations such as hurricanes, tornadoes, floods, seismic events, cyber-attacks, and/or wild fires require buildings to provide flexible emergency response. Some emergency situations may require rapid conversion of existing non-critical healthcare spaces into healthcare spaces. Furthermore, emergency situations may require that building facilities such as office buildings, convention centers, or student dormitories be converted into temporary healthcare facilities. Furthermore, some diseases, even after they are no longer present in a society, may have lasting impacts on how occupants interact with a building and/or facility. Accordingly, buildings and/or facilities must adapt to operate according to the impacts.

SUMMARY

One implementation of the present disclosure is a building system for a building including one or more storage devices storing instructions thereon that, when executed by one or more processors, cause the one or more processors to operate one or more pieces of building equipment associated with a building space based on a first operating mode, wherein the first operating mode defines one or more first parameters for the one or more pieces of building equipment. The instructions cause the one or more processors to receive an indication to update operation of the building space based on an emergency situation and responsive to receiving the indication to update operation of the building space based on the emergency situation, actively operate the one or more pieces of building equipment based on a second operating mode, wherein the second operating mode is an emergency response mode that defines one or more second parameters for the one or more pieces of building equipment and is adapted to reconfigure the operation of the building space to address or mitigate the emergency situation.

In some embodiments, the emergency situation is at least one of an infectious disease, polluted outdoor air, an electric grid emergency, or a weather emergency.

In some embodiments, operating the one or more pieces of building equipment based on the first operating mode controls one or more conditions of the building space based on a primary use of the building space. In some embodiments, operating the one or more pieces of building equipment based on the second operating mode controls the one or more conditions of the building space to repurpose the building space from the primary use to a temporary alternate use.

In some embodiments, the instructions cause the one or more processors to implement a retrofit service configured to receive an indication of one or more existing building systems of the building, receive an indication of one or more operating goals of the building, identify one or more recommended building systems based on the one or more existing building systems and the indication of the one or more operating goals of the building, and cause a display device of a user device of a user to display an recommendation indicating the one or more recommended building systems.

In some embodiments, the instructions cause the one or more processors to implement a remote service configured to collect data of the one or more pieces of building equipment, derive one or more performance insights from the data collected from the one or more pieces of building equipment, and cause a display deice of a user device of a user to display at least one of the data or the one or more performance insights.

In some embodiments, the instructions cause the one or more processors to receive the indication to update the operation of the building space by receiving a selection of the second operating mode from operating modes, the operating modes including the first operating mode and the second operating mode.

In some embodiments, the operating modes include one or more comfort and efficiency modes, wherein the one or more comfort and efficiency modes include at least one of a normal mode that includes one or more normal mode parameters to control a temperature of the building or an economizer mode that includes one or more economizer mode parameters that cause an economizer of an air handler unit to operate one or more dampers to utilize outdoor air to meet a cooling demand of the building.

In some embodiments, the operating modes include one or more indoor environmental quality modes including at least one of a demand control ventilation mode that includes one or more demand control ventilation mode parameters that cause the one or more pieces of building equipment to ventilate the building based on at least one of carbon dioxide ($CO_2$) measurements of the building, occupancy measurements of the building, or a scheduled occupancy level of the building or an outdoor air pollution mode that includes one or more outdoor air pollution mode parameters that cause the one or more pieces of building equipment to reduce ventilation in the building in response to an outdoor air pollution level exceeding a particular level.

In some embodiments, the operating modes include one or more emergency environmental control mode that include at least one of a flush mode that includes one or more flush mode parameters that cause the one or more pieces of building equipment to increase ventilation of the building before a beginning of an occupancy period of the building to remove an infectious disease from the building, a thermal flush mode that includes one or more thermal flush mode parameters that cause the one or more pieces of building equipment to increase the ventilation of the building, increase a humidity level of the building, and increase a temperature of the building before the beginning of the occupancy period of the building to perform at least one of destroying the infectious disease within the building or removing the infectious disease from the building, or an increased ventilation mode that includes one or more increased ventilation mode parameters that cause the one or more pieces of building equipment to increase the ventilation of the building during the occupancy period to remove the infectious disease from the building.

In some embodiments, the operating modes include one or more emergency environmental control modes that include at least one of a pandemic pressurization room mode that includes one or more pandemic pressurization room mode parameters that cause the one or more pieces of building equipment to control a pressure level of the building space to be at a negative pressure compared to another building space to prevent an infectious disease from escaping the building space, a shutdown cross contamination mode that includes one or more shutdown cross contamination mode parameters that cause the one or more pieces of building equipment to shutdown to avoid cross contamination between supply air and a return air to prevent the infectious disease present in the return air from entering the supply air, or an emergency ventilation shut off mode including one or more emergency ventilation shut off mode parameters that cause the one or more pieces of building equipment to stop ventilation of the building in response to an outdoor air quality emergency.

In some embodiments, the operating modes include a disinfectant light mode. In some embodiments, the one or more pieces of building equipment include a disinfectant light source located in the building space and an occupancy sensor located in the building space. In some embodiments, the disinfectant light mode defines one or more parameters that causes the disinfectant light source to generate disinfectant light to destroy an infectious disease within the building space in response to a determination that the building space is unoccupied based on the occupancy sensor.

In some embodiments, the operating modes include an energy demand mode including one or more parameters that cause the one or more pieces of building equipment to reduce a power consumption of the one or more pieces of building equipment.

In some embodiments, the instructions cause the one or more processors to receive the indication to update the operation of the building equipment from a user device of a user.

In some embodiments, the instructions cause the one or more processors to generate a user interface including elements representing a status of operating modes, wherein the operating modes include the first operating mode and the second operating mode, cause a display device of the user device to display the user interface, and receive the indication to update the operation of the building equipment from the user device based on a user interaction with at least one of the elements via the user device.

In some embodiments, the user interface includes input elements indicating parameters for each of the operating modes.

Another implementation of the present application is a method of a building system of a building including operating, by a processing circuit, one or more pieces of building equipment associated with a building space based on a first operating mode, wherein the first operating mode defines one or more first parameters for the one or more pieces of building equipment. The method further includes receiving, by the processing circuit, an indication to update operation of the building space based on an emergency situation occurring and responsive to receiving the indication to update operation of the building space based on the emergency situation, actively operating, by the processing circuit, the one or more pieces of building equipment based on a second operating mode, wherein the second operating mode is an emergency response mode that defines one or more second parameters for the one or more pieces of building equipment and is adapted to reconfigure the operation of the building space to address or mitigate the emergency situation.

In some embodiments, the emergency situation is at least one of an infectious disease, polluted outdoor air, an electric grid emergency, or a weather emergency.

In some embodiments, operating, by the processing circuit, the one or more pieces of building equipment based on the first operating mode controls one or more conditions of the building space based on a primary use of the building space. In some embodiments, operating, by the processing circuit, the one or more pieces of building equipment based on the second operating mode controls the one or more conditions of the building space to repurpose the building space from the primary use to a temporary alternate use.

In some embodiments, the method includes implementing, by the processing circuit, a retrofit service configured to receive an indication of one or more existing building systems of the building, receive an indication of one or more operating goals of the building, identify one or more recommended building systems based on the one or more existing building systems and the indication of the one or more operating goals of the building, and cause a display deice of a user device of a user to display an recommendation indicating the one or more recommended building systems.

In some embodiments, the method includes implementing, by the processing circuit, a remote service configured to collect data of the one or more pieces of building equipment, derive one or more performance insights from the data collected from the one or more pieces of building equipment, and cause a display deice of a user device of a user to display at least one of the data or the one or more performance insights.

In some embodiments, receiving, by the processing circuit, the indication to update the operation of the building space includes receiving a selection of the second operating mode from operating modes, the operating modes including the first operating mode and the second operating mode.

In some embodiments, the method includes receiving, by the processing circuit, the indication to update the operation of the building space from a user device of a user.

In some embodiments, the method further includes generating, by the processing circuit, a user interface including elements representing a status of operating modes, wherein the operating modes include the first operating mode and the second operating mode, causing, by the processing circuit, a display device of the user device to display the user interface, and receiving, by the processing circuit, the indication to update the operation of the building space from the user device based on a user interaction with at least one of the elements via the user device.

In some embodiments, the user interface includes input elements indicating parameters for each of the operating modes.

Another implementation of the present application is a building system for a building including one or more storage devices storing instructions thereon and one or more processors configured to execute the instructions to operate one or more pieces of building equipment associated with a building space based on a first operating mode, wherein the first operating mode defines one or more first parameters for the one or more pieces of building equipment. The instructions cause the one or more processors to receive an indication to update operation of the building space based on an infectious disease and responsive to receiving the indication to update operation of the building space based on the emergency situation, actively operate the one or more pieces of building equipment based on a second operating mode, wherein the second operating mode is an emergency response mode that defines one or more second parameters for the one or more pieces of building equipment to reduce a spread of the infectious disease in the building space.

In some embodiments, the one or more building equipment includes first building equipment of a first building domain and second building equipment of a second building domain. In some embodiments, the instructions cause the one or more processors to operate the first equipment based on one or more first parameters defined by the first operating mode and operate the second equipment based on one or more second parameters defined by the first operating mode. In some embodiments, the instructions cause the one or more processors to operate the first equipment based on one or more third parameters defined by the second operating mode and operate the second equipment based on one or more fourth parameters defined by the second operating mode.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 10 is a chart of building system capabilities for normal and emergency operations, according to an exemplary embodiment.

FIG. 13 is a chart illustrating the performance of various Maximum Efficiency Rating Value (MERV) filters, according to an exemplary embodiment.

FIG. 15 is a chart illustrating control parameters for heating, cooling, and damper position for various modes of operation of the building manager of FIG. 3, according to an exemplary embodiment.

FIG. 20C is a user interface dashboard selected in the user interface of FIGS. 20A-20B where multiple control modes are available for a building space and explanations of each mode are included, according to an exemplary embodiment.

FIG. 20D is a user interface summarizing an operating mode for each of multiple air handler units (AHUs), according to an exemplary embodiment.

FIG. 20H is a user interface where multiple control modes are available for an AHU, according to an exemplary embodiment.

FIG. 20I is a user interface where multiple control modes are available for a building space and an explanation of a flush mode is included, according to an exemplary embodiment.

FIG. 20K is a user interface of a schedule that a user can build, according to an exemplary embodiment.

FIG. 21 is a table illustrating parameters that a user enters via the user interfaces of FIG. 20H, 20I for various operating modes, according to an exemplary embodiment.

DETAILED DESCRIPTION

Overview

Figure 1:
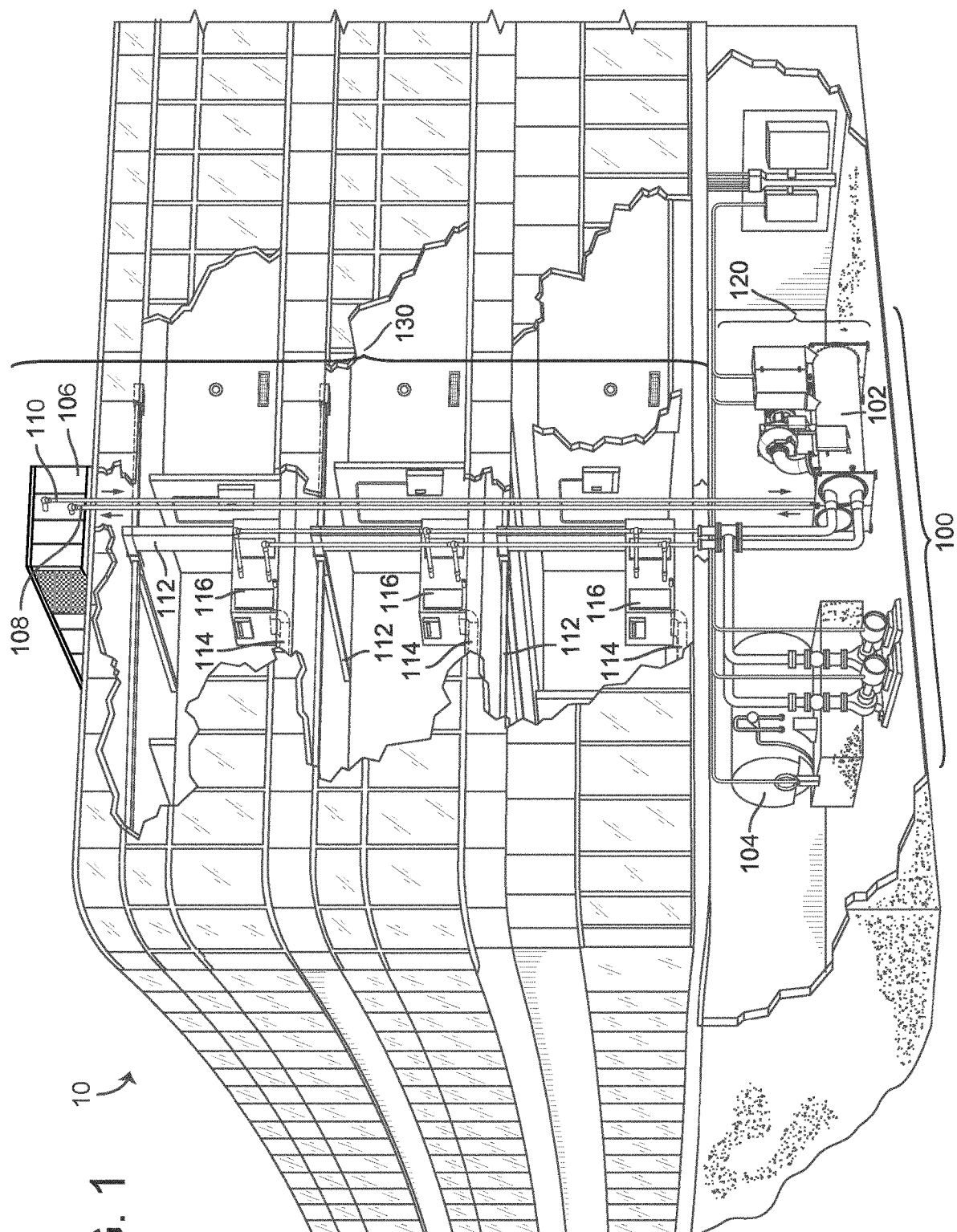
FIG. 1 is a drawing of a building equipped with a HVAC system, according to an exemplary embodiment.

Referring generally to the FIGURES, systems and methods are described herein for providing flexible operation of a facility for emergency situations, according to various exemplary embodiments. A flexible building system is configured to assist in quickly operating, servicing, and/or retrofitting buildings to be safe, efficient, resilient, and/or flexible to respond public health events and other emergencies, in some embodiments. Some target budgets can be applied to retrofitting a building (e.g., an economic stimulus loan or grant, a private investment, a donation, etc.). The flexible building system can be configured to utilize the target budget for renewing critical infrastructure at healthcare facilities, public facilities and/or any other type of facility. Furthermore, the flexible building system can be configured to utilize performance based contracting models to streamline procurement, contracting, and/or project delivery while leveraging energy and/or operational savings to help improve costs over time.

The flexible building system can be configured to operate to provide long-term operational responsibility to maximize preservation of assets without incurring any deferred maintenance. While the present disclosure discusses adapting to emergency situations, it should be understood that the systems and methods disclosed herein can be used to adapt facilities for a variety of different uses. For example, in addition to or rather than providing adaptability for disaster situations, various embodiments of the present disclosure may allow for facilities to adapt to differing conditions, differing purposes, etc. All such implementations are contemplated within the scope of the present disclosure.

In some embodiments, the flexible building system is configured to provide a systematic technology and/or service approach that includes rapid facility renovation to improve safety, efficiency, resilience, and/or flexibility of the building. The flexible building system can implement facility optimization to meet basic, enhanced, and/or emergency needs. In some embodiments, the flexible building system is configured to provide remote service capabilities to maintain health, safety, and/or operational efficiency at the building. In some embodiments, the flexible building system can be configured to provide one or more of three components which may be interactive software components that a user can interact with via a user device. The components may be a retrofit service, an operational service, and/or a remote service. Fewer, more, or different components may be provided in different implementations.

The operational service can be a cloud-based technology solution that provides an integrated user interface and control sequences to optimize facility operations under different operational and emergency conditions. In some embodiments, the operational service can implement mode based control. For example, for various different types of diseases, the operational service can control the building to various temperature and/or humidity setpoints for a flush of the building. For example, a viral load for some viruses can be reduced in high and humid conditions and others in dry and cool conditions.

The operational service can be configured to generate one or more user interfaces that allow a user to control a building to quickly adapt the operation of a facility to react to a variety of emergency conditions. The user interface can allow a user to cause the flexible building system to control various pieces of equipment to be on, off, or operate at a particular setting or settings. Furthermore, the user interface can allow the user to cause the flexible building system to alternate between various modes of operation. The various modes can allow a building and/or spaces within a building to be controlled to maintain acceptable conditions within a space for new use cases within the space. The modes can allow a multi-purpose building or building space that can be repurposed from one use to another.

Furthermore, the operational service can adjust control sequences based on non-HVAC building systems, e.g., adjust ventilation based on measured occupancy from a security system, enable and/or disable control modes based on occupancy verification (e.g., a disinfectant light space treatment), and/or using room schedules to time space flushing. The operational service may operate in emergency modes that affect building HVAC and life and safety systems. For example, a civil disturbance mode could quickly place a building into security lock-down mode (e.g. riot conditions) or a security and access control system could enforce social distancing and space density restrictions by denying access.

The operational service can utilize a user interface that allows users to view and command the operational service to operate in various modes. The operational service could store a state table defining allowable mode transitions, mode triggers for entering or exiting modes, mode dependencies, mode interlocks, mode user interfaces, mode alarms, mode failure conditions, and/or mode failure transitions (e.g., backup/fail-safe mode). Based on the mode table, the operational service could manage the user interface to allow for appropriate user based control of the building.

The remote service can be a comprehensive remote services platform that provides safety, security, maintenance, reliability, compliance, operations, and/or expert advisory services capabilities under normal and emergency operation situations. In some embodiments, the retrofit service is a solution that can identify physical equipment changes in a building. For example, the components can provide a solution for installing new equipment in a building, reconfiguring existing equipment in the building, and/or replacing existing equipment in the building. The retrofit service can be an application to make facility improvements that improve safety, efficiency, resilience, and/or flexibility using a streamlined procurement and contracting process.

In some embodiments, the facility optimization capabilities of the building system are offered as a cloud-based service with a subscription cost linked to number of implemented operational modes and their usage. In some embodiments, the building system can be configured to implement updates to the operation of a building during an emergency situation or after the emergency situation is past. For example, the building system can be configured to facilitate operation of a facility with lower and variable occupancy, staggered work schedules, greater attention to health and safety, and/or a need for greater efficiency and resiliency.

Building Management System and HVAC System

Referring now to FIG. 1, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
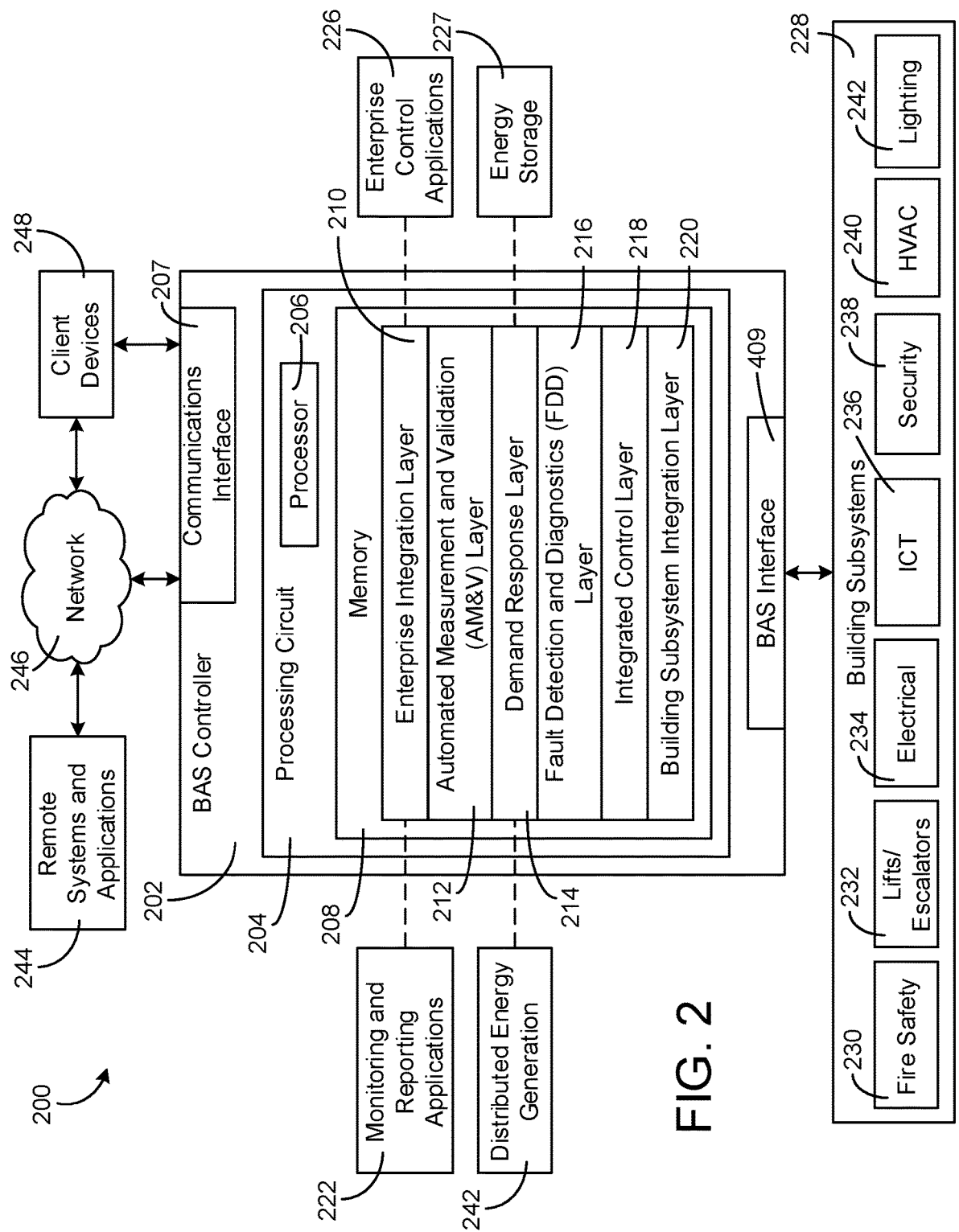
FIG. 2 is a block diagram of a building automation system (BAS) that may be used to monitor and/or control the building of FIG. 1, according to an exemplary embodiment.

Referring now to FIG. 2, a block diagram of a building automation system (BAS) 200 is shown, according to an exemplary embodiment. BAS 200 can be implemented in building 10 to automatically monitor and control various building functions. BAS 200 is shown to include BAS controller 202 and a plurality of building subsystems 228. Building subsystems 228 are shown to include a building electrical subsystem 234, an information communication technology (ICT) subsystem 236, a security subsystem 238, a HVAC subsystem 240, a lighting subsystem 242, a lift/escalators subsystem 232, and a fire safety subsystem 230. In various embodiments, building subsystems 228 can include fewer, additional, or alternative subsystems. For example, building subsystems 228 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 228 include a waterside system and/or an airside system. A waterside system and an airside system are described with further reference to U.S. patent application Ser. No. 15/631,830 filed Jun. 23, 2017, the entirety of which is incorporated by reference herein.

Each of building subsystems 228 can include any number of devices, controllers, and connections for completing its individual functions and control activities. HVAC subsystem 240 can include many of the same components as HVAC system 100, as described with reference to FIG. 1. For example, HVAC subsystem 240 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 242 can include any number of light fixtures, ballasts, lighting sensors, dimmers, or other devices configured to controllably adjust the amount of light provided to a building space. Security subsystem 238 can include occupancy sensors, video surveillance cameras, digital video recorders, video processing servers, intrusion detection devices, access control devices and servers, or other security-related devices.

Still referring to FIG. 2, BAS controller 202 is shown to include a communications interface 207 and a BAS interface 209. Interface 207 can facilitate communications between BAS controller 202 and external applications (e.g., monitoring and reporting applications 222, enterprise control applications 226, remote systems and applications 244, applications residing on client devices 248, etc.) for allowing user control, monitoring, and adjustment to BAS controller 202 and/or subsystems 228. Interface 207 can also facilitate communications between BAS controller 202 and client devices 248. BAS interface 209 can facilitate communications between BAS controller 202 and building subsystems 228 (e.g., HVAC, lighting security, lifts, power distribution, business, etc.).

Interfaces 207, 209 can be or include wired or wireless communications interfaces (e.g., jacks, antennas, transmitters, receivers, transceivers, wire terminals, etc.) for conducting data communications with building subsystems 228 or other external systems or devices. In various embodiments, communications via interfaces 207, 209 can be direct (e.g., local wired or wireless communications) or via a communications network 246 (e.g., a WAN, the Internet, a cellular network, etc.). For example, interfaces 207, 209 can include an Ethernet card and port for sending and receiving data via an Ethernet-based communications link or network. In another example, interfaces 207, 209 can include a Wi-Fi transceiver for communicating via a wireless communications network. In another example, one or both of interfaces 207, 209 can include cellular or mobile phone communications transceivers. In one embodiment, communications interface 207 is a power line communications interface and BAS interface 209 is an Ethernet interface. In other embodiments, both communications interface 207 and BAS interface 209 are Ethernet interfaces or are the same Ethernet interface.

Still referring to FIG. 2, BAS controller 202 is shown to include a processing circuit 204 including a processor 206 and memory 208. Processing circuit 204 can be communicably connected to BAS interface 209 and/or communications interface 207 such that processing circuit 204 and the various components thereof can send and receive data via interfaces 207, 209. Processor 206 can be implemented as a general purpose processor, an application specific integrated circuit (ASIC), one or more field programmable gate arrays (FPGAs), a group of processing components, or other suitable electronic processing components.

Memory 208 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 208 can be or include volatile memory or non-volatile memory. Memory 208 can include database components, object code components, script components, or any other type of information structure for supporting the various activities and information structures described in the present application. According to an exemplary embodiment, memory 208 is communicably connected to processor 206 via processing circuit 204 and includes computer code for executing (e.g., by processing circuit 204 and/or processor 206) one or more processes described herein.

In some embodiments, BAS controller 202 is implemented within a single computer (e.g., one server, one housing, etc.). In various other embodiments BAS controller 202 can be distributed across multiple servers or computers (e.g., that can exist in distributed locations). Further, while FIG. 2 shows applications 222 and 226 as existing outside of BAS controller 202, in some embodiments, applications 222 and 226 can be hosted within BAS controller 202 (e.g., within memory 208).

Still referring to FIG. 2, memory 208 is shown to include an enterprise integration layer 210, an automated measurement and validation (AM&V) layer 212, a demand response (DR) layer 214, a fault detection and diagnostics (FDD) layer 216, an integrated control layer 218, and a building subsystem integration later 220. Layers 210-220 is configured to receive inputs from building subsystems 228 and other data sources, determine optimal control actions for building subsystems 228 based on the inputs, generate control signals based on the optimal control actions, and provide the generated control signals to building subsystems 228 in some embodiments. The following paragraphs describe some of the general functions performed by each of layers 210-220 in BAS 200.

Enterprise integration layer 210 can be configured to serve clients or local applications with information and services to support a variety of enterprise-level applications. For example, enterprise control applications 226 can be configured to provide subsystem-spanning control to a graphical user interface (GUI) or to any number of enterprise-level business applications (e.g., accounting systems, user identification systems, etc.). Enterprise control applications 226 can also or alternatively be configured to provide configuration GUIs for configuring BAS controller 202. In yet other embodiments, enterprise control applications 226 can work with layers 210-220 to optimize building performance (e.g., efficiency, energy use, comfort, or safety) based on inputs received at interface 207 and/or BAS interface 209.

Building subsystem integration layer 220 can be configured to manage communications between BAS controller 202 and building subsystems 228. For example, building subsystem integration layer 220 can receive sensor data and input signals from building subsystems 228 and provide output data and control signals to building subsystems 228. Building subsystem integration layer 220 can also be configured to manage communications between building subsystems 228. Building subsystem integration layer 220 translate communications (e.g., sensor data, input signals, output signals, etc.) across a plurality of multi-vendor/multi-protocol systems.

Demand response layer 214 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 224, from energy storage 227, or from other sources. Demand response layer 214 can receive inputs from other layers of BAS controller 202 (e.g., building subsystem integration layer 220, integrated control layer 218, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 214 includes control logic for responding to the data and signals it receives. These responses can include communicating with the control algorithms in integrated control layer 218, changing control strategies, changing setpoints, or activating/deactivating building equipment or subsystems in a controlled manner. Demand response layer 214 can also include control logic configured to determine when to utilize stored energy. For example, demand response layer 214 can determine to begin using energy from energy storage 227 just prior to the beginning of a peak use hour.

In some embodiments, demand response layer 214 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 214 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 214 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable setpoint adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 218 can be configured to use the data input or output of building subsystem integration layer 220 and/or demand response later 214 to make control decisions. Due to the subsystem integration provided by building subsystem integration layer 220, integrated control layer 218 can integrate control activities of the subsystems 228 such that the subsystems 228 behave as a single integrated supersystem. In an exemplary embodiment, integrated control layer 218 includes control logic that uses inputs and outputs from a plurality of building subsystems to provide greater comfort and energy savings relative to the comfort and energy savings that separate subsystems could provide alone. For example, integrated control layer 218 can be configured to use an input from a first subsystem to make an energy-saving control decision for a second subsystem. Results of these decisions can be communicated back to building subsystem integration layer 220.

Integrated control layer 218 is shown to be logically below demand response layer 214. Integrated control layer 218 can be configured to enhance the effectiveness of demand response layer 214 by enabling building subsystems 228 and their respective control loops to be controlled in coordination with demand response layer 214. This configuration can reduce disruptive demand response behavior relative to conventional systems. For example, integrated control layer 218 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 218 can be configured to provide feedback to demand response layer 214 so that demand response layer 214 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 218 is also logically below fault detection and diagnostics layer 216 and automated measurement and validation layer 212. Integrated control layer 218 can be configured to provide calculated inputs (e.g., aggregations) to these higher levels based on outputs from more than one building subsystem.

Automated measurement and validation (AM&V) layer 212 can be configured to verify that control strategies commanded by integrated control layer 218 or demand response layer 214 are working properly (e.g., using data aggregated by AM&V layer 212, integrated control layer 218, building subsystem integration layer 220, FDD layer 216, or otherwise). The calculations made by AM&V layer 212 can be based on building system energy models and/or equipment models for individual BAS devices or subsystems. For example, AM&V layer 212 can compare a model-predicted output with an actual output from building subsystems 228 to determine an accuracy of the model.

Fault detection and diagnostics (FDD) layer 216 can be configured to provide on-going fault detection for building subsystems 228, building subsystem devices (i.e., building equipment), and control algorithms used by demand response layer 214 and integrated control layer 218. FDD layer 216 can receive data inputs from integrated control layer 218, directly from one or more building subsystems or devices, or from another data source. FDD layer 216 can automatically diagnose and respond to detected faults. The responses to detected or diagnosed faults can include providing an alarm message to a user, a maintenance scheduling system, or a control algorithm configured to attempt to repair the fault or to work-around the fault.

FDD layer 216 can be configured to output a specific identification of the faulty component or cause of the fault (e.g., loose damper linkage) using detailed subsystem inputs available at building subsystem integration layer 220. In other exemplary embodiments, FDD layer 216 is configured to provide "fault" events to integrated control layer 218 which executes control strategies and policies in response to the received fault events. According to an exemplary embodiment, FDD layer 216 (or a policy executed by an integrated control engine or business rules engine) can shut-down systems or direct control activities around faulty devices or systems to reduce energy waste, extend equipment life, or assure proper control response.

FDD layer 216 can be configured to store or access a variety of different system data stores (or data points for live data). FDD layer 216 can use some content of the data stores to identify faults at the equipment level (e.g., specific chiller, specific AHU, specific terminal unit, etc.) and other content to identify faults at component or subsystem levels. For example, building subsystems 228 can generate temporal (i.e., time-series) data indicating the performance of BAS 200 and the various components thereof. The data generated by building subsystems 228 can include measured or calculated values that exhibit statistical characteristics and provide information about how the corresponding system or process (e.g., a temperature control process, a flow control process, etc.) is performing in terms of error from its setpoint. These processes can be examined by FDD layer 216 to expose when the system begins to degrade in performance and alarm a user to repair the fault before it becomes more severe.

Flexible Facility Operation

Figure 3:
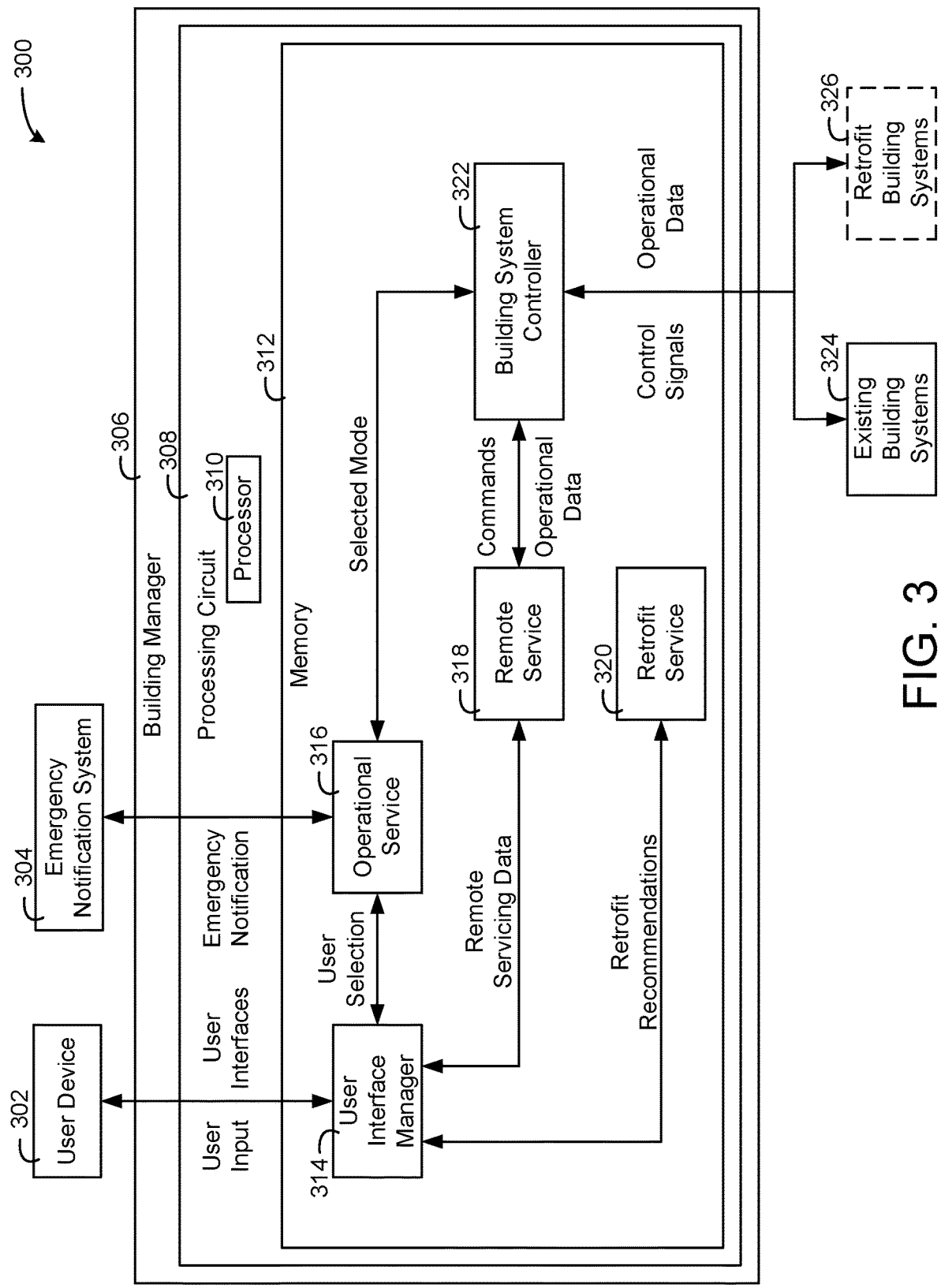
FIG. 3 is a block diagram of a building manager that implements an operational service, a remote service, and a retrofit service for flexible facility operation, according to an exemplary embodiment.

Referring now to FIG. 3, a system 300 is shown including a building manager 306 that includes an operational service 316, a remote service 318, and a retrofit service 320, according to an exemplary embodiment. The system 300 includes a user device 302, an emergency notification system 304, existing building systems 324, and retrofit building systems 326. The building manager 306 can be configured to operate the existing building systems 324 and/or the retrofit building systems 326 to implement flexible facility operation of a building. The building manager 306 includes a building system controller 322 through which the remote service 318 and/or the operational service 316 interact with the existing building systems 324 and/or the retrofit building systems 326. It should be understood that, in various embodiments, the system 300 may include only one or two of the services 316, 318, and 320, or may include additional services.

The existing building systems 324 and/or the retrofit building systems 326 can be any building system of a building. For example, the building systems could be HVAC (e.g. air handlers, chillers, boilers, sensors, thermostats, dampers, etc.) filtration systems, disinfectant light systems for killing viruses or bacteria, camera surveillance systems, access control systems, fire response systems, utility systems that generate demand response information, and/or any other type of system.

Furthermore, the building manager 306 can provide a user, via the user device 302 recommendations for retrofitting a building, e.g., a recommendation to add the retrofit building systems 326 and/or update the configurations of the existing building systems 324. Furthermore, the building manager 306 can be configured to provide remote equipment servicing via the user device 302. In some embodiments, the operational service 316 can be commanded to operate the existing building systems 324 and/or the retrofit building systems 326 via the user device 302.

The user device 302 can be a smartphone, a tablet, a desktop computer, a laptop computer, a console, and/or any other type of user device. The user device can include display means, e.g., a liquid crystal display (LCD), an organic light-emitting diode (OLED) display, a light emitting diode (LED) display, etc. Furthermore, the user device can include input means, e.g., a keyboard, a mouse, a touch screen display, etc.

In some embodiments, a building manager 306 is configured to provide flexible facility operations for a building and/or spaces of a building in emergency situations. The building manager 306 can be implemented for one or multiple facilities. In some embodiments, the building manager 306 can be implemented for a mission critical facility, for example a hospital. In some embodiments, the building manager 306 can be implemented for public or private healthcare facilities, universities (e.g., classrooms, laboratories, dormitories, etc.), schools (e.g., K-12 schools or daycare centers), municipal buildings, convention centers, arenas, airports, ports, public housing, assisted-living facilities, correctional facilities, etc. The building manager 306 can provide spaces within a building with flexible operation based on different quality priorities.

In some embodiments, the building manager 306 is implemented in one or more computing systems (e.g., server systems, desktop computers, mobile devices, etc.). The building manager 306 can be implemented in a distributed and/or cloud environment. In some embodiments, the building manager 306 can be implemented external to the facility. In some embodiments, the building system is implemented locally within a building. In some embodiments, the building system is a hybrid system where one or more computing systems are located within a facility while one or more computing systems are located outside the facility.

The building manager 306 can include one or multiple processing circuits, e.g., processing circuit 308. The processing circuit can include one or multiple processors, e.g., the processor 310 and one or multiple memory devices, e.g., the memory 312. The processor 310 can be a general purpose or specific purpose processor, an application specific integrated circuit (ASIC), one or more field programmable gate arrays (FPGAs), a group of processing components, or other suitable processing components. The processor 310 may be configured to execute computer code and/or instructions stored in the memory 312 or received from other computer readable media (e.g., CDROM, network storage, a remote server, etc.).

The memory 312 can include one or more devices (e.g., memory units, memory devices, storage devices, etc.) for storing data and/or computer code for completing and/or facilitating the various processes described in the present disclosure. The memory 312 can include random access memory (RAM), read-only memory (ROM), hard drive storage, temporary storage, non-volatile memory, flash memory, optical memory, or any other suitable memory for storing software objects and/or computer instructions. The memory 312 can include database components, object code components, script components, or any other type of information structure for supporting the various activities and information structures described in the present disclosure. The memory 312 can be communicably connected to the processors 134 and can include computer code for executing (e.g., by the processor 310) one or more processes described herein.

The building manager 306 can communicate with the user device 302 and the emergency notification system 304. For example, the user device 302 can send user input to the building manager 306 and receive user interfaces from the building manager 306 to be displayed to a user. Furthermore, the emergency notification system 304 can provide emergency notifications to the building manager 306. The building manager 306 can send control signals to the existing building systems 324 and/or the retrofit building systems 326. Furthermore, the building manager 306 can receive operational data from the existing building systems 324 and/or the retrofit building systems 326.

The user device 302, the emergency notification system 304, the building manager 306, the existing building systems 324, and/or the retrofit building systems 326 can communicate via a network. The network can communicatively couple the devices and systems of system 300. In some embodiments, the network is at least one of and/or a combination of a Wi-Fi network, a wired Ethernet network, a ZigBee network, a Bluetooth network, and/or any other wireless network. The network may be a local area network or a wide area network (e.g., the Internet, a building WAN, etc.) and may use a variety of communications protocols (e.g., BACnet, IP, LON, etc.). The network may include routers, modems, servers, cell towers, satellites, and/or network switches. The network may be a combination of wired and wireless networks.

The building manager 306 can be applied to empty facilities, e.g., military barracks, hotels, student dorms, etc. The building manager 306 can be configured to transform noncritical space into critical spaces (e.g., non-ICU (Intensive Care Unit) centers). The building manager 306 could be configured to operate to utilize arenas, civic centers, etc. as temporary spaces for patients. The building system can be configured to provide doctors, nurses, medical technicians, and/or respiratory specialists open access to converted building facilities. The building system can operate facilities as mission-critical to be flexible in addressing a range of disasters and/or emergencies.

The retrofit service 320 can be configured to suggest physical changes to a building, e.g., recommend adding a HEPA filter, a bigger exhaust fan, upgraded airflow, etc. Furthermore, the retrofit service 320 can suggest, e.g., via a user interface, and/or be instructed to implement software changes to a building receive a selection of an operating mode that converts the control strategy and/or control parameters (e.g., temperature setpoint, humidity setpoint, CO2 setpoint, etc.) for a building or an area of a building from a first mode to a second mode. In some embodiments, the retrofit service 320 can implement the systems and methods discussed in U.S. patent application Ser. No. 16/927,759 filed Jul. 13, 2020 and U.S. patent application Ser. No. 16/927,766 filed Jul. 13, 2020 to identify retrofits for a building, the entireties of which are incorporated by referenced herein.

In some embodiments, there may be any number of modes that the operational service 316 can operate in to change the purpose of a space. In some embodiments, the existing building systems 324 and/or the retrofit building systems 326 may be configurable/controllable via the software to implement the physical changes to the building, such as fully or partially autonomously (e.g., in response to user selection/approval). For example, the building may include an HVAC system with multiple configurable filters providing different levels of air quality/contaminant protection, and the operational service 316 may be capable of controlling the HVAC system to add or remove filters to the airflow path.

In some embodiments, the modes are static modes. The static modes can be operator selected to respond to safety issues and/or emergencies via the user interface manager 314. In some embodiments, the modes are dynamic modes. For example, a mode could implement a cost or weighting function that operates to improve quality but also takes cost into consideration. In some embodiments, some modes may provide constraints on other modes. In some embodiments, the operational service 316 implements hierarchical state based control strategy and/or basic comfort through life safety.

In some embodiments, the operational service 316 can operate different modes for different spaces of a building. For example, one space may operate in a first mode while another space may operate in a second mode. In some embodiments, different sets of modes can be applied at different buildings by the operational service 316.

The user interface manager 314 can be configured to provide a user interface for a building operator by causing the user device 302 to display the user interface. The user interface can include one or more push-buttons on a screen. The push buttons can enable a mode. Furthermore, the user interface can indicate whether each mode is automatic or requires manual user selection. The user interface can provide an indication that that each mode that is active is operating correctly. Furthermore, the user interface can provide key parameters for each mode. The user interface can further include a floorplan with current occupancy information. In some embodiments, the building manager 306 can provide occupant tracking information via a user interface via the user interface manager 314.

In some embodiments, the retrofit service 320 is configured to recommend facility improvements, e.g., the retrofit building systems 326, that can be implemented individually or together as a comprehensive retrofit project to maximize safety, efficiency, resilience, flexibility, and/or operational cost savings. The retrofit building systems 326 can be HVAC and/or lighting (e.g., HVAC, lighting, plug load control, building envelope, occupancy-based control), indoor environmental quality (e.g., air filtration, air treatment, indoor air quality sensing, demand controlled ventilation, water treatment), safety and/or security (e.g., fire detection, access control, video surveillance, body temperature detection, occupant tracking and tracing, touchless door and elevator control), building management (e.g., building automation, energy management, smart building management, occupant-based space management and other digital tools and platforms), and/or power distribution (e.g., additional capacity for normal and emergency services, sub-metering, uninterruptable power supplies).

The retrofit building systems 326 can further include distributed energy resources (e.g., solar photovoltaics (PV), electric vehicle (EV) charging, energy storage, combined heat and power, backup generators, micro-grids), remote services (e.g., connecting wireless sensors, smart systems and equipment to remote operations and analytics platforms through internet and high-speed wireless connections), IT infrastructure (e.g., cyber-secure and Health Insurance Portability and Accountability Act (HIPAA) compliant wired and wireless infrastructure with capacity for core and emergency services), emergency response (e.g., flexibility to accommodate device charging, medical equipment, medical gases, supplemental cooling, refrigeration, air filtration, room pressurization), etc.

The operational service 316 can be configured to provide operational sequences that can be enabled automatically or through operator selection using an integrated on-site or web-based interface. The provided automatic or user selected operational selections can be provided by the building system through the operational service 316. The operational service 316 can be configured to provide comfort and/or efficiency. The operational service 316 can be configured to implement standard HVAC and/or central plant control with energy efficient sequences of operation including outdoor economizer control. The operational service 316 can be configured to continuously optimize facility operations using advanced artificial intelligence (AI) and/or machine learning technology at a building and/or central plant level reduce costs, lower energy usage, and/or lower carbon generation.

The operational service 316 can be configured to implement energy demand reduction. The operational service 316 can be configured to utilize available distributed energy generation and/or energy storage to shift energy demand. The operational service 316 can be configured to adjust non-critical temperatures, dim non-safety lighting, and/or turn off non-critical loads. The operational service 316 can be configured to adjust space temperatures to cool building thermal mass to reduce peak demand.

The operational service 316 can be configured to control indoor environmental air quality. The operational service 316 can be configured to control of ventilation air to meet indoor air quality targets (e.g., carbon dioxide ($CO_2$), total volatile organic compound (TVOC), particle matter (PM2.5), etc.) or through people counting and a targeted CFM per person. The operational service 316 can be configured to implement pre-ventilation of the building with clean outdoor air at operator specified times prior to occupancy. The operational service 316 can be configured to reduce ventilation rates when outdoor air quality is temporarily worse than indoor air quality (e.g., outdoor air pollution, wild fire, or a truck dieseling in a loading dock). In some embodiments, the operational service 316 is configured to increase the ventilation rates to provide improved indoor environmental quality and occupant health, wellness, and/or productivity.

The operational service 316 can be configured to implement emergency environmental control. The operational service 316 can be configured to perform a complete shutdown of outdoor air ventilation in response to an emergency situation (e.g., chemical-biological-radiological attack). The operational service 316 can be configured to implement a temporary increase in indoor ventilation due to a detected chemical spill or acute healthcare isolation failure. The operational service 316 can be configured to implement increased ventilation, temperature, and/or humidity to reduce transmission risks of airborne diseases.

In some embodiments, the operational service 316 is configured to divert air through a partial or full bypass high performance air filtration and/or air treatment devices. In some embodiments, the operational service 316 is configured to control differential pressure to provide positive or negative pressure in occupied spaces under critical care or other health emergency situations. In some embodiments, the operational service 316 is configured to implement an application of space level disinfectant light treatment in unoccupied conditions.

In some embodiments, the remote service 318 is configured to implement capabilities remotely in secure, global central operations centers. The remote service 318 can be configured to implement remote inspections of the existing building systems 324 and/or the retrofit building systems 326, e.g., condition-based maintenance, remote troubleshooting, alarm monitoring and/or management. The remote service 318 can be configured to implement building management system (BMS) alarm monitoring, remote troubleshooting, system adjustment, lights-out operations, system and/or application hosting for a BMS.

The remote service 318 is configured to implement remote diagnosis and/or problem resolution for fire and life safety systems, addressable fire alarm notification and testing, multi-site workstation with remote access and advanced diagnostics, in some embodiments. The remote service 318 is configured to implement remote diagnosis and problem resolution, mobile security management, central station monitoring, remote visitor management, cloud-based access control, and/or cloud-based video surveillance for a security system. The remote service 318 can be configured to provide operational and/or control signal data and/or data derived from the operational and/or control signal data (e.g., indications of faults, operational recommendations, etc.) to a user via a user interface provided to the user device 302.

The remote service 318 can be configured to implement monitoring and tracking (e.g., via surveillance system data) of occupants and service providers in compliance with health authority (e.g., Center for Disease Control (CDC), American Society of Heating, Refrigerating and Air-Conditioning Engineers (ASHRAE), and/or World Health Organization (WHO)) guidelines for social distancing, testing and/or tracing, touchless entry and/or access, handwashing, environmental readiness to implement health, and/or safety compliance. The remote service 318 can be configured to ensure that facilities are ready to host occupants with low risk and are continuously operated in a safe, healthy and efficient manner under normal and emergency conditions for advisory services. The remote service 318 can perform the occupant tracking and social distancing operations as described in U.S. Patent Application No. 63/004,269 filed Apr. 2, 2020, in some implementations.

Figure 4:
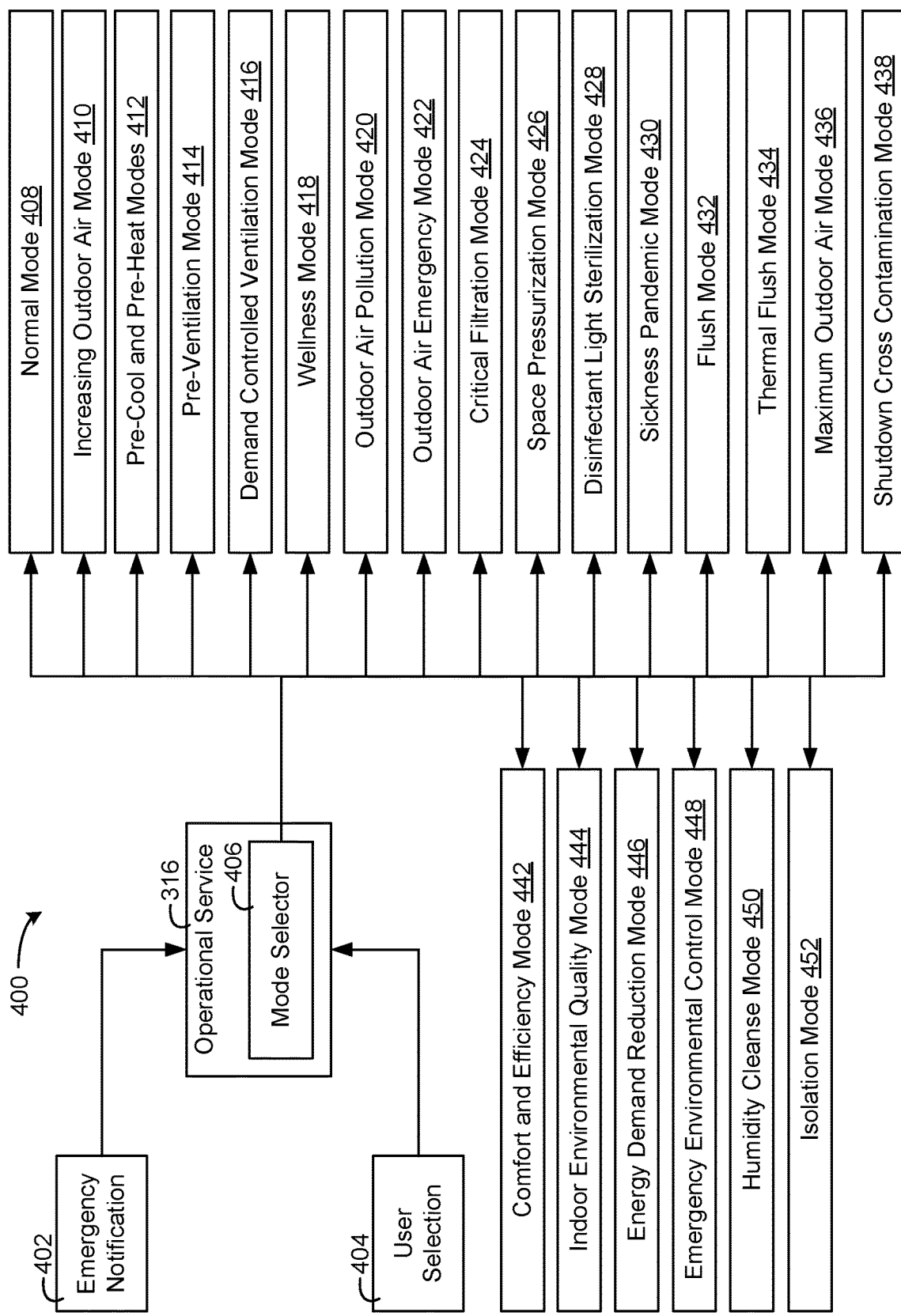
FIG. 4 is a block diagram of the operational service of FIG. 3 selecting one or more of multiple operating modes for operating a building space, according to an exemplary embodiment.

Referring now to FIG. 4, the operational service 316 selecting one or more of multiple available operating modes in a system 400 is shown, according to an exemplary embodiment. Modes 408-452 can be control modes for normal and/or emergency operations. In some cases, not all control modes are implemented in every building. Some buildings may have only a set of the modes 408-452 that the operational service 316 selects from. In some implementations, the selectable modes may be determined based on the capabilities of the building and/or equipment within the building (e.g., the existing building systems 324 and/or the retrofit building systems 326). Examples of modes are described in of U.S. application Ser. No. 16/261,301 filed Jan. 29, 2019, U.S. patent application Ser. No. 16/984,945 filed Aug. 4, 2020, U.S. Provisional Application No. 63/069,532 filed Aug. 24, 2020, the entirety of each of which is incorporated by reference herein.

The operational service 316 includes a mode selector 406 configured to select a mode from the modes 408-452 based on a user selection 404 received via the user device 302 and/or an emergency notification 402 received from the emergency notification system 304. The user selection 404 can be a selection made via a user interface where the user selects one of the modes 408-452. The user interface can be the user interface shown in FIGS. 20A-20K. The emergency notification 402 can be an indication of infection levels in a geographic area, an indication that a user has tested positive for a disease in a building or on a campus, an indication of a chemical spill, an indication of a future potential electric grid outage, an indication of a protest or riot, and/or any other emergency notification. In some embodiments, the mode selector 406 can select multiple modes to be implemented contemporaneously. In some embodiments, the mode selector 406 implements the multiple modes together if the state conditions (e.g., temperature setpoints, $CO_2$ setpoints, etc.) of the multiple modes are met and do not conflict. For example, an economizer mode that operates an economizer of a building and an increased ventilation mode that increases ventilation for a building could operate together at the same time if both conditions are satisfied.

In some embodiments, the modes can be selected by the mode selector 406 via user interactions and/or via with automatic selection based on measured conditions (e.g., via sensors) or received notifications (e.g., from emergency systems). The user selection 404 and/or the emergency notification 402 can indicate prioritization of the modes 408-452. Based on a hierarchy of control goals, the building system can select a control mode of the modes 408-452 based on the prioritization. The hierarchy can define a hierarchy of comfort, energy, health and wellness, resiliency, and safety. The hierarchy can be implemented on a space by space basis within a building. For example, a laboratory may have a hierarchy while an auditorium has a different hierarchy.

In some embodiments, the mode selector 406 can select a mode by implementing a cost function. The cost function can weigh priorities and/or budget information to select a mode from the modes 408-452. Therefore, emergency situations and facility costs can be weighed together. For example, an economizer could be operated in an open mode to lower energy usage but closed in another situation to increase air quality. Similarly, the cost function can be used for selecting a renovation or physical facility upgrade. In some embodiments, the building system can utilize model predictive control (MPC) to select the operating modes.

Figure 19:
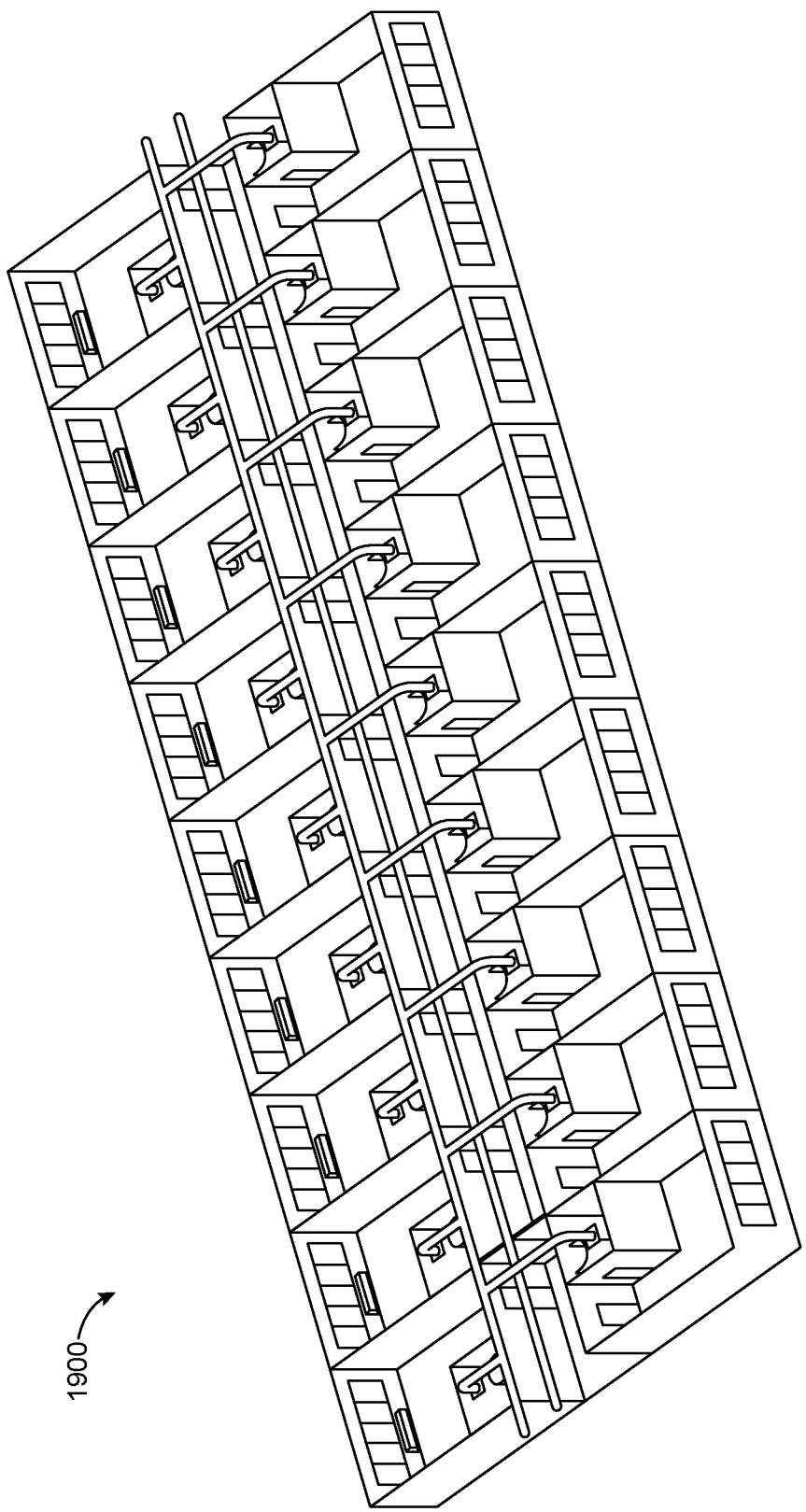
FIG. 19 is a schematic diagram of dormitory rooms of a dormitory where bathroom fans are used to negatively pressurize the dormitory rooms to operate the dormitory rooms as isolation rooms, according to an exemplary embodiment.

The modes can be used to transition a space from its intended use to an alternate use (e.g., a temporary use for emergency response). For example, the operational service 316 could operate to convert a single dorm room into a non-critical medical room if a dorm occupant becomes sick (e.g., as illustrated in FIG. 19). The operational service 316 can be configured to transition a dorm room into a medical room by applying certain operating modes of the modes 408-452 for the room and/or for the entire dormitory. A selection of the transition can cause an increase in ventilation for the room, activation of disinfectant light treatments, pressurization for the room, increased filtration, etc. The selection could be received from a user and/or could be an indication that an occupant of the room is sick received from a supervisor system, a medical testing system, etc. Furthermore, the building system can generate equipment recommendations (e.g., filters, ventilation, etc.) as part of transitioning the space.

In some embodiments, the operational service 316 can operate according to one or a combination of the modes 408-452. One mode of the modes 408-452 may be a normal mode 408. The normal mode 408 can perform building operations when there is no emergency situation at a facility. The normal mode 408 can implement temperature control to control the temperature of the building to comfortable and/or energy efficient levels. If temperature and/or humidity sensors of the building report valid readings, the normal mode 408 can activate an economizer of the building. Furthermore, in the normal mode 408, ventilation systems of the building can be controlled with demand controlled ventilation (e.g., the demand controlled ventilation mode 416) based on CO2 readings if the readings of a CO2 sensor are valid.

One mode of the modes 408-452 may be an increasing outdoor air mode 410. The increasing outdoor air mode 410 can operate to increase outdoor air circulated in a building. Other modes, e.g., the flush mode 432, the thermal flush mode 434, the maximum outdoor air mode 436, all relate to increasing outdoor air and can be sub-modes of the increasing outdoor air mode 410. The objective of the increasing outdoor air mode 410 can be to provide a set amount of outdoor air to the building while still maintaining comfortable occupant conditions. The increasing outdoor air mode 410 may not consider energy consumption so operating in the increasing outdoor air mode 410 may be done when energy consumption is not a concern to a building manager or a building.

The increasing outdoor air mode 410 can be configured to gradually increase the outdoor air fraction, while checking the system for potential negative interactions. The increasing outdoor air mode 410 can be configured to set an outside air fraction, e.g., a fraction of outdoor air to indoor air, and operate based on the fraction. The increasing outdoor air mode 410 can be configured to operate an economizer of a rooftop unit. The increasing outdoor air mode 410 can be configured to modulate an economizer damper to an economize mode and/or activate an exhaust fan if exhaust fan is present in the building. In a single fan system with dampers, the increasing outdoor air mode 410 can operate to modulate an outdoor damper open, while closing a return air damper.

Some interactions may result from operating in the increasing outdoor air mode 410. For example, in a cooling mode, it may not be possible to maintain a discharge air setpoint. The cooling coil may have insufficient capacity to maintain the discharge air setpoint. Furthermore, the cooling coil may have enough sensible capacity to maintain supply air temperature, but the high latent load from the outdoor air may cause the zone humidity to go up. Furthermore, high mixed air temperatures can cause high evaporating temperatures, increasing the capacity of the system. Many thermostatic expansion valves (TXVs) are not sized for this operation, causing high superheat, which overheats the compressor.

In a heating mode, it may be not be possible to maintain a discharge air setpoint (e.g., to low). The heating coil may have insufficient capacity to maintain the discharge air setpoint. Furthermore, mixed air may be close to freezing risking ice on the coil. Furthermore, for systems not originally designed for 100% outdoor air, increasing the outdoor air flow rate may pressurize the building, preventing doors from closing.

The increasing outdoor air mode 410 can be activated or deactivated manually by a user or automatically by the operational service 316. In some embodiments, operating in the increasing outdoor air mode 410 can be activated to increase outdoor air beyond an economical condition manually by a user. The command to initiate the increasing outdoor air mode 410 can be accompanied by a requested duration for the increasing outdoor air mode 410 to be active. At the end of the duration, the operational service 316 can return to the normal mode 408.

Termination of the increasing outdoor air mode 410 by a user can cause the operational service 316 to return to the normal mode 408 as quickly as possible. In some embodiments, the operational service 316 can periodically activate the increasing outdoor air mode 410. The increasing outdoor air mode 410 can be activated periodically to perform an air flush operation every night or between worker shifts. The periodic activation of the increasing outdoor air mode 410 can either be terminated by time (e.g., a two hour duration) or by completion such has CO2 measurement on the return air or temperature and/or relative humidity (RH) target being met in each room.

A command to operate in the increasing outdoor air mode 410 may not override unit shutdowns coming from a unit being indexed off, a life safety sequences (e.g., smoke evacuation indication, a fire alarm, etc.) and/or equipment protection logic (e.g., low temperature limit, high temperature limit, high static pressure safeties, low pressure, high pressure cutouts, coil freeze stats, etc.).

The increasing outdoor air mode 410 can receive inputs such as mixed air temperature and/or preheat valve position (e.g., for freeze protection), heating coil valve and/or cooling coil valve position saturation status to determine if setpoints can be achieved, supply fan saturation status to determine if flow rate setpoints can be achieved, and/or a target value for air flow. The increasing outdoor air mode 410 can operate based on the system type of the building. For example, the increasing outdoor air mode 410 can manipulate free cooling if free cooling is available, operate supply and/or return fan differential flow rate setpoints, operate exhaust fan pressure and/or flow rate setpoints, operate outdoor air, return air, and/or exhaust air damper positions.

The increasing outdoor air mode 410 can generate an alert that is provided to a user via the user device 302. The alert can be sent to an operator when operation of the increasing outdoor air mode 410 is automatically deactivated. Furthermore, an alert can be sent to the operator if the airflow cannot be maintained (e.g., entering maximum air heating and/or maximum air cooling modes). Various other modes of the modes 408-452 can generate similar alerts in response to one or more states not being achievable, e.g., a temperature setpoint, a humidity setpoint, a CO2 setpoint, a flow setpoint, etc.

The operational service 316 can enter the increasing outdoor air mode 410 can be automatically selected by the mode selector 406 in response to the emergency notification 402 indicating a disease pandemic. The mode selector 406 can disable demand control ventilation (DCV) and introduce the maximum possible outdoor air flow through operating in the increasing outdoor air mode 410 for a predefined amount of time or continuously until receiving further notice to exit the increasing outdoor air mode 410. One result of operating in the increasing outdoor air mode 410 may be high energy consumption. In some embodiments, to implement the increasing outdoor air mode 410, the building systems (e.g., fans, coils, pumps, chillers, boilers) may need enough capacity to achieve and maintain setpoints at high outdoor air fractions.

Pre-cool and pre-heat modes 412 can operate to pre-cool a space or pre-heat a space before occupancy and/or before peak energy demand periods. By conditioning a space before the occupancy and/or peak energy demand periods, energy use during the peak energy demand periods, associated with peak energy costs, can be reduced. For example, the pre-cool or pre-heat modes 412 could condition a building early in the morning before peak energy usage times that may be around noon. In this regard, the space can be at the appropriate temperature during the peak energy usage times but the energy used by the system to maintain the appropriate temperature may be small.

The pre-ventilation mode 414 can operate to ventilate a building before occupancy and/or before peak energy demand times that are associated with high energy costs. The demand controlled ventilation mode 416 can operate to facilitate demand based ventilation where the building is ventilated based on sensor measurements, e.g., occupancy levels, CO2 levels, etc. The wellness mode 418 can operate to cause the building to operate for health wellness of occupants of the building.

In the demand control ventilation mode 416, minimum and maximum ventilation air flows can be set to maintain worst-case indoor carbon dioxide level of a set value (e.g., 1,000 ppm) using a proportional-integral (PI) reset. The reset can be tuned so that a minimum and maximum reset is over a particular amount (e.g., an adjustable 200 ppm range) centered on a CO2 setpoint (e.g., 900 ppm to 1,100 ppm). When an economizer sequence is not enabled, an outside air damper can module to maintain outside air flow ventilation at a rate setpoint. When the economizer sequence is enabled, outside air damper can be limited from closing below outside air.

A command to operate in the demand control ventilation mode 416 may not override a unit shutdown coming from the unit being indexed off, a fire alarm contact indicating that the building is experiencing a fire, and/or a low temperature limit being met. The demand control ventilation mode 416 can operate based on a CO2 return air sensor. The demand control ventilation mode 416 can operate at a CO2 setpoint. The demand control ventilation mode 416 can trend state transitions, e.g., entering or exiting the demand control ventilation mode 416, measurements of the CO2 sensors, and damper position. The trended data can be displayed via a user interface. The demand control ventilation mode 416 can generate an alert and provide the alert to a user via the user device 302. The alert can be generated in response to the CO2 raising above 1,200 ppm.

The outdoor air pollution mode 420 can operate to increase clean air in a building. The outdoor air pollution mode 420 can operate to increase air quality above a defined limit. The outdoor air pollution mode 420 can operate based on outdoor PM2.5 levels. In the outdoor air pollution mode 420, an economizer can be disabled and an associated damper can be set to a minimum position.

If the demand controlled ventilation mode 416 is active, the outdoor air pollution mode 420 can operate a minimum flow rate and/or damper position to meet a target indoor quality. Indoor contamination can take priority over outdoor pollution. Therefore increasing airflow may have priority. A command to operate in the outdoor air pollution mode 420 may not be able to override a unit shutdown coming from the a unit being indexed off and/or a fire alarm contact indicating a fire within the building.

The outdoor air pollution mode 420 can receive measurements from outdoor carbon monoxide (CO) sensors, pollen sensors, outdoor PM2.5 sensors, and/or any other type of air quality sensor and operate to reduce outdoor air brought into the building in response to the measured CO going above a CO setpoint and/or the measured PM2.5 going above a PM2.5 setpoint. In response to one of the measurements going above the target, an alert can be generated and provided to a user via the user device 302. In some embodiments, the operational service 316 can enter into the outdoor air pollution mode 420 in response to receiving an emergency notification 402 indicating that outdoor air is not sufficiently clean (or will become unclean in the future). For example, an indication of a vehicle engine running near the facility, a wildfire, a chemical spill, and/or any other emergency could trigger the operational service 316 to enter into the outdoor air pollution mode 420.

Operating in the outdoor air pollution mode 420 can increase energy consumption since a damper associated with the economizer is likely open before entering into the outdoor air pollution mode 420. In some embodiments, the outdoor air pollution mode 420 can operate to reduce a fan speed to decrease outdoor air brought into the building.

The outdoor air emergency mode 424 can be an independent mode that can be entered any time, i.e., there are no transitions from other modes that would delay entering the outdoor air emergency mode 422. Upon manual command to enter the outdoor air emergency mode 424, the outdoor air emergency mode 424 can operate the outside air damper to a closed position and set ventilation for the building to 100% recycle. All exhaust fans of the building, e.g., kitchen, bathroom, etc. can be shutdown.

The operational service 316 can be entered in response to a severe chemical, biological, radiological, or other hazard that requires protective measure to the people in the building. For example, a detected chlorine spill near the building could cause the operational service 316 to enter the outdoor air emergency mode 422. The command to enter the outdoor air emergency mode 422 may not override unit shutdowns coming from a fire alarm contact of a fire alarm system indicating that a fire is present within the building. Although indoor air quality may gradually decrease when operating in the outdoor air emergency mode 422, the building may be protected from the unclean outdoor air. In some embodiments, the outdoor air emergency mode 422 shuts down all HVAC equipment for a building.

The critical filtration mode 424 can activate filtration systems of a building to filter air that is either recirculated and/or brought into the building. The space pressurization mode 426 can operate to pressurize a particular space of the building, e.g., through exhaust fans and/or supply air delivery. The space pressurization mode 426 can be activated to cause a room of a building to become an isolation room to house sick individuals.

In the disinfectant light sterilization mode 428, disinfectant light can operate to disinfect a spaces of a building during disinfectant cycles when spaces are unoccupied. The operational service 316 can enter the disinfectant light sterilization mode 428 upon user request or periodically on a schedule. The disinfectant light sterilization mode 428 may operate when occupancy sensors confirm that a space of the building being treated is unoccupied via occupancy sensors. In some cases, some types of disinfectant light can operate when occupants are present. In some cases, disinfectant light generated in air ducts can be used to clean air in an air duct. The disinfectant light sterilization mode 428 is described in greater detail in FIGS. 6-7. Disinfection light can be any light of any intensity and/or wavelength that can kill bacteria and/or viruses. For example, disinfection lighting can be ultraviolet, near ultraviolet, ultraviolet C (UVC), bipolar ionization, or any other type of lighting suitable for disinfecting surfaces and/or killing viruses or bacteria The sickness pandemic mode 430 (e.g., a mode for mitigating disease infection in a building) can be entered by the operational service 316 in response to an infectious disease spreading. The sickness pandemic mode 430 can operate to reduce infection in a building by flushing air, operating at a temperature and/or humidity where it is less likely that the disease will spread, using light disinfection, etc. The sickness pandemic mode 430 can be entered manually based on user request or automatically.

The flush mode 432 can cause building systems to operate to increase outdoor air brought into the building. The flush mode 432 can operate in response to a manual command during an unoccupied mode. The flush mode 432 can operate to periodically increase air circulation for a defined duration. The flush mode 432 can operate a central air unit to provide maximum outdoor air for the building. Furthermore, the flush mode 432 can operate terminal units of the building to force air to a certain level to ensure air distribution occurs in each room. In particular, the flush mode 432 can prevent the terminal unit of a zone (e.g., VAV unit) from closing when a temperature setpoint is met. If the central air unit is not able to serve maximum air to all terminal units, the flush mode 432 can operate terminal units of several zones one after another, e.g., operate the terminal units to flush one zone at a time. In some embodiments, several sensors of various areas of the building can be used to terminate air flush.

In some embodiments, once the flush performed by the flush mode 432 is complete, the operational service 316 can transition into a temperature or humidity control mode, e.g., a normal operating mode such as the normal mode 408. A command to enter the flush mode 432 may not override a unit shutdown coming from a unit indexed off, a fire alarm contact indicating a fire in the building, and/or a low temperature limit being met or exceeded. The flush mode 432 can be configured with a duration parameter, indicating how long the flush should be performed for, and a schedule parameter indicating how frequently and/or at what times the flush should be performed at. In some embodiments, the operational service 316 can calculate an outdoor airflow at each terminal unit and/or at an AHU. An alert can be generated and provided to a user via the user device 302 indicating which room or AHU did not see the appropriate change in outdoor airflow.

In some embodiments, the operational service 316 can perform a daily flush before a building is occupied. The flush mode 432 can operate for a minimum time period, e.g., two hours, to introduce outside air into each building space before the building is occupied. Performing the flush mode 432 may increase overall energy consumption of a building. In some embodiments, if the operational service 316 detects, based on outdoor air flow rates for each are of a building, and an appropriate level of outdoor air has been introduced to each space, the operational service 316 can terminate the flush mode 432 before the minimum operation time in order to reduce energy usage.

The thermal flush mode 434 can operate to increase outdoor air and regulate temperature and humidity of a building to destroy viruses or bacteria. The thermal flush mode 434 can, when activated during an unoccupied period, periodically circulate maximum air for a particular period of time. The thermal flush mode 434 can reduce viruses and/or bacteria within a building prior to the building being occupied.

In some embodiments, the thermal flush mode 434 can provide an elevated humidity and/or temperature flush of indoor spaces a predefined amount of time (e.g., two hours) before the spaces are occupied. In some cases, increased humidity may reduce the spread of disease more than increased temperature. In some embodiments, the thermal flush mode 434 can increase outdoor ventilation and/or exhaust flow rates to particular levels (e.g., maximum levels). In some embodiments, the thermal flush mode 434 can increase a space temperature to a particular level (e.g., 74 degrees Fahrenheit) and/or maintain a minimum humidity (e.g., 50% RH).

In some embodiments, the retrofit service 320 can recommend that a building be retrofitted to allow the operational service 316 to increase filtration, maximize ventilation, and/or implement controls to increase air flow rates, increase supply air temperatures, and/or increase room setpoints. The thermal flush mode 434 can reduce infections arising from airborne contamination and provide a healthy indoor environment for occupants.

The thermal flush mode 434 can be configured to command a central air system to provide maximum outdoor air and adjust discharge air conditions based on a temperature and/or humidity setpoint. The thermal flush mode 434 can be configured to force minimum air to a certain level at each terminal unit to ensure air distribution occurs in each room.

The thermal flush mode 434 can also change temperature and humidity setpoints at each terminal unit in batches, in order to ensure air flow can occur at each terminal. If a central air system is not able to serve maximum air to all terminal units, several zones need to be activated one after another. Several sensors of the various zones could be used to terminate the thermal flush mode 434. The duration at which the thermal flush mode 434 is operated can be performed based on the size of a building (e.g., square footage of the building) to ensure that the entire building is flushed.

The thermal flush mode 434 may not operate if there is a unit shutdown that is caused from a unit being indexed off, a fire alarm contact indicating that a fire is present in the building, and/or a lower temperature limit being met. The thermal flush mode 434 can be configured to receive zone temperature measurements from zone temperature sensors and/or zone humidity values from zone humidity sensors. The thermal flush mode 434 can operate to perform the flush for a particular duration, to meet particular temperature setpoints, at a particular schedule, and/or to meet particular humidity setpoints. The thermal flush mode 434 can operate based on the temperature measurements, the humidity measurements, and/or a calculated outdoor airflow at each terminal unit and/or at an AHU.

The thermal flush mode 434 can generate an alert and provide the alert to a user via the user device 302. The alert can indicate each room or AHU that did not meet a particular change of airflow and/or did not meet a particular temperature and/or humidity setpoint. Operating in the thermal flush mode 434 can increase energy consumption.

The maximum outdoor air mode 436 can operate to maximize outdoor air entering the building. In some embodiments, the mode selector 406 can cause the building to operate in the maximum outdoor air mode 436 a particular amount of time after the building is occupied, e.g., an hour after the building is occupied.

The shutdown cross contamination mode 438 can be an independent mode that can be entered at any time. The shutdown cross contamination mode 438 can shut down components between a return air source and a supply air source of an air system of a building, e.g., heat recovery wheels. Furthermore, the shutdown cross contamination mode 438 can activate a bypass mode, e.g., operating a bypass damper associated with the heat recovery wheel to bypass the recovery wheel.

The shutdown cross contamination mode 438 can generate an alert to an operator at an interval (e.g., every month) via the user device 302. The alert can remind the operator that the shutdown cross contamination mode 438 is active. The reminder can be generated for any active mode of the modes 408-452. If there is no bypass mode, the pressure drop across the wheel can reduce the efficiency of the system.

In some embodiments, as an alternative to operating in the shutdown cross contamination mode 438, a user can remove the recovery wheel and replace the recovery wheel with a runaround coil or duct. In some embodiments, the shutdown cross contamination mode 438 can enable the wheel when the building is unoccupied and disable the wheel a particular amount of time before the building is occupied (e.g., 30 minutes).

In the comfort and efficiency mode 442, the building can be operated with standard control sequences to provide efficient and comfortable space control. An economizer can operate to use 100% outside air during times when it can minimize mechanical cooling. The comfort and efficiency mode 442 can optimize control of VAV systems using static pressure resets.

In the indoor environmental quality mode 444, ventilation rates can be reduced when outdoor air pollution (e.g., PM2.5) exceeds public health safety limits. Ventilation can be controlled based on $CO_2$ levels, occupancy counts, and/or scheduled occupancy. The system can decrease $CO_2$ setpoint or increase minimum ventilation rates during occupied hours. The system can determine when it is less expensive to filter air through a high efficiency filtration system (e.g., a HEPA filter) as compared to ventilation.

The energy demand reduction mode 446 can turn off power and environmental control to non-critical loads and spaces during stand-by power situations. The mode 446 can cycle non-critical loads, temperature setpoint changes, dim lights, plug load management, and reduce ventilation (e.g., at multiple levels at time periods).

In the emergency environmental control mode 448, can increase ventilation rates prior to occupancy, perform a thermal flush by increasing temperature, humidity, and/or ventilation prior to occupancy, provide positive pressurization in healthcare transition spaces and/or quarantine spaces to prevent the spread of disease, activate disinfectant light systems to turn on room level disinfectant light cycles when the spaces are unoccupied, and/or implement emergency ventilation shut-offs to turn off outdoor ventilation under emergency conditions (e.g., chemical, biological, radioactive events, sand storms, etc.).

Figure 14:
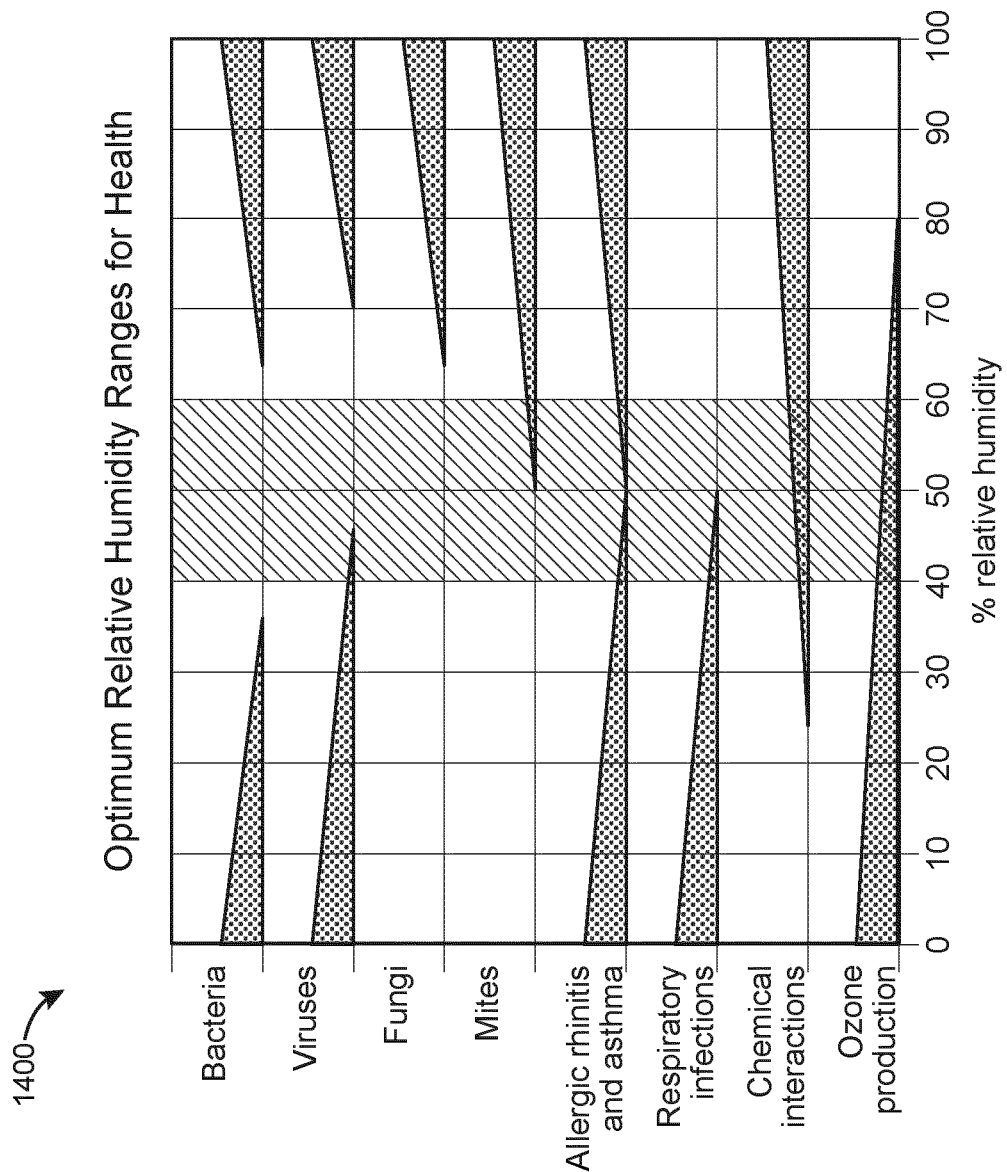
FIG. 14 is a chart illustrating health risk levels for human exposure to various diseases and particulates at various humidity values in a building, according to an exemplary embodiment.

The humidity cleanse mode 450 can be configured to increase the humidity of a building and/or a building space to a particular level to decrease a likelihood of a spread of an infectious disease within the building and/or building space. When the operational service 316 selects the humidity cleanse mode 450, the building system controller 322 can operate a dehumidifier to increase humidity to a particular level. The humidity cleanse mode 450 can select a humidity setpoint based on capabilities of a humidifier and/or based on stored humidity setpoint ranges known to destroy or prevent the spread of an infectious disease. Such ranges of humidity setpoints are shown in FIG. 14.

In some embodiments, the humidity cleanse mode 450 can be active for a predefined amount of time, or at a particular humidity level, to prevent the growth of mold or condensation on windows in the winter that can occur from high humidity levels. In some embodiments, retrofit service 320 can make retrofit recommendations for increasing the capacity of a humidifier so that the humidity cleanse mode 450 can operate and/or operate at a higher humidity level.

The modes 408-452 include an isolation mode 452. The isolation mode 452 can be a mode that operates a room or rooms of a building as disease isolation rooms, e.g., rooms that isolate a sick individual from other people. The isolation mode 452 can include executing the space pressurization mode 426 to pressurize the room negatively compared to other spaces of the building. Furthermore, the isolation mode 452 can have an occupancy schedule, e.g., times at which sick individuals are located in the space. Between occupancy, e.g., one sick individual leaving and another individual moving into the space, the isolation mode 452 can cause the space to be flushed, e.g., operate the flush mode 432 and/or the thermal flush mode 434. Furthermore, in between occupants, the isolation mode 452 can operate the disinfectant light sterilization mode 428 for the space.

Figure 5:
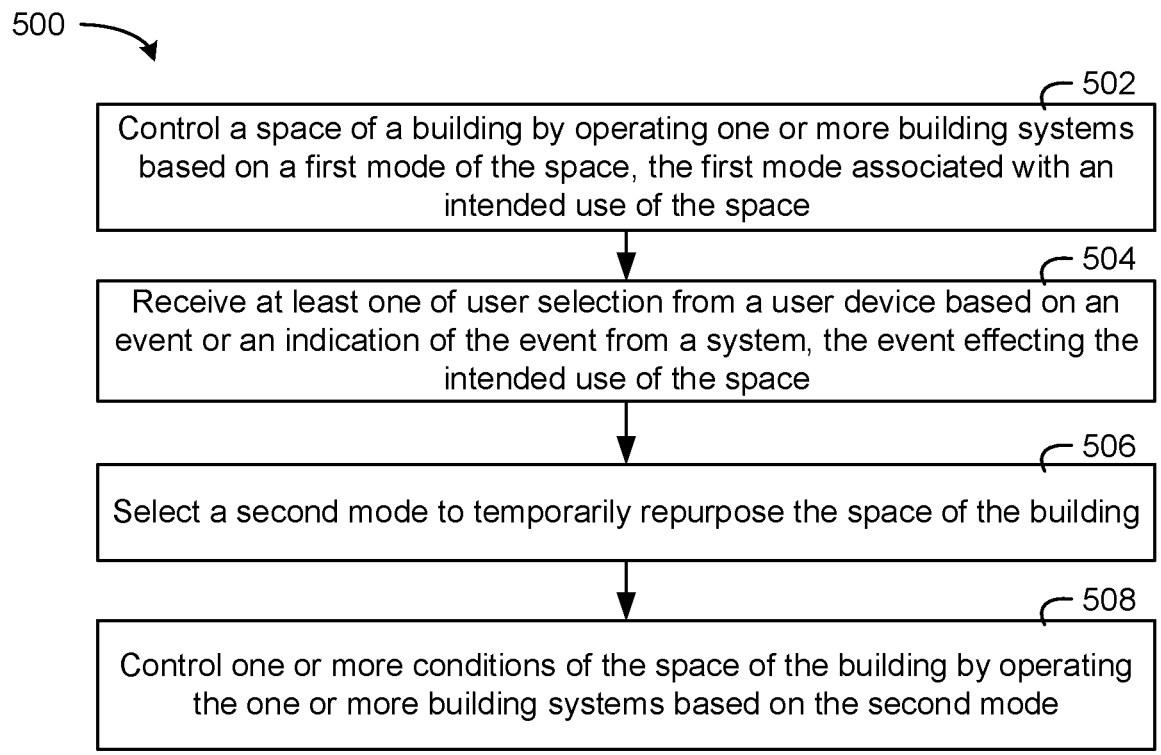
FIG. 5 is a flow diagram of a process of selecting a mode for a zone of a building that can be performed by the operational service of FIG. 3, according to an exemplary embodiment.

Referring now to FIG. 5, a flow diagram of a process 500 of selecting a mode for a zone of a building that can be performed by the operational service of FIG. 3, according to an exemplary embodiment. The process 500 can be applied to a zone within a building and/or to an entire building. The building manager 306 can be configured to perform some and/or all of the process 500. In some embodiments, the operational service 316 can perform some and/or all of the process 500. Any computing device or system as described herein can be configured to perform the process 500.

In step 502, the operational service 316 can control a space of a building by operating one or more building systems based on a first mode of the space, the first mode associated with an intended use of the space. For example, the intended use of the space may be to provide a comfortable and energy efficient space for building occupants. The operational service 316 could operate the space in the normal mode 408, the pre-cool and/or pre-heat modes 412, the demand controlled ventilation mode 416, and/or any other mode or combination of the modes 408-452.

In step 504, the operational service 316 can receive at least one of the user selection 404 from the user device 302 or the emergency notification 402 from the emergency notification system 304. The received selection or notification can indicate a change to an intended use of the space. The selection can be performed in response to an emergency occurring. In some embodiments, the notification can be an indication of the emergency. The emergency can be a disease, severely polluted air, a storm, etc. For example, the space transitioning to a new use, e.g., a dorm room to operate as an isolation room, a building to operate to prevent the spread of disease among building occupants, etc. In some embodiments, the operational service 316 can implement a transition based on a schedule and/or in response to receiving a sensor.

In step 506, the operational service 316 can select a second mode to temporarily repurpose the space of the building. For example, the operational service 316 could perform the space pressurization mode 426 for an isolation room of the building. Furthermore, various modes to reduce the spread of infection, e.g., the flush mode 432, the thermal flush mode 434, the maximum outdoor air mode 436, the humidity cleanse mode 452, etc. can be operated. In step 508, the operational service 316 can operate the building systems by operating the one or more systems with the second mode.

Figure 6:
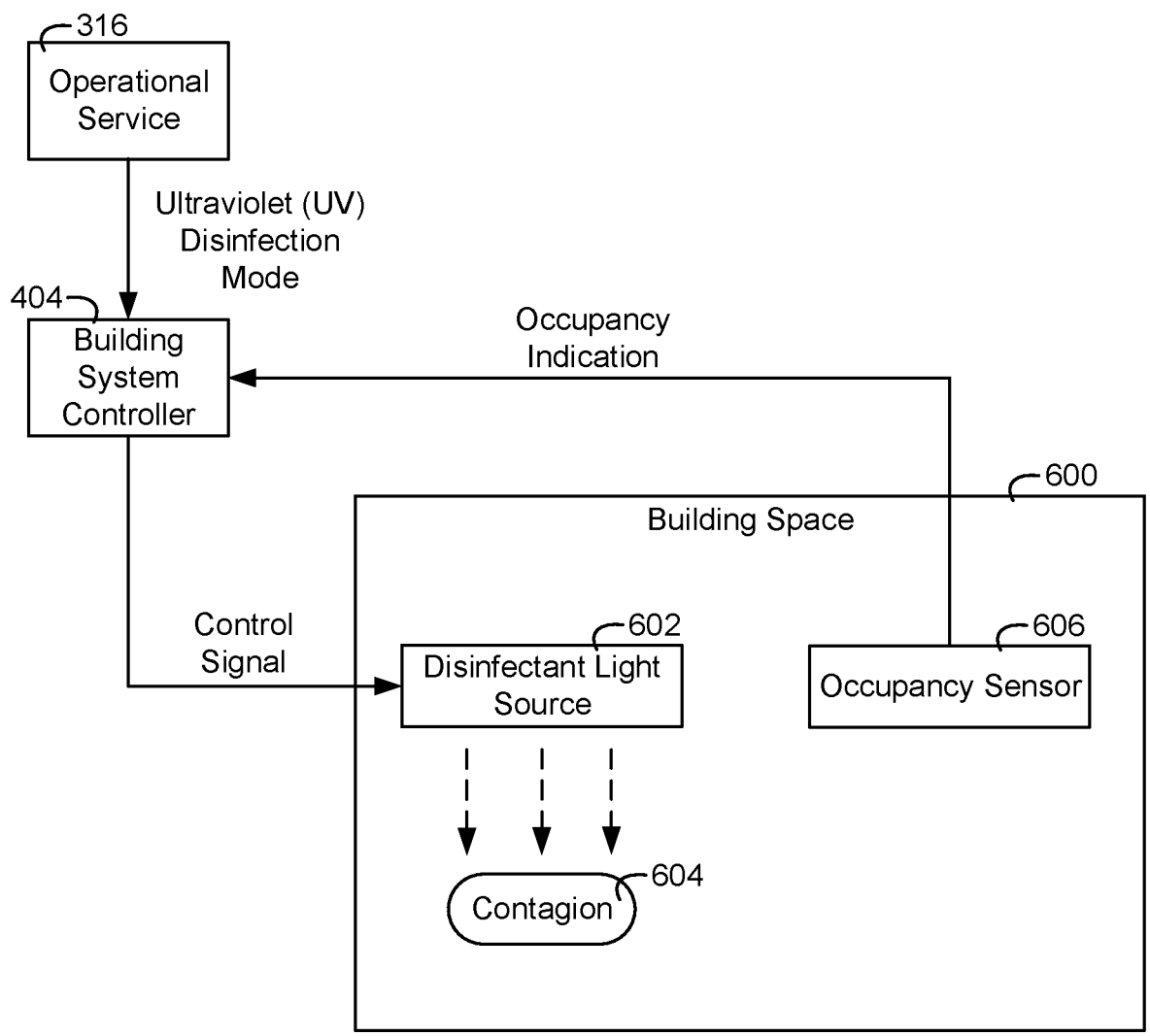
FIG. 6 is a block diagram of a building space operating in a disinfectant light mode, according to an exemplary embodiment.

Referring now to FIG. 6, a block diagram of a building space 600 operating in an disinfectant light sterilization mode 428 is shown, according to an exemplary embodiment. In some embodiments, the disinfectant disinfection can be applied for high traffic areas of a building. Disinfectant light kills a contagion 604, e.g., bacteria and viruses. The building space 600 can include a disinfectant light source 602 configured to perform light disinfection. The disinfectant light source 602 can include one or more disinfectant lights that are installed in the building space 600, e.g., may be a troff fixture in a ceiling. The operational service 316 can cause the building system controller 322 to periodically activate the disinfectant lights as part of a disinfection cycle. The building system controller 322 can be configured to verify, via the occupancy sensor 606, the space is unoccupied before activating the disinfectant light source 602.

The frequency and duration of the disinfection cycle could be adjusted based on the perceived risk and type of the contagion 604. For example, in an elevator, disinfectant lights would be installed in the ceiling. The building system controller 322 can be configured to periodically put the elevator in a self-clean mode. During the self-clean mode, the elevator would be taken out of service, occupancy sensors would ensure it is unoccupied and the disinfectant light source 602 would be activated. Once the disinfection is complete, the elevator can return to normal service.

As another example, in a hospital room, the disinfectant light source 602 could be activated in a patient room between patient occupancy. The building system controller 322 can be configured to ensure the room is unoccupied via the occupancy sensor 606 before disinfection and would deactivate the lights should someone enter the room. In a restroom, the disinfectant light source 602 could be activated during periods when the space is unoccupied. In some embodiments, the disinfectant light source 602 would be disabled when a user enters the room. In some embodiments, conference rooms could be setup to do a disinfection cycle between meetings.

In some embodiments, the disinfectant light source 602 would be installed such that the light is focused on high contact areas. For example, the buttons in an elevator, door handles, coffee pots, copy machines, etc. Furthermore, given that most occupants rely on artificial lighting in most buildings, most surfaces that people are likely to touch are (by design) exposed to light emitted by lighting fixtures. In some embodiments, lights of light fixtures could be fitted with replacement bulbs or fixtures with a dual wavelength capability, e.g., lights that transmit visible light when a space that the lights are located in is occupied and disinfecting light when not.

Figure 7:
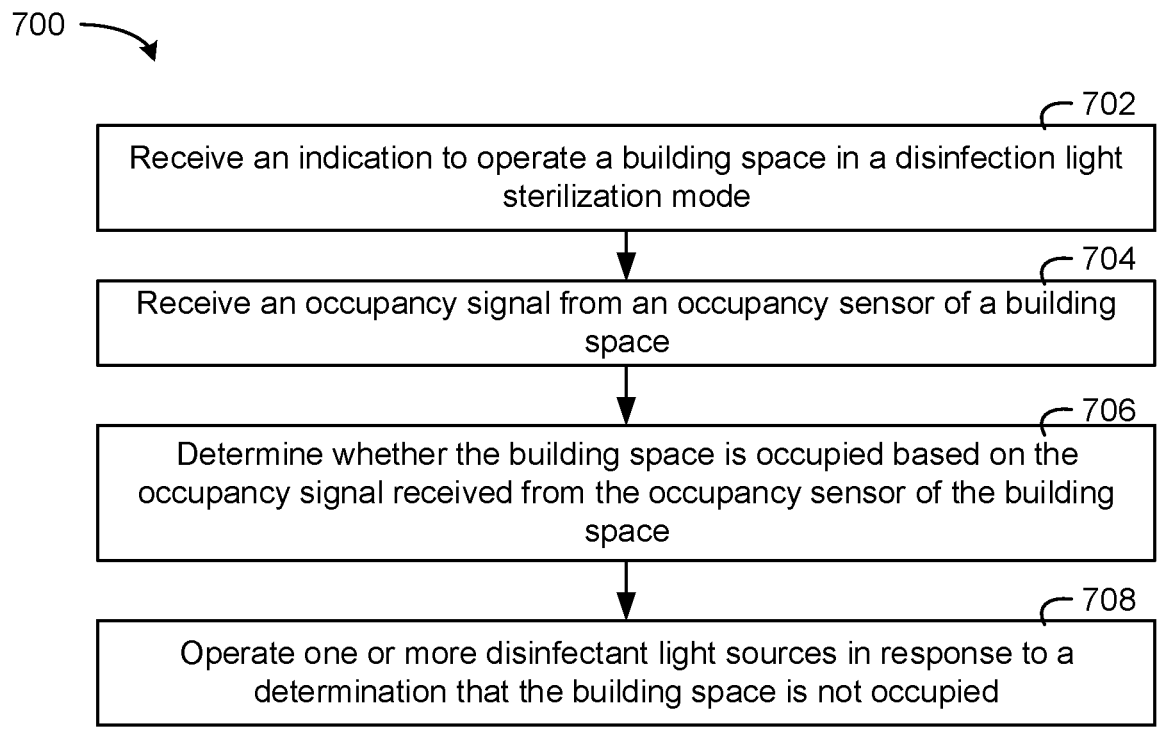
FIG. 7 is a flow diagram of a process of operating the building space in the disinfectant light mode that can be performed by the building manager of FIG. 3, according to an exemplary embodiment.

Referring now to FIG. 7, a flow diagram of a process 700 is shown of operating the building space in the light disinfection mode that can be performed by the building manager of FIG. 3, according to an exemplary embodiment. The process 700 can be applied to a zone within a building and/or to an entire building. The building manager 306 can be configured to perform some and/or all of the process 700. In some embodiments, the operational service 316 and/or the building system controller 322 can perform some and/or all of the process 700. Any computing device or system as described herein can be configured to perform the process 700.

In step 702, the operational service 316 can receive an indication to operate the building space in the disinfectant light sterilization mode 428. In some embodiments, the operational service 316 can cause the building system controller 322 to operate in the disinfectant light sterilization mode 428. In step 704, the building system controller 322 can receive an occupancy signal from the occupancy sensor 606 indicating that the building space is not occupied.

In step 706, the building system controller 322 can determine that the building space is not occupied based on the occupancy signal. In step 708, the building system controller 322 can operate the disinfectant light source 602 to destroy the contagion 604. In some embodiments, the building system controller 322 performs the disinfection periodically, e.g., every night.

Figure 8:
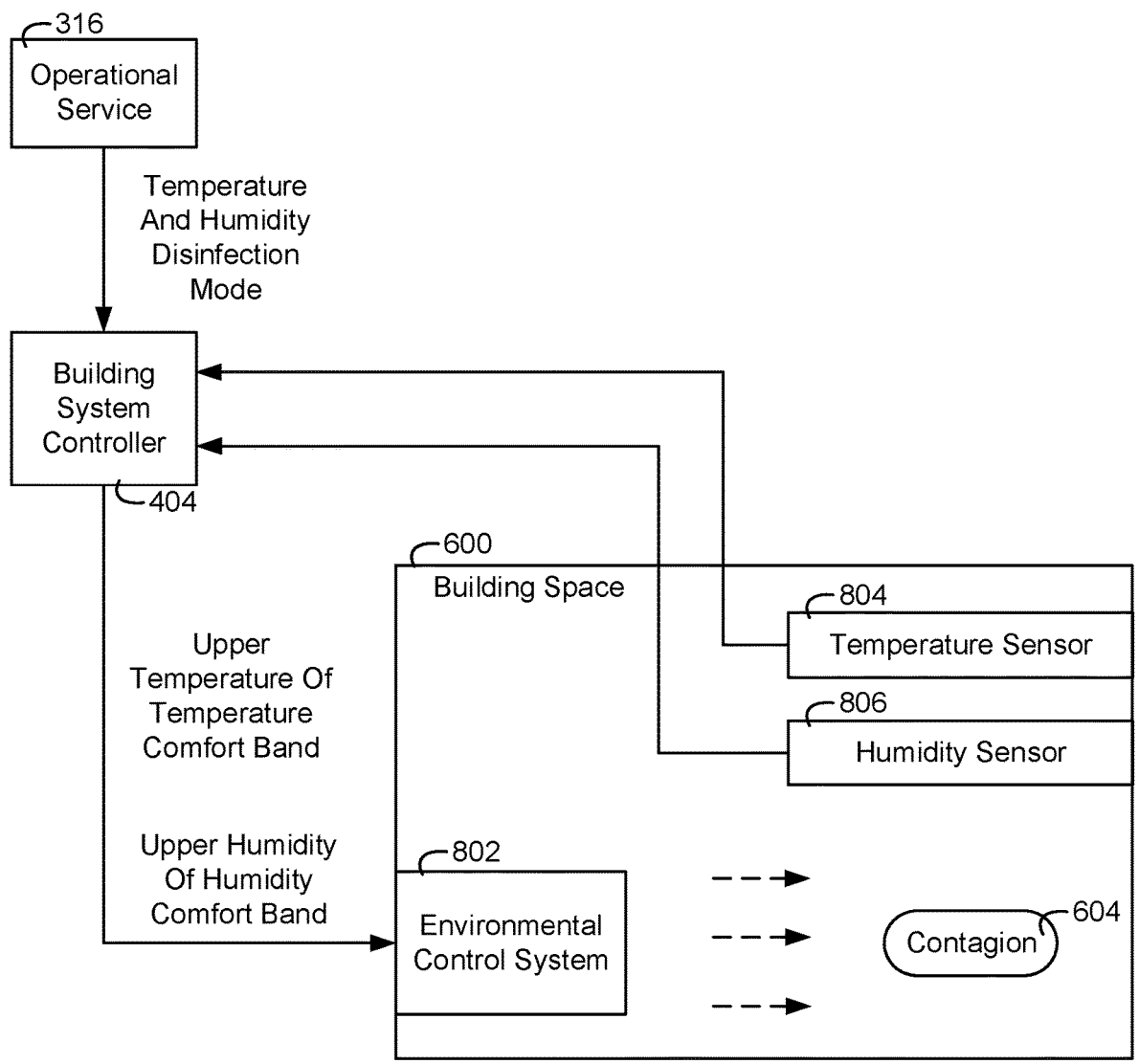
FIG. 8 is a block diagram of a building space operating in a temperature and humidity disinfection mode, according to an exemplary embodiment.

Referring now to FIG. 8, the building space 600 operating in a temperature and humidity disinfection mode is shown, according to an exemplary embodiment. The disinfection mode can be the thermal flush mode 434 described with reference to FIG. 4. The thermal flush mode 434 can increase airflow, humidity levels, temperature levels, etc. The building system controller 322 can operate an environmental control system with temperature and/or humidity to limit the spread of infectious disease. The building system controller 322 can receive temperature measurements of a temperature sensor 804 of the building space 600 and humidity measurements of a humidity sensor 806 within the building space 600 and control the environmental control system 802 based on a high temperature setpoint, a high humidity setpoint, and the measurements of the temperature sensor 804 and the humidity sensor 806.

The environmental control system 802 can be local within the building space 600 as shown in FIG. 8 and/or can be located in whole or in part outside the building space 600. The environmental control system 802 can heat air, cool air, and/or control humidity of the building space 600. The environmental control system 802 can be the same as, or similar to the existing building systems 324 and/or the retrofit building systems 326.

The seasonality of influenza may be driven by humidity. Furthermore, influenza infection rates may be significantly higher at low humidity. The building system controller 322 can be configured by the operational service 316 to control the temperature and humidity within the building space 600 to maximize personal comfort while minimizing energy cost. The building system controller 322 can be configured to consider other factors related to the influenza when controlling the environment in the building space 600.

The building system controller 322 can be configured to implement control strategies which factor the control of the contagion 604. For example, during the winter, the building system controller 322 can be configured to control humidity to the lower end of the comfort zone to save energy. In some embodiments, if the building system controller 322 increases the humidity to the upper limit of the comfort zone, the building system controller 322 can be configured to the increase productivity due to fewer illnesses offset the energy costs. Furthermore, during the unoccupied hours, the building system has an opportunity to preheat and humidify the space to levels above the comfort limit that would limit the viability of viruses on surfaces.

Figure 9:
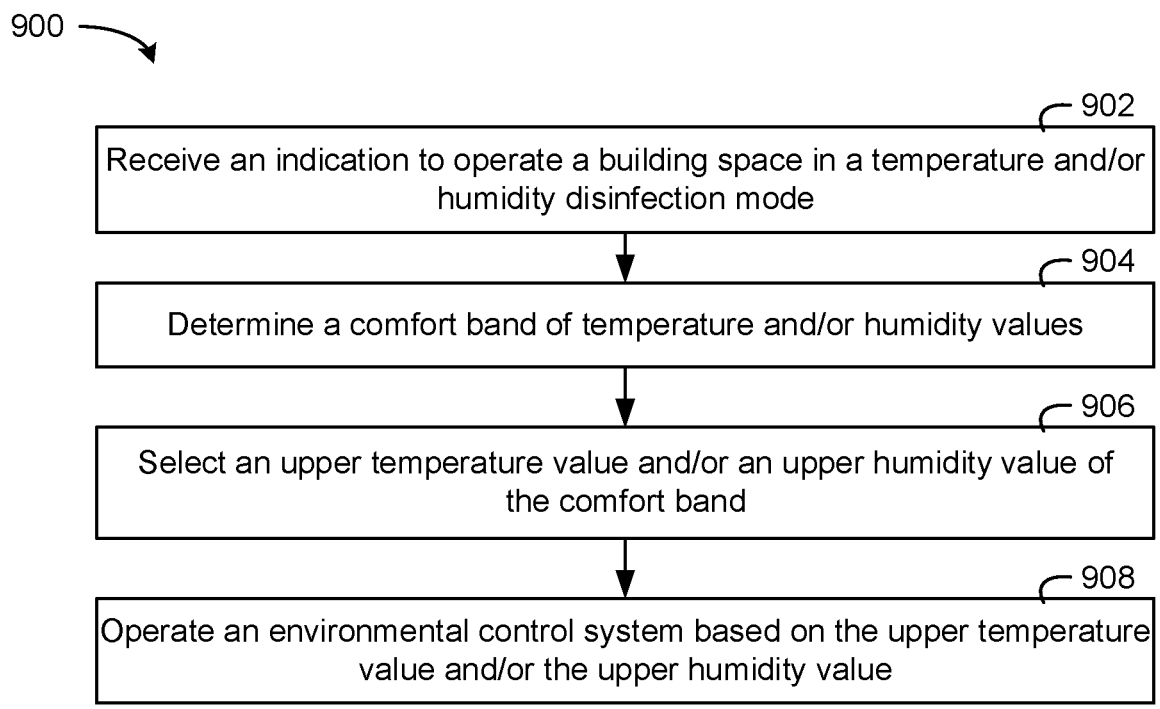
FIG. 9 is a flow diagram of a process of operating the building space in the temperature and humidity disinfection mode that can be performed by the building manager of FIG. 3, according to an exemplary embodiment.

Referring now to FIG. 9, a flow diagram of a process 900 of operating the building space in the temperature and humidity disinfection mode that can be performed by the building manager 306 is shown, according to an exemplary embodiment. The process 900 can be applied to a zone within a building and/or to an entire building. The building manager 306 can be configured to perform some and/or all of the process 900. In some embodiments, the operational service 316 and/or the building system controller 322 can perform some and/or all of the process 900. Any computing device or system as described herein can be configured to perform the process 900.

In step 902, the operational service 316 can receive an indication to operate the building space 600 in the temperature and/or humidity disinfection mode. The temperature and/or humidity disinfection mode can be the same as, or similar to, the thermal flush mode 434. In step 904, the operational service 316 can determine a comfort band of temperature and humidity values. The comfort band may be based on an outdoor air temperature.

In step 906, the operational service 316 can select an upper temperature value and an upper humidity value of the comfort band. The upper temperature value and the upper humidity value can reduce the spread and/or destroy the contagion 604. In step 908, the building system controller 322 can operate the environmental control system 802 based on the upper temperature and the upper humidity. The building system controller 322 can operate based on measurements received from the temperature sensor 804 and the humidity sensor 806.

Referring now to FIG. 10, a chart 1000 of building system capabilities for normal and emergency operations is shown, according to an exemplary embodiment. Chart 1000 illustrates building capabilities for normal and emergency operations. In some cases, solutions can be tailored to facility type and project complexity. Investments can be used to improve the health, safety, efficiency, resilience, and/or technology infrastructure in higher education dormitories while providing flexibility to support community emergency response operations. The retrofit service 320 can generate recommendations for retrofitting a building with various subsystems based on the tags of the various subsystems shown in the chart 1000 and/or based on a retrofit goal. For example, if the goal of retrofitting a building is to increase energy savings, the retrofit service 320 can consider remote services and/or distributed energy resources for retrofit since they are both tagged as energy savings in the chart 1000.

The retrofit service 320 can be configured to quickly identify and obtain available investments. The retrofit service 320 can be configured to facilitate modernizing campus dormitories to improve health and safety, technology capabilities, and/or improving overall attractiveness to increase student enrollment. The retrofit service 320 is configured to update facilities to quickly support temporary use for emergency response to public health and other disaster recovery situations, in some embodiments. The retrofit service 320 can be configured to facilitate accelerating completion of deferred maintenance and campus master planning projects.

The retrofit service 320 can be configured to determine retrofit solutions ranging from upgrades to comprehensive facility renovation and construction projects leveraging streamlined procurement and financing vehicles. The retrofit service 320 can be configured to facilitate retrofits for higher education dormitories and/or other facility types (e.g., K-12 schools). The retrofit service 320 can store instructions for retrofitting dormitory configurations (e.g., building age, bathroom configuration, central versus distributed air conditioning). The instructions can address retrofit solutions applications depending on dormitory configuration and retrofit complexity. In some embodiments, non-healthcare, non-critical healthcare and critical healthcare emergency response can be retrofitted by the retrofit service 320 with upgrades to existing facilities as well as major renovation and construction projects Referring now to FIG. 11, a chart 1100 illustrating a probability of infection of various diseases based on a level of clean air changes per hour is shown, according to an exemplary embodiment. The chart 1100 indicates probabilities of infection for a one hour exposure of an occupant in a building or building space. HVAC systems can be operated to maintain setpoints that provide occupant comfort and safety. However, disease pandemics can place requirements on buildings to make the buildings resilient to the spread of infectious agents. There are two fundamental transmission pathways for the spread of infectious diseases, airborne and from surface contact.

The Wells-Riley equation can be used to predict the probability of airborne infections as a function of the infection type (e.g., influenza, SARs, COVID, COVID-19, etc.), the number of people in a space, the number of infectors in a space, the exposure times, and the volumetric flow rate of clean air being provided into a space. The probability of new infections attributed to surface contact depends on many other non HVAC related factors including how long the infection remains viable over time on a surface, the surface cleaning frequency, effectiveness of human factors such as hygiene, and how often the face is touched.

The Wells-Riley equation can be defined as:

$$P_{infection} = \frac{cases}{susceptibles} = 1 - e^{-\frac{Iqpt}{V_{clean}}}$$

where $P_{infection}$ is the probability of infection, cases is the number of infection cases, susceptibles is the number of susceptible individuals, l is the number of infector individuals, p is the pulmonary ventilation rate of a person [m³/hr] (e.g., typically 0.48 m³/hr), q is the quanta generation rate [1/hr-person], depending on the infectious agent, t is the exposure time in hours, and $\dot{V}_{clean}$ is the room ventilation rate with clean air [m3/hr].

In the case of airborne infections, the clean air volumetric flow rate is directly controllable by the HVAC system, e.g., by the operational service 316, and it has an exponential impact on the spread of infectious diseases as shown below for a typical commercial office building. The chart 1100 represents four different infectious diseases, the common cold (e.g., rhinovirus), influenza, and SARS-CoV-2 (a close relative to CoV-19), and COVID-19 for a one hour exposure time to one infected individual. The ordinate is the probability of a new infection (on a range from zero to one) and the abscissa is the number of clean air changes per hour (CACH). The reduction in disease spread is highest at high CACH. A VAV system may have between 1 and 6 CACH.

Figure 11:
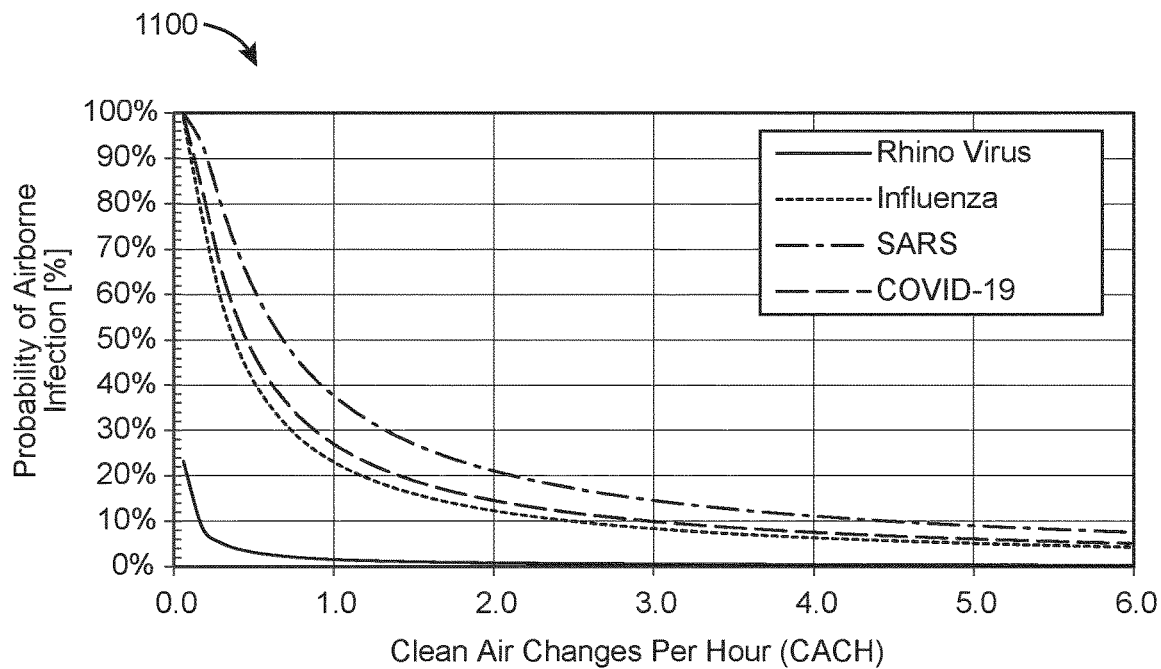
FIG. 11 is a chart illustrating a probability of infection in a building of various diseases based on a level of clean air changes per hour performed in the building, according to an exemplary embodiment.

As shown in FIG. 11, increased ventilation for a building decreases the probability of infection. However, the air changes are clean air. Outdoor air is not necessarily clean air. Outdoor air may only be clean during certain situations, e.g., when pollution levels or pollen levels are low. Furthermore, outdoor or recirculated air can be filtered and/or cleaned via filters and/or disinfectant light treatment.

Figure 12A:
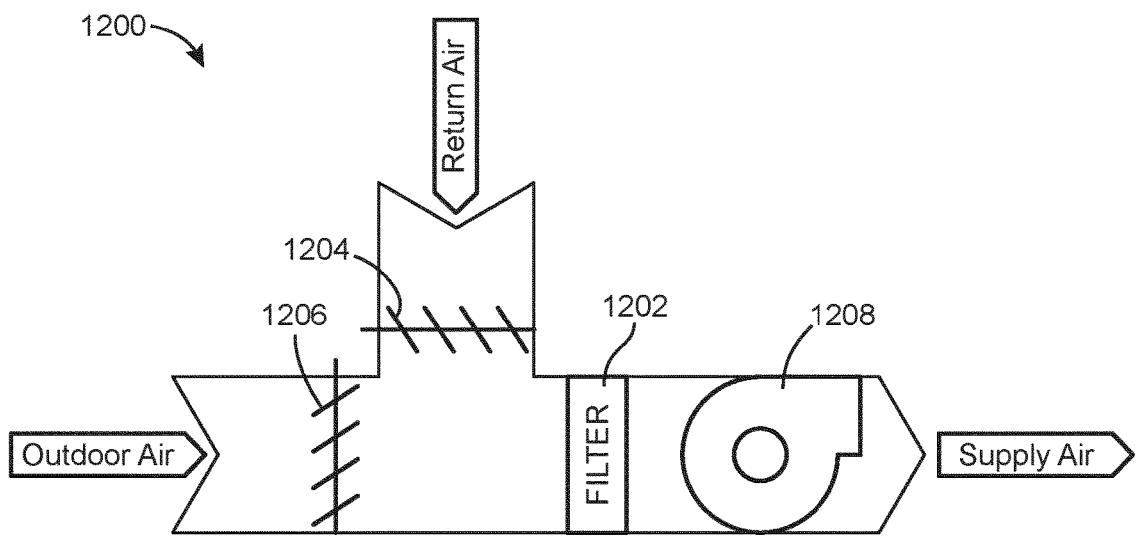
FIG. 12A is a block diagram of an AHU including a filter, according to an exemplary embodiment.

Referring now to FIG. 12A is a block diagram of an AHU 1200 including a filter 1202 is shown, according to an exemplary embodiment. The AHU 1200 includes dampers 1204 and 1206 for controlling the mix of return air and outdoor air that is filtered through the filter 1202 and blown with the blower 1208 and output as the supply air. On a typical air handling unit with a minimum 20% outdoor air, doubling the minimum outdoor air from 20% to 40% increases the outdoor air changes from 1.2 outdoor air changes per hour (ACH) to 2.4 outdoor ACH reducing the probability of infectious disease spread, one hour exposure from 30% to 20%. The filter 1202 further reduces contamination.

Changing a discharge air setpoint from 55 degrees Fahrenheit to 56 degrees Fahrenheit can force more air changes in the space to achieve a desired temperature. Each of these methods can increase annual operating costs since they place an emphasis on infection control not energy efficiency. Examples include increasing the outdoor air fraction can increase energy consumption needed to maintain the discharge air temperature setpoint, increasing the amount of filtering will require additional electrical energy to operate fans, and operation of light disinfection technologies directly increase electrical energy consumption.

Maintenance costs can also increase based on filter replacement, disinfectant light source replacement, etc. In many cases the HVAC system components may not have adequate capacity to maintain setpoints at these new operation points. Since the HVAC system is unable to impact infectious disease spread attribute to surface contact it is not addressed further. Options for the HVAC system to effect changes in clean air flow rate include increasing the outdoor air fraction, passing a fraction of the mixed air through a filter with a known filter efficiency, increasing the number of filter passes by manipulating the discharge air temperature, and/or killing the infectious agents using disinfectant light with a certain efficiency.

The operational service 316 can be configured to control the outdoor air fraction to a value between 0 and 100% based on controlling the dampers 1204 and 1206 depending on need to control new infections or to protect occupants against outdoor hazards. For example, if chlorine was released near the building, therefore the outdoor air fraction should be zero and all mechanical exhaust fans (e.g., kitchen, toilet, etc. should be turned off. Furthermore, if the air is heavily polluted, the outdoor air fraction should be at minimum ventilation levels (e.g. 20% or less) and the air should be filtered. In some cases, if the quality of the outdoor air is good, then the outdoor air fraction should be controlled by the operational service 316 to provide acceptable infection spread probabilities. During winter conditions if the HVAC system does not have humidifiers available, the zone air relative humidity could become unacceptably low dictating the new for other air cleaning options.

In some embodiments, the AHU 1200 or another component (e.g., an AHU, a VAV, a duct, etc.) of an air system can include a light disinfection tunnel. The disinfection tunnel can deactivate viruses and/or bacteria but are not commonly installed in air handling equipment today. The disinfection tunnel is an alternative or addition to filtering for cleaning air or organic contaminates or infectious agents.

Figure 12B:
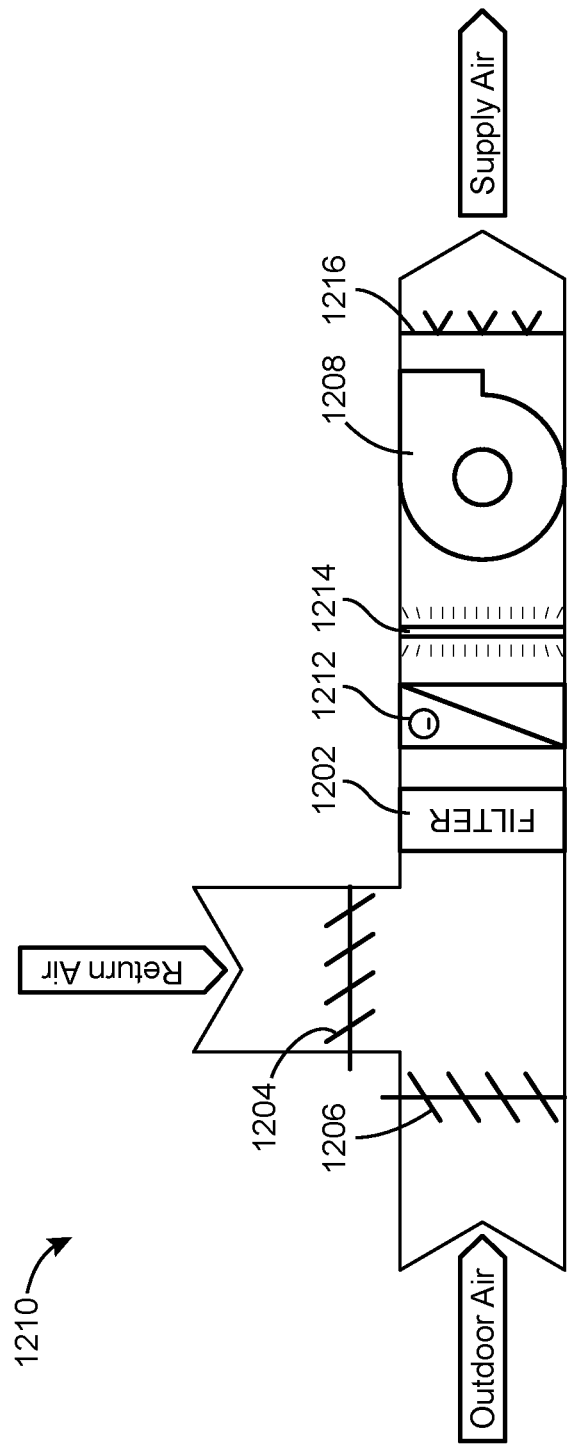
FIG. 12B is another block diagram of an AHU with a disinfectant light kill tunnel, a filter, and a humidity system, according to an exemplary embodiment.

Referring now to FIG. 12B, an AHU 1210 with a disinfectant light kill tunnel, a filter, and a humidity system is shown, according to an exemplary embodiment. The AHU 1210 can be similar to the AHU 1200, e.g., the AHU 1210 can include similar components as the AHU 1200, for example, the dampers 1204 and 1206, the filter 1202, and the blower 1208. The AHU 1210 further includes components 1212 and 1216 of a humidifier system and a disinfectant light source 1214, e.g., a UVC light source, forming a disinfectant light kill tunnel in a duct.

Figure 12C:
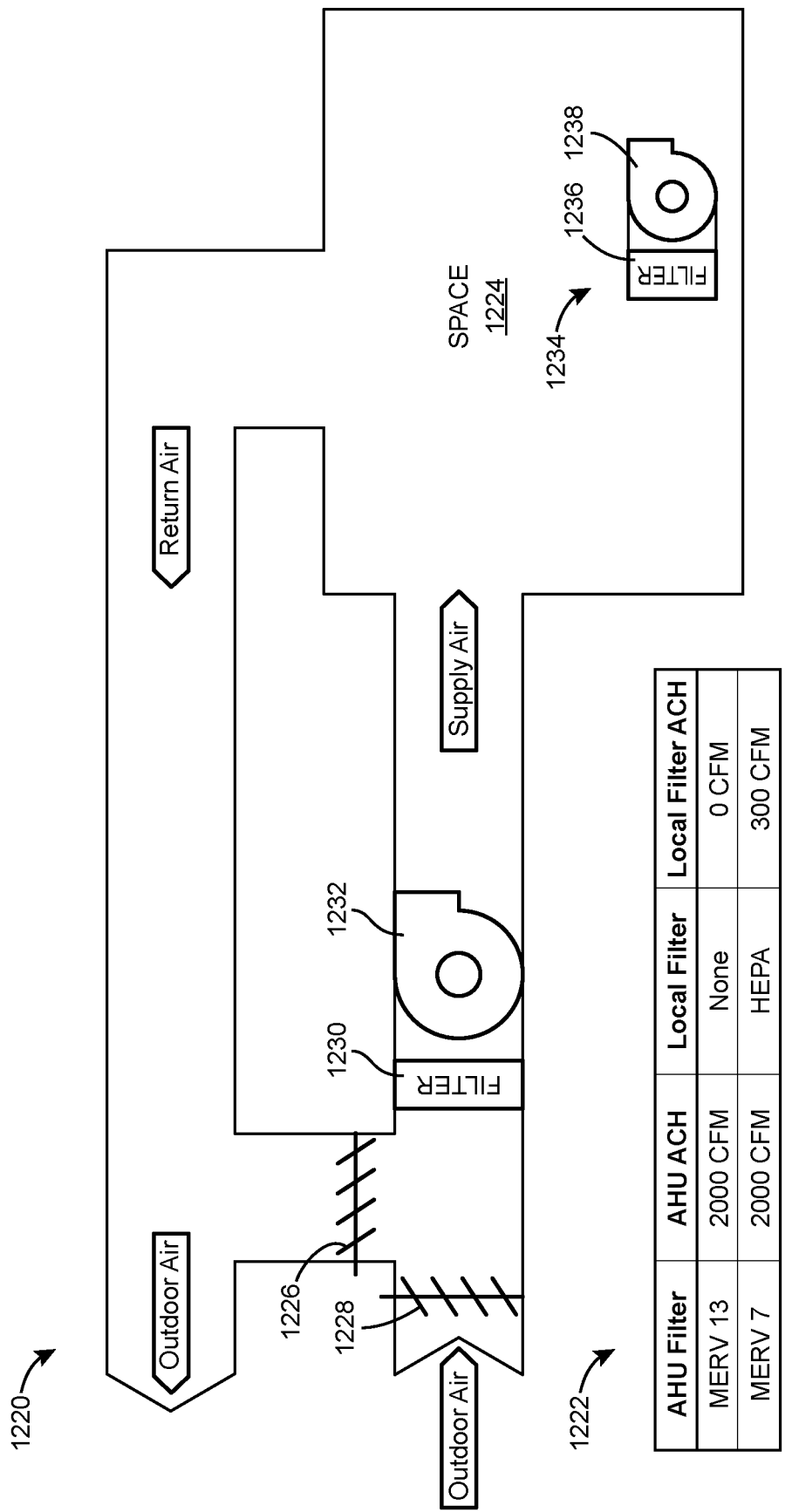
FIG. 12C is another block diagram of an air system of a building including an air handler unit (AHU) filter and a zone filter, according to an exemplary embodiment.

Referring now to FIG. 12C, an air system 1220 of a building including an air handler unit (AHU) filter 1230 and a zone filter 1234, according to an exemplary embodiment. The air system 1220 includes dampers 1226 and 1228 that control a mix the return air of a space 1224 and outdoor air from outside the building to a particular fraction, i.e., ratio of return air to outdoor air. Furthermore, the air system 1220 includes a blower 1232 to create an airflow to deliver supply air to the space 1224.

The space 1224 includes a local zone filter 1234. The local zone filter 1234 includes a filter 1236 and a blower 1238. The filter 1236 can filter air drawn by the blower 1238, filtering the air of the space 1224. Together, the filter 1230 and 1236 can clean the air of the space 1224. The table 1222 indicates two choices that can achieve similar filtering results.

Referring now to FIG. 13, a chart 1300 illustrating the performance of various Maximum Efficiency Rating Value (MERV) filters is shown, according to an exemplary embodiment. The higher the MERV rating, the higher the number of particles that are filtered by the filter. There are various degrees of freedom for using the HVAC system to decrease the probability of infectious disease spread or to intelligently compensate for unusual occurrences that are deleterious to human health such as highly polluted outdoor air (organic and/or inorganic compounds) or poisonous compounds accidentally or intentionally released in the outdoor air. The three degrees of freedom are controlling the outdoor air fraction, air cleaning or disinfection, and temperature and/or humidity control.

High MERV (13+ rating) or HEPA filter can remove infectious aerosols and particles from the air. Filtering can be an important option for providing clean air if particulate pollution is a health problem or if infection control is required in very hot or cold climates. This may be due to high incremental costs of increasing the outdoor air fraction. The retrofit service 320 can be configured to recommend a MERV rating for filters of a building based on an application of the building, e.g., residential, commercial, hospital, etc. and/or based on what types of particles need to be filtered, e.g., bacteria vs. viruses.

Referring now to FIG. 14, a chart 1400 illustrating health levels for human exposure to various particulates at various humidity values in a building is shown, according to an exemplary embodiment. Viruses, bacteria, and mold respond differently to temperature and relative humidity levels. Keeping relative humidity levels between 40% and 60% may be ideal to prevent the spread of disease in the building. Therefore, in the winter, a goal should be 40% RH subject to preventing the formation of condensate on windows. It may be difficult for the HVAC to maintain this humidity range if the outdoor air fraction is increased to prevent spread of infectious agents. Human immune response to infections can be negatively impacted at relative humidity levels below 40%.

Identifying optimal combinations of ventilation air, filtering, and/or disinfection that can be performed by the operational service 316 can help building owners to reduce the impact of a disease within the building. A spread of a disease within a building can be reduced by investing in the appropriate equipment for their facilities as identified by the retrofit service 320 and by adjusting control sequences including ventilation air volumes, filtration, and/or disinfection by the operational service 316.

Referring now to FIG. 15, a chart 1500 illustrating control parameters for heating, cooling, and damper position for various modes of operation of the building manager of FIG. 3 is shown, according to an exemplary embodiment. The chart 1500 illustrates heat valve, cool valve, and damper actuator positions for various control schemes. The control schemes are a heating scheme, a maximum air heating scheme, a cooling scheme, an economizer scheme, an economizer and cooling scheme, and a maximum air cooling scheme.

For a minimum air control scheme, there may be three options for deciding the minimum air, e.g., fixed minimum air, demand controlled ventilation, and/or airflow control from airflow station. For fixed minimum air and demand controlled ventilation, the minimum position can be altered by the desired airflow to meet an increased level. For example, if a desired level is 100%, then the minimum air can be 100%, thus opening a damper of an air system to allow full outdoor air. In some embodiments, a software block converts damper position to airflow based on the type of dampers. If a pre-heat and a reheat coil are present, the pre-heat coil need to be saturated before a re-heat coil opening.

Figure 16:
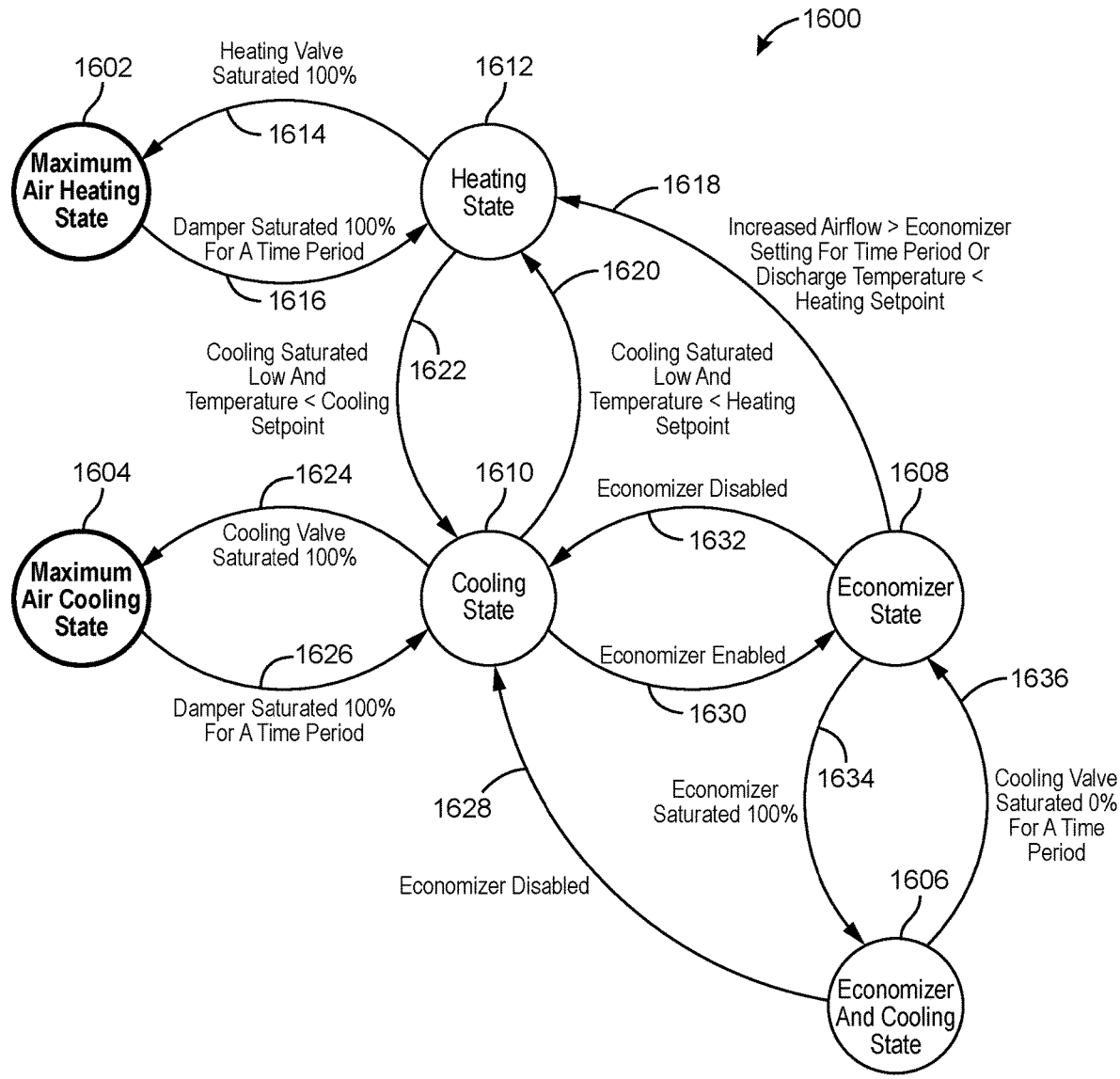
FIG. 16 is a state diagram for transitioning between operating modes, according to an exemplary embodiment.

Referring now to FIG. 16, a state diagram 1600 for transitioning between operating modes is shown, according to an exemplary embodiment. In some embodiments, the operational service 316 is configured to perform the state diagram 1600. The operational service 316 can transition between the heating state 1612, the maximum air heating state 1602, the maximum air cooling state 1604, the cooling state 1610, the economizer state 1608, and/or the economizer and cooling state based on various transition rules 1614-1636.

In some cases, the maximum air heating state 1602 and the maximum air cooling state 1604 can increase heating or cooling to a maximum capacity that a piece of equipment is available to perform. The states 1602 and 1604 can reduce air flow thus allowing for increased airflow when the system can provide it without exceeding the capacity of the equipment. In some embodiments, the retrofit service 320 can be configured to recommend retrofits for equipment to increase the maximum capacity of equipment. The heating state 1612 can be a state where building systems are operated to heat a building. The cooling state 1610 can be a state where building systems are operated to cool a building. The economizer state 1608 can be a state where outdoor air is mixed by an economizer to cool a building. The economizer and cooling state 1606 can be a state where an economizer cools air and building equipment is operated to cool the air.

When the operational service 316 is operating in the economizer state 1608, the operational service 316 can transition to the heating state 1612 based on the transition rule 1618. The transition rule 1618 can execute when an increased airflow is greater than an economizer setting for a particular period of time or a discharge air temperature is less than a heating setpoint. The operational service 316 can transition to the cooling state 1610 based on the transition rule 1632. The transition rule 1632 can execute if an economizer is disabled. Similarly, the transition 1630 can execute causing the operational service 316 to transition from the cooling state 1610 to the economizer state 1608 in response to the economizer being enabled.

The transition rule 1634 can execute transitioning from the economizer state 1608 to the economizer and cooling state 1606 in response to the economizer being saturated, e.g., the economizer operating to bring in only outdoor air. The transition rule 1628 can cause the operational service 316 to transition from the economizer and cooling state 1606 to the cooling state 1610 in response to the economizer being disabled.

The transition rule 1624 can cause the operational service 316 to transition from the cooling state 1610 to the maximum air cooling state 1604 in response to a cooling valve being saturated. The transition rule 1626 can cause the operational service 316 to transition from the maximum air cooling state 1604 to the cooling state 1610 in response to a damper being saturated that is providing full air for at least a particular amount of time.

The transition rule 1620 can cause the operational service 316 to transition from the cooling state 1610 and the heating state 1612 in response to cooling being saturated at a low level and temperature being less than a heating setpoint. The transition rule 1622 can execute causing the operational service 316 to transition from the heating state 1612 to the cooling state 1622 in response to heating being saturated and temperature being greater than a cooling setpoint. The transition rule 1614 can execute causing the operational service 316 to transition from the heating state 1612 to the maximum air heating state 1602 in response to a heating valve being saturated. The transition rule 1616 can cause the operational service 316 to transition from the maximum air heating 1602 to the heating state 1612 in response to a damper allowing maximum airflow being saturated for a particular amount of time.

Figure 17:
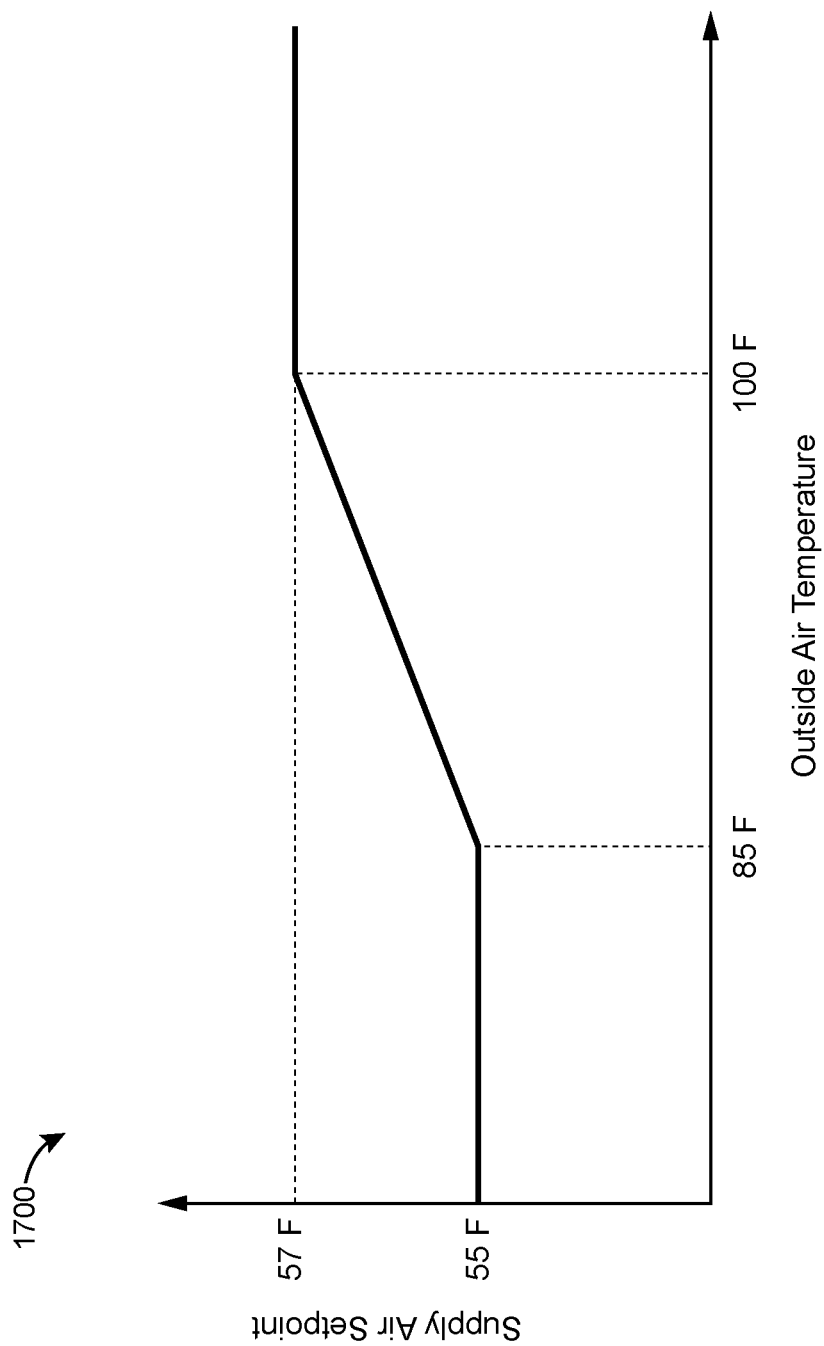
FIG. 17 is a chart illustrating supply air setpoint values set for various outside air temperatures, according to an exemplary embodiment.

Referring now to FIG. 17, a chart 1700 illustrating supply air temperature setpoint values set for various outside air temperatures is shown, according to an exemplary embodiment. The operational service 316 can be configured to reset supply air temperature setpoints based on outdoor air temperature according to the chart 1700. Changing a percentage of outdoor air can affect mixed air temperature and can potentially adversely affect maximum load. Resetting the supply air setpoint based on outdoor allows to compensate for the mix. In some embodiments, the values for the resets are based on sites based on geographical considerations and equipment capabilities.

Figure 18:
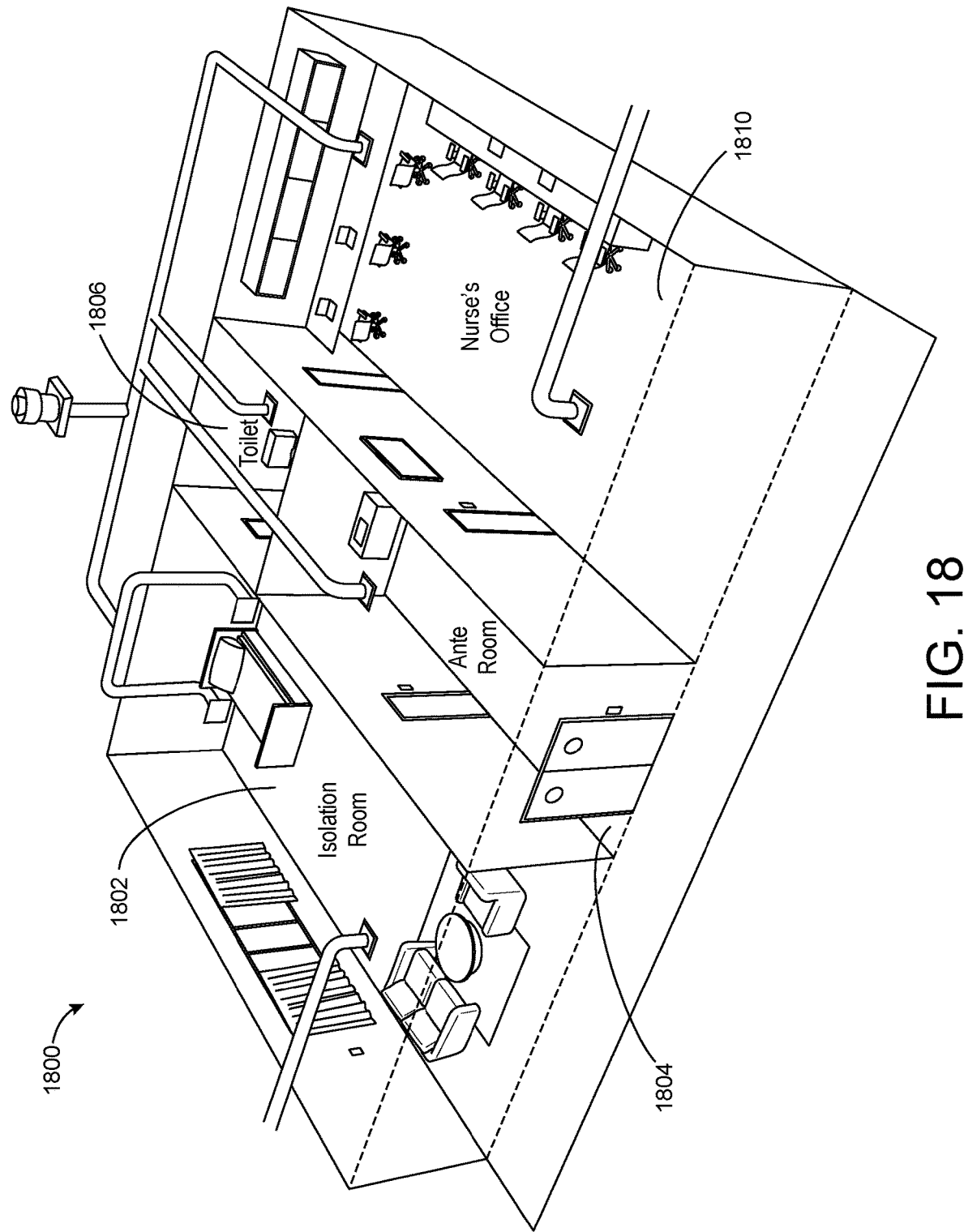
FIG. 18 is a schematic diagram of an isolation room of a nurses' area of a building, according to an exemplary embodiment.

Referring now to FIG. 18, a schematic diagram of an isolation room of a nurses area 1800 of a building is shown, according to an exemplary embodiment. The nurses area 1800 can include an isolation room 1802, an ante room 1804, a toilet 1806, and a nurse's office 1810. The area 1800 can be controlled with volumetric offset control (VOC), a failsafe mode, and supply and general exhaust mode. The isolation room can host people that are or may be infected with an infectious disease without infecting others when symptomatic people cannot leave a building (e.g., a school, a university, etc.).

In the VOC, a controller unit can initiate a local audible and visual alarm upon the room pressure being measured outside of its high or low differential pressure setpoint (if applicable). The room temperature and/or humidity control signal can modulate the supply of air hot water reheat coil to maintain a room temperature setpoint. The VOC control signal can modulate the exhaust air VAV box to maintain room VOC setpoint. The total supply airflow entering the room can be subtracted from the total exhaust air flow leaving the room, and the difference may be the volumetric offset.

In the fail safe mode, all exhaust valves can fail either open or closed depending on pressure requirement upon loss of power to either the controller or actuator, or loss of analog control signal from the controller to actuator. All supply VAV terminals can fail either open or closed depending on lab pressure requirement upon loss of power to either the controller or actuator, or loss of analog control signal from the controller to actuator.

In the supply and general exhaust mode, a controller can modulate the general exhaust VAV valve actuator and/or the supply air VAV terminal actuator to signal generated by the controller. The supply air terminals air flow can be totalized in the supply UVM summing module and report the resultant air flow to the room pressure controller. The air flow from the general exhaust valve will be totalized in the master controller and report the resultant air flow to the room pressure controller. The total supply air can be compared with the total room exhaust and make a determination on the amount of supply air that is necessary in order to track the total exhaust in the space and drive the supply VAV terminal to the correct position for the required room pressure balance.

In some embodiments, the area 1800 of the building can be used for isolating sick individuals in a school. A system and/or personnel of a building can identify symptoms of students of the school. If a student is found to be sick, the student can be provided with material (e.g., masks, gloves, a shield etc.) and the student can be relocated to the isolation room 1802. For a K-12 school, the student can be isolated in the isolation room 1802 parents can be informed to pick up the student and the student can be released.

For a higher education facility, a sick student can be isolated in the isolation room 1802 until the student can safely travel home or be transported to a hospital. Appropriate individuals can be notified that the student is sick, e.g., parents of the student, roommates of the student, teachers of the student, etc. The building manager 306 can be configured to operate contract tracing algorithms to identify and flag other users for quarantine that have been exposed to the infected student. The belongings of the user and/or the impacted spaces can be scheduled for cleaning by the building manager 306. The building manager 306 can further execute contact tracing algorithms to identify a potential for spread of a disease to adjacent spaces or other building areas through mechanical systems or other means.

Referring now to FIG. 19, a schematic diagram of dormitory rooms of a dormitory 1900 where bathroom fans are used to negatively pressurize the dormitory rooms, according to an exemplary embodiment. In the dormitory 1900, the operational service 316 can be configured to control bathroom exhaust fans to negatively pressurize each room relative to a corridor of the dormitory 1900. The operational service 316 can operate to negatively pressurize the dormitory rooms in response to the dormitory 1900 being repurposed as a location to house sick persons and/or in response to detecting a dormitory resident that is sick. In some embodiments, the operational service 316 can operate the dormitory rooms in the space pressurization mode 426 to repurpose the spaces.

Referring now to FIGS. 20A-20K, user interfaces 2000-2080 managed by the building manager 306 for selecting an operating mode for the building manager 306 are shown, according to an exemplary embodiment. In some embodiments, the user interface manager 314 can be configured to generate the user interfaces 2000-2080 and cause the user interface to be displayed to a user via the user device 302. The user interfaces 2000-2080 can be mode command dashboards. The user interfaces 2000-2080 can allow for a user to make state transitions and commands in a user friendly manner. The user interfaces 2000-2080 can, in some embodiments, provide a trend all temperature, RH, CO2, air supply, and state transitions. This can help confirm that mechanical equipment is able to handle new operating conditions.

In some embodiments, the user interfaces 2000-2014 can provide performance reports. For example, each space can be attached to a performance dashboard that includes a temperature that can be green when the temperature is within ASHRAE comfort zone (ASHRAE 55) or yellow when the temperature is outside the comfort zone. The RH can be displayed in the performance dashboard along with a green indicator when the RH is between 40% and 60% and yellow when the RH is outside the range. The CO2 measurements can be displayed in the performance dashboard along with a green indicator when the CO2 is below a CO2 setpoint, a yellow indicator when the CO2 is above the setpoint, and a red indicator when the CO2 is at least a particular amount above the setpoint.

The user interfaces 2000-2080 can display a total volatile organic compound (TVOC) level along with a green indicator when the TVOC is below a TVOC setpoint, a yellow indicator when the TVOC is above the setpoint, and a red indicator when the TVOC is at least a particular amount greater than the setpoint. The user interfaces 2000-2080 can display the PM2.5 level as green when it is below a particular amount, yellow when it is greater than the particular amount but less than a second particular amount, and red when it is greater than the second particular amount. The user interfaces 2000-2080 can display the carbon monoxide (CO) along with a green indicator when the CO is less than a particular amount and a yellow indicator when the CO is greater than the particular amount. Furthermore, the user interfaces 2000-2080 can display air changes and a green indicator when the flushing has been performed in the last particular amount of time.

Figure 20A:
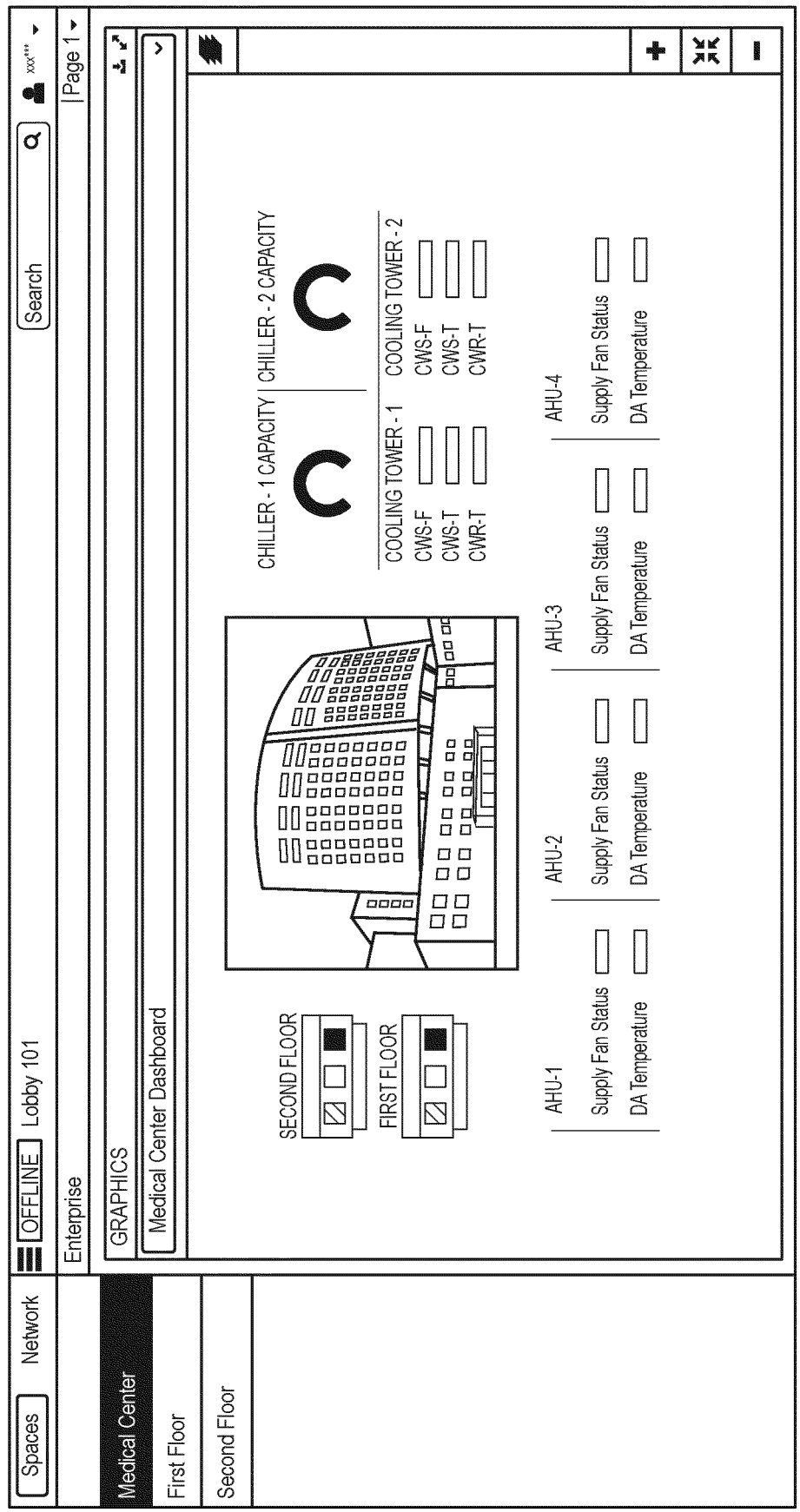
FIG. 20A is a user interface indicating equipment status for a building, according to an exemplary embodiment.
Figure 20B:
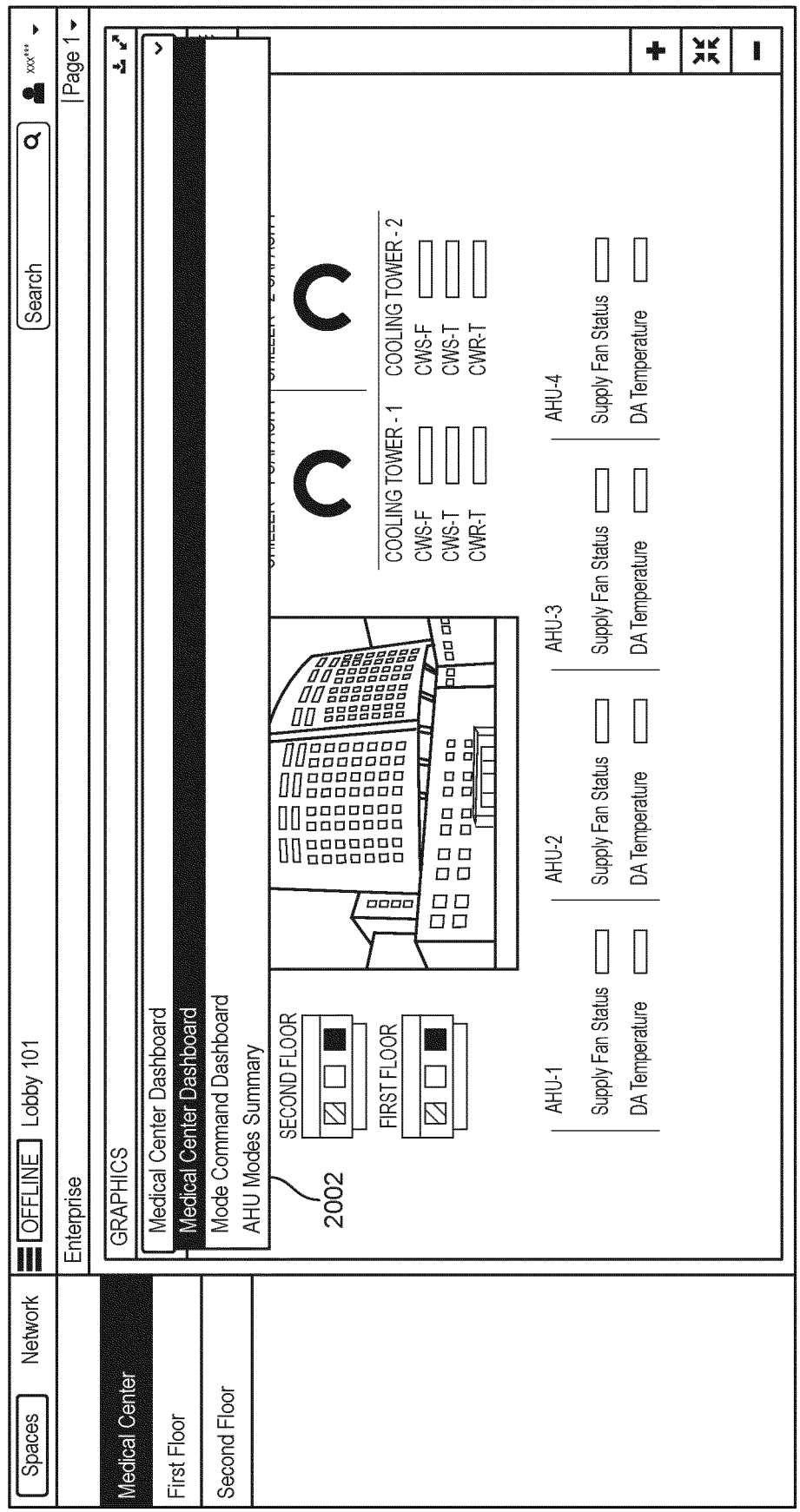
FIG. 20B is the user interface of FIG. 20A where a user selects a dashboard for display, according to an exemplary embodiment.

Referring now to FIGS. 20A-20B, a user interface 2000 indicating equipment status for a building is shown, according to an exemplary embodiment. The user interface 2000 provides a summary of a building. In particular, the user interface 2000 provides a summary of equipment of the building. In the user interface 2000, information for two chillers and four air handler units are shown for the building. In some embodiments, information for various other pieces of building equipment can be displayed in the user interface 2000. In some embodiments, the information includes various points for the building equipment, for example, measured environmental conditions, operating information, and/or control or setpoint parameters.

In FIG. 20B, a user interacts with the interface 2000 to cause the user interface 2000 to display a selection element 2002 for selecting another graphic display. In FIG. 20B, the user can select a "Mode Command Dashboard" for display. In response to the selection, the user interface manager 314 displays the "Mode Command Dashboard," user interface 2010 shown in FIG. 20C.

Referring now to FIG. 20C, the user interface 2010 selected in the user interface 2000 of FIGS. 20A-20B is shown where multiple control modes are available for a building space and explanations of each mode are included, according to an exemplary embodiment. The user interface 2010 includes selectable modes, e.g., the modes 408-452. The user interface 2010 includes multiple windows 2012-2018 of selectable elements for selecting a mode. The windows 2012-2018 include the window 2012 for comfort and efficiency modes, and the window 2016 for emergency environmental control modes 2016, and the window 2018 for outdoor emergency override modes.

The window 2012 includes an economizer mode selection field. In response to a user selecting the economizer selection field, the operational service 316 can operate an economizer of the building to use outdoor air to cool the building instead of mechanical cooling to save energy. The operational service 316 may receive measurements of outdoor air and compare the measurements to air quality settings to verify that the outdoor air is clean and can be used to perform the outdoor air cooling. In some embodiments, the economizer mode is enabled by default. The economizer mode includes one or more economizer mode parameters that cause an economizer of an air handler unit to operate one or more dampers to utilize outdoor air to meet a cooling demand of the building.

The window 2014 includes a demand control ventilation selection field. The demand control ventilation selection field may trigger the demand controlled ventilation mode 416. In response to a user selecting the demand control ventilation selection field, the operational service 316 can operate the existing building systems 324 and/or the retrofit building systems 326 to maintain indoor air quality and reduce energy usage by adjusting minimum outdoor air ventilation. The operational service 316 can measure occupancy and/or occupancy related parameters and ventilate a building and/or space based on the occupancy measures and/or occupancy related parameters. For example, the operational service 316 can cause the building to be ventilated based on CO2 measurements indicating occupancy levels, indoor pollutant measurements, e.g., VOC measurements, and/or an occupancy schedule. The demand controlled ventilation mode 416 may be enabled by default.

The window 2016 includes a flush selection field. The flush selection field may trigger the flush mode 432. In response to a user selecting the flush mode 432, the operational service 316 can operate the existing building systems 324 and/or the retrofit building systems 326 to displace the air in a space with outdoor air to drive pollutant concentrations to low levels. The operational service 316 can perform the air flush on a schedule so that the flush occurs periodically. The operational service 316 can perform the air flush when a building space is unoccupied since the temperature and/or humidity levels of the space may become uncomfortable for occupants. The operational service 316 can operate based on one or more parameters that cause building equipment to flush the air of the building and complete the flush before a time at which the building space becomes occupied. The flush mode 432 may be disabled by default.

The window 2016 includes a thermal flush selection field. The thermal flush selection field may trigger the thermal flush mode 434. In response to a user selecting the thermal flush mode 434, the operational service 316 can operate the existing building systems 324 and/or the retrofit building systems 326 to both displace air from the building space and replace the air with outdoor air while increasing humidity within the building space. This can reduce the likelihood of the spread of an airborne disease within the building space. This can reduce the level of the airborne disease and the viability of the disease. The thermal flush mode 434 may operate on a schedule in order to operate during unoccupied times of a building. The thermal flush mode 434 can operate based on one or more parameters that cause air to be flushed from the building space and humidity raised before the building space is occupied.

The window 2016 includes an increased ventilation selection field. The increased ventilation selection field may trigger an increased ventilation mode. In response to a user selecting the increased ventilation mode, the operational service 316 can operate the existing building systems 324 and/or the retrofit building systems 326 to increase minimum outdoor air ventilation settings to dilute space contaminant concentrations. The increased ventilation might increase energy consumption and operate when the building is occupied. The increased ventilation mode may be disabled by default.

The window 2016 includes a pandemic pressurization room selection field. The pandemic pressurization room selection field may trigger the space pressurization mode 426. In response to a user selecting the space pressurization mode 426, the operational service 316 can operate the existing building systems 324 and/or the retrofit building systems 326 to pressurize one or more areas of a building. Pressurizing a space of a building can isolate an infected, or potentially infected person. The space pressurization mode 426 can operate based on one or more parameters that cause a first space of a building to be at a negative pressure relative to another space of a building. For example, an exhaust fans could be operated by the space pressurization mode 426 to negatively pressure a space.

The window 2016 includes a shutdown cross contamination selection field. The shutdown cross contamination selection field may trigger the shutdown cross contamination mode 438. In response to a user selecting the shutdown cross contamination mode 438, the operational service 316 can operate the existing building systems 324 and/or the retrofit building systems 326 to shutdown equipment that may contaminate return and supply air of return and supply air ducts. For example, a reheat wheel might bring contaminants from a return air duct into the supply air duct of the reheat wheel is operating. The shutdown cross contamination mode 438 can cause the heat recovery wheel, or another component that causes contamination between a return and supply air duct to be deactivated and shutoff.

The window 2018 includes an emergency ventilation shut-off selection field. The emergency ventilation shut-off selection field may trigger the outdoor air emergency mode 422. In response to a user selecting the outdoor air emergency mode 422, the operational service 316 can operate the existing building systems 324 and/or the retrofit building systems 326 to stop outdoor air from entering a building in response to severe outdoor air pollution situations, e.g., sever chemicals being in the outdoor air, a bio-hazard risk, etc. The operational service 316 can receive sensor measurements of outdoor air, or receive an emergency indication that outdoor air is dangerous to occupants of a building, and trigger the outdoor air emergency mode 422. The outdoor air emergency mode 422 may be disabled by default.

Figure 20D:
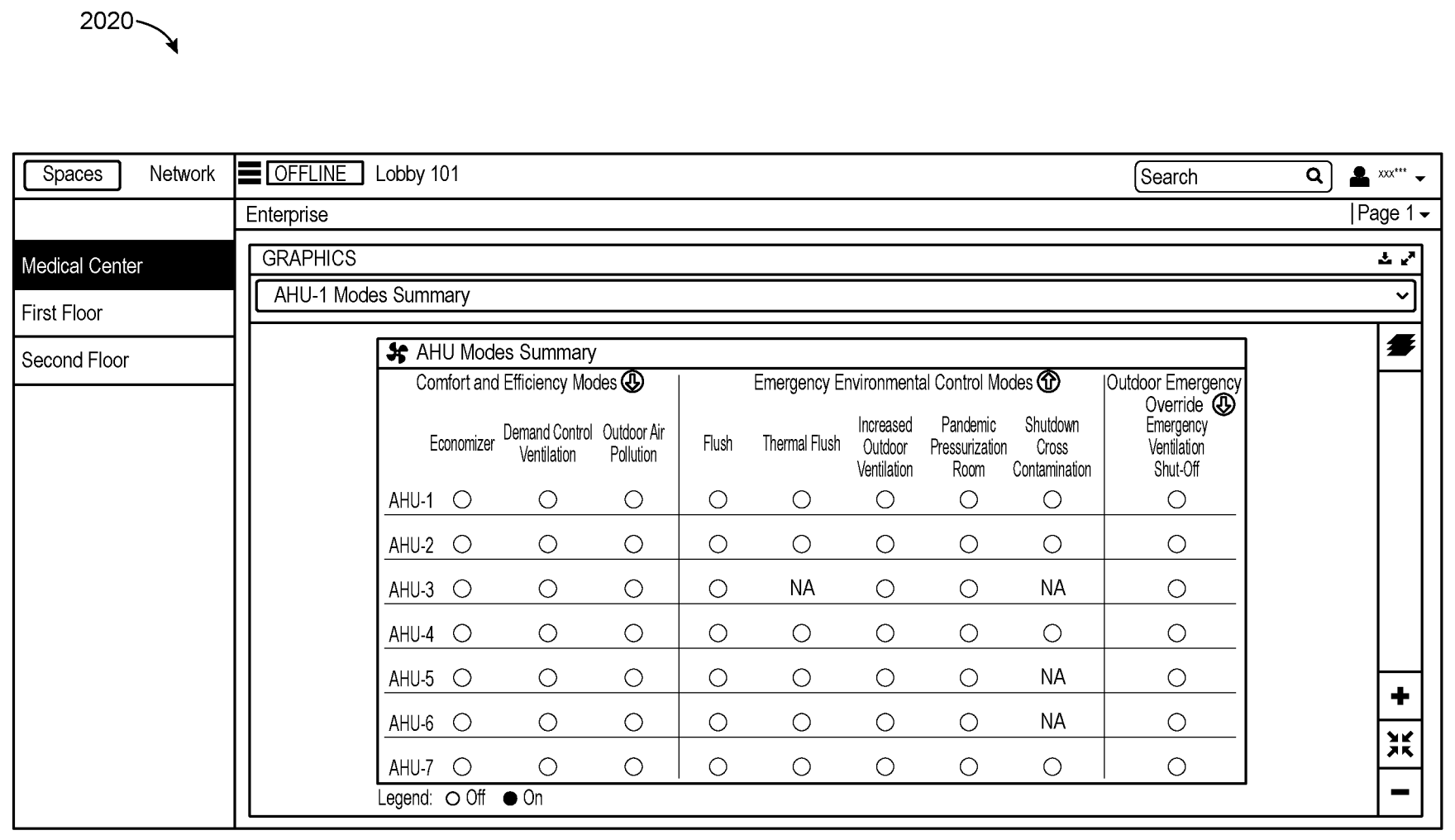

Referring now to FIG. 20D, a user interface 2020 summarizing an operating selection field for each of multiple air handler units (AHUs) is shown, according to an exemplary embodiment. The user interface 2020 indicates seven AHUs of a particular building. The AHUs may serve different spaces of a building. Accordingly, operating each of the AHUs in a particular mode of the modes 408-442 can cause the spaces operated by the AHUs to be controlled according to the modes 408-442. The various operating modes described in the user interface 2010 are illustrated in the user interface 2020 and an indication of whether the various modes are active or inactive.

Figure 20E:
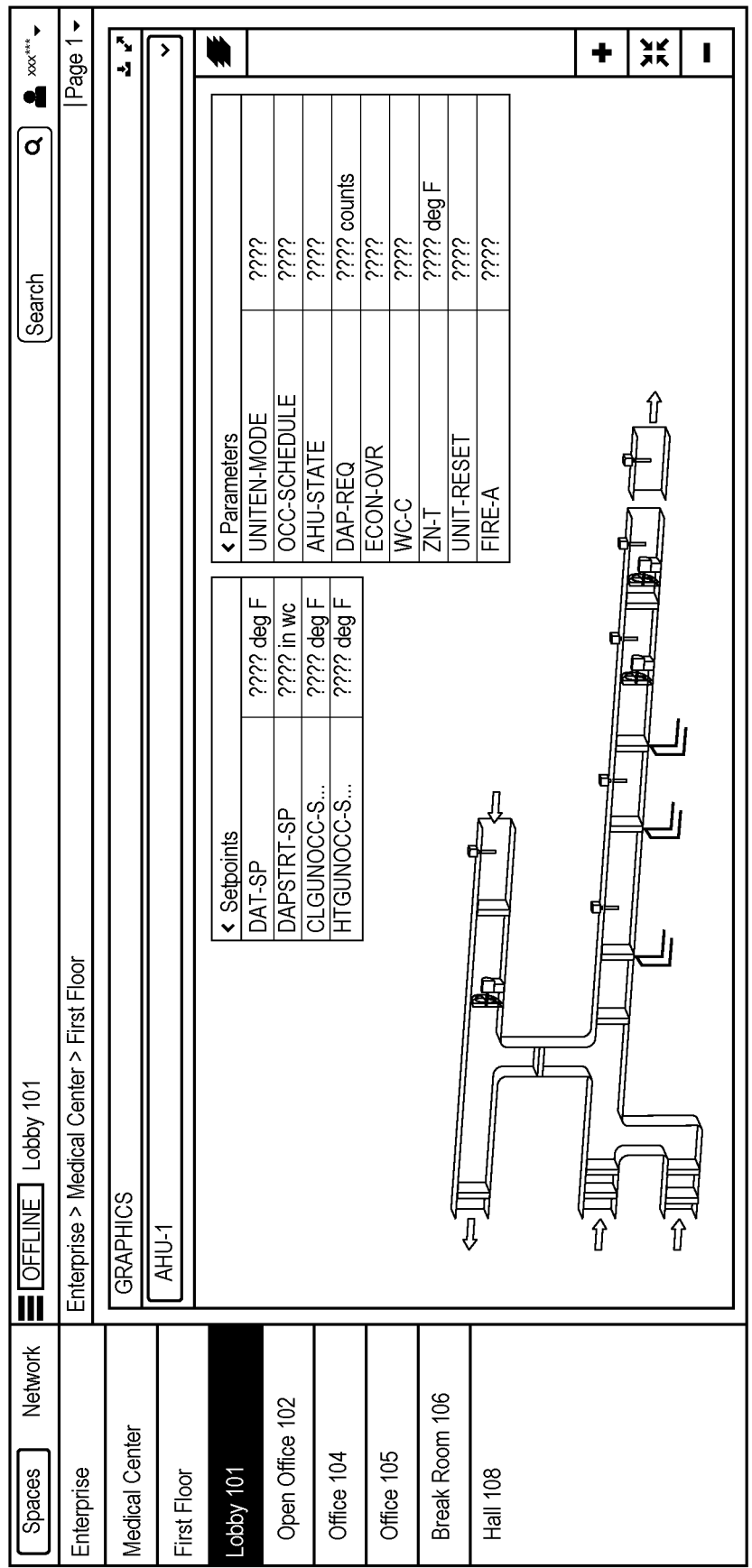
FIG. 20E is a user interface of an AHU and indications of setpoints and parameters of the AHU, according to an exemplary embodiment.
Figure 20F:
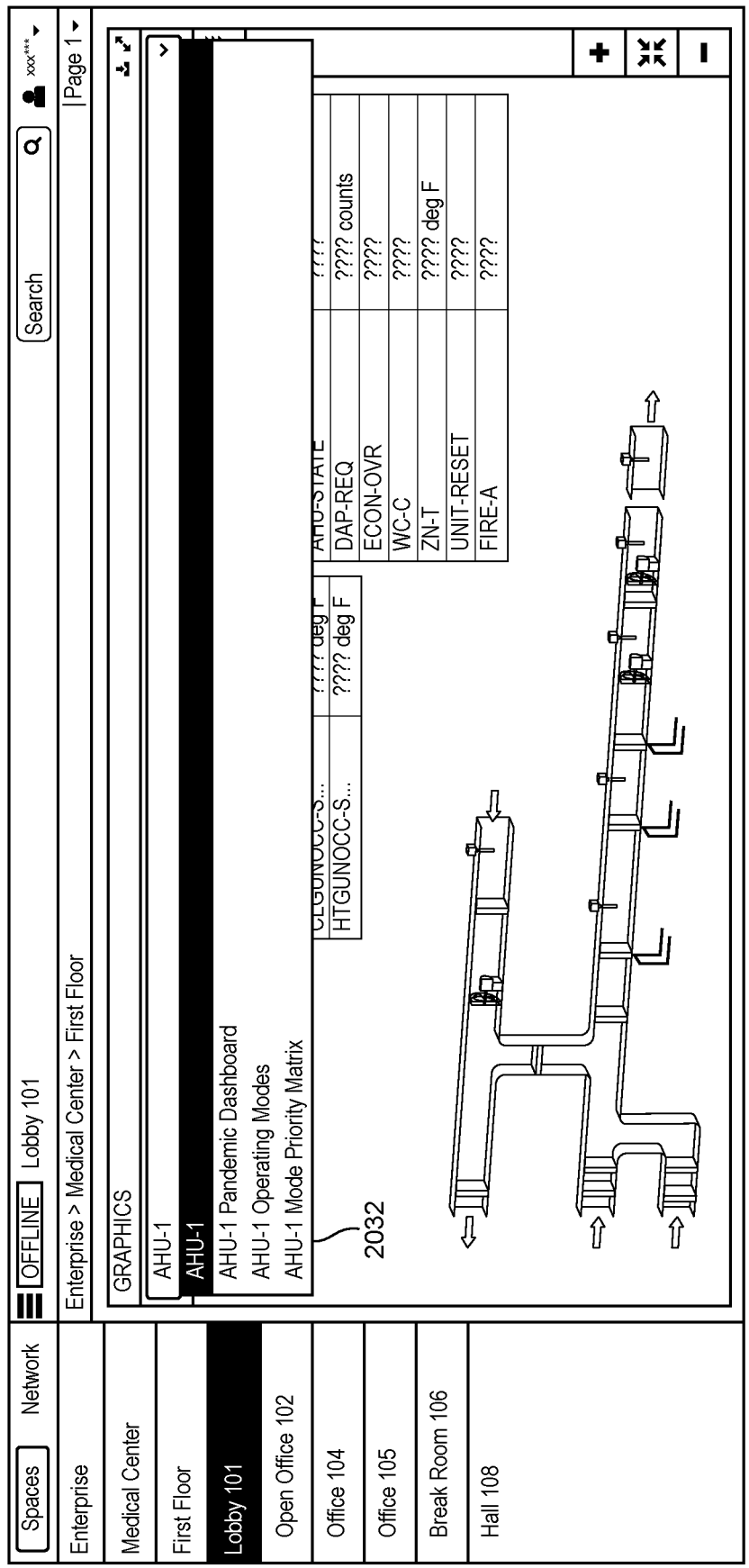
FIG. 20F is the user interface of FIG. 20E where a user can select an alternate dashboard to be displayed, according to an exemplary embodiment.

Referring now to FIG. 20E, a user interface 2030 of an AHU and indications of setpoints and parameters of the AHU is shown, according to an exemplary embodiment. The user interface 2030 includes a graphic illustration of an AHU of a building. The user interface 2030 further includes the operating setpoints of the AHU and the operational and measured parameters of the AHU. Referring now to FIG. 20F, the user interface 2030 is shown where a user can select an alternate dashboard to be displayed via the selection field 2032, according to an exemplary embodiment. The selection field 2032 allows a user to select other user interfaces to be displayed to the user. The user interfaces may be specific to a particular AHU, e.g., the AHU-1. The user interfaces may be the AHU-1 pandemic dashboard shown in FIG. 20G, the AHU-1 operating modes dashboard shown in FIG. 20J, and the AHU-1 mode priority matrix dashboard shown in FIG. 20J.

Figure 20G:
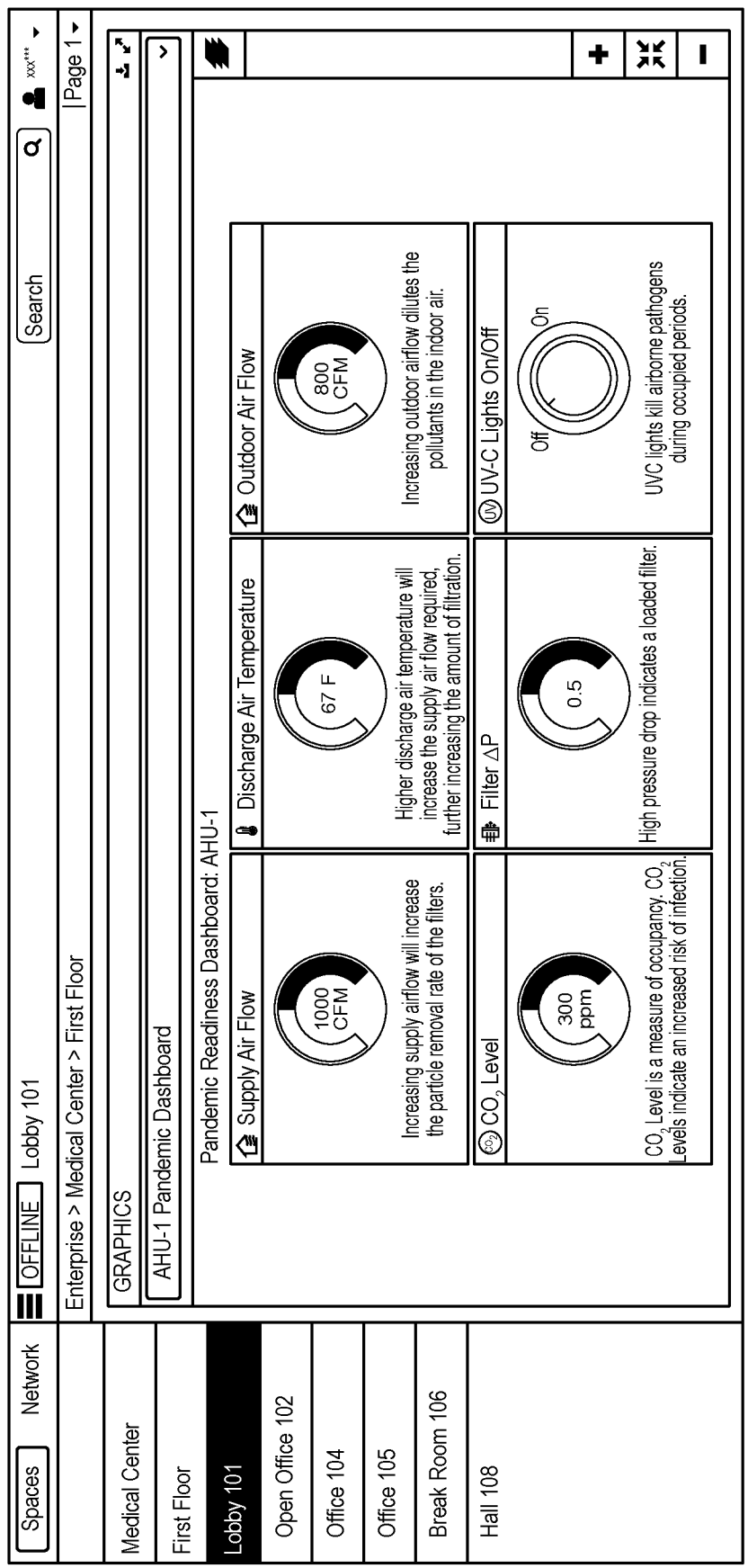
FIG. 20G is a user interface indicating air quality measurements for an air handler unit and a control element for activating disinfectant light, according to an exemplary embodiment.

Referring now to FIG. 20G, a user interface 2040 including measurements for an air handler unit and a control selection field for activating disinfectant light is shown, according to an exemplary embodiment. The user interface 2040 indicates the performance of a particular AHU and the readiness of the AHU to respond to a pandemic. The user interface 2040 includes indications of supply air flow, discharge air temperature, outdoor air flow, CO2 levels, and filter pressure drop for the AHU. Furthermore, the user interface 2040 includes a control selection field for activating or deactivating a disinfectant light source of the AHU that may disinfect air of the AHU to destroy an infectious disease present in the air.

Figure 20H:
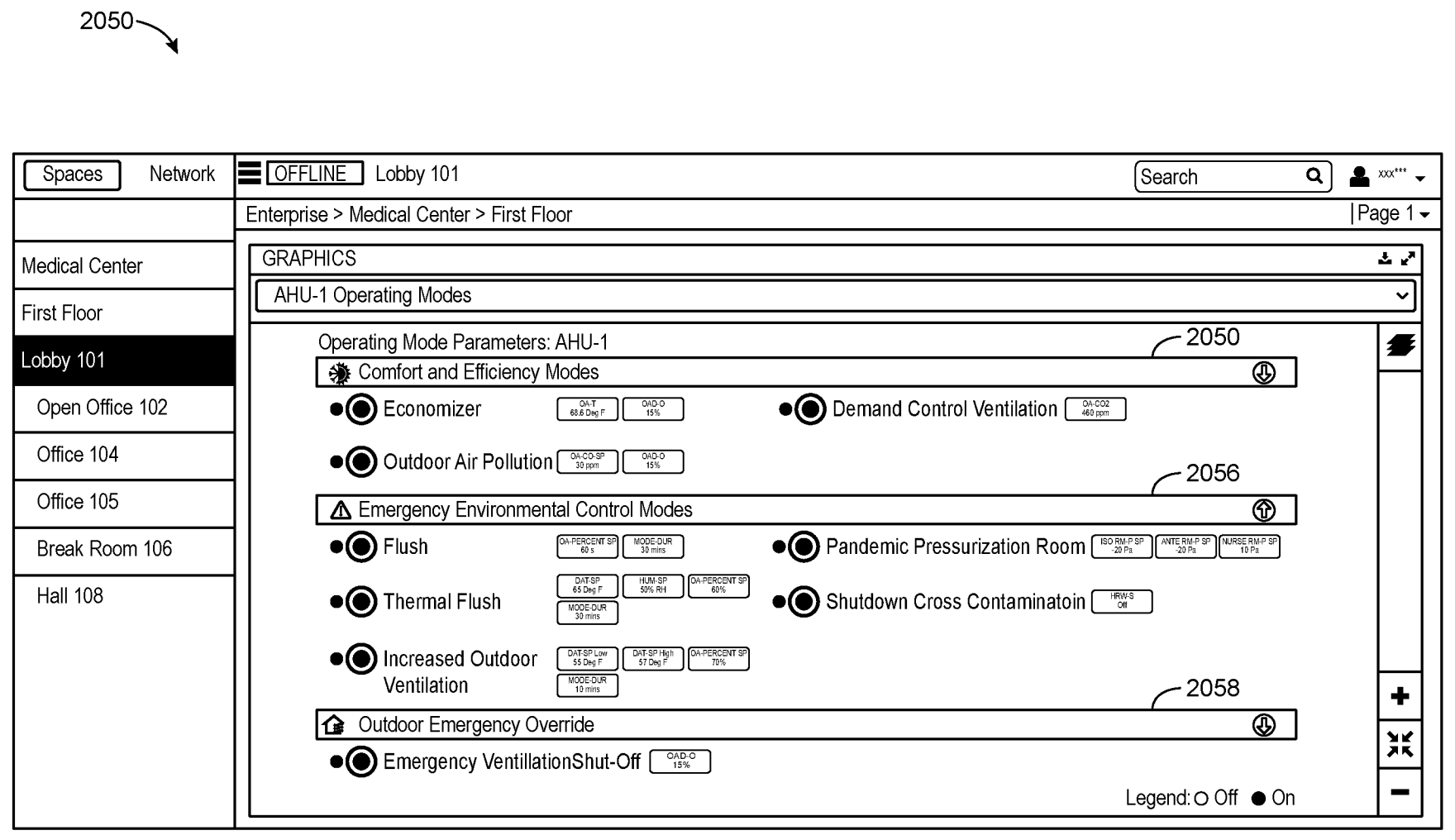

Referring now to FIG. 20H, a user interface 2050 where multiple control modes are available for an AHU is shown, according to an exemplary embodiment. The user interface 2050 includes a window 2052 for comfort and efficiency modes, a window 2056 for an emergency environmental control modes, and a window 2058 for outdoor emergency override. The windows 2052-2058 include measured conditions, e.g., CO2 values, humidity values, temperature values, etc. Furthermore, the windows 2052-2058 include input elements for receiving operating settings for each of the modes of the windows 2052-2058. The operating settings include temperature setpoints, operating time durations, etc. The user interface 2050 provides a single user interface that provides multiple different types of environmental information and control the selection of different operating modes for an AHU.

Figure 20I:
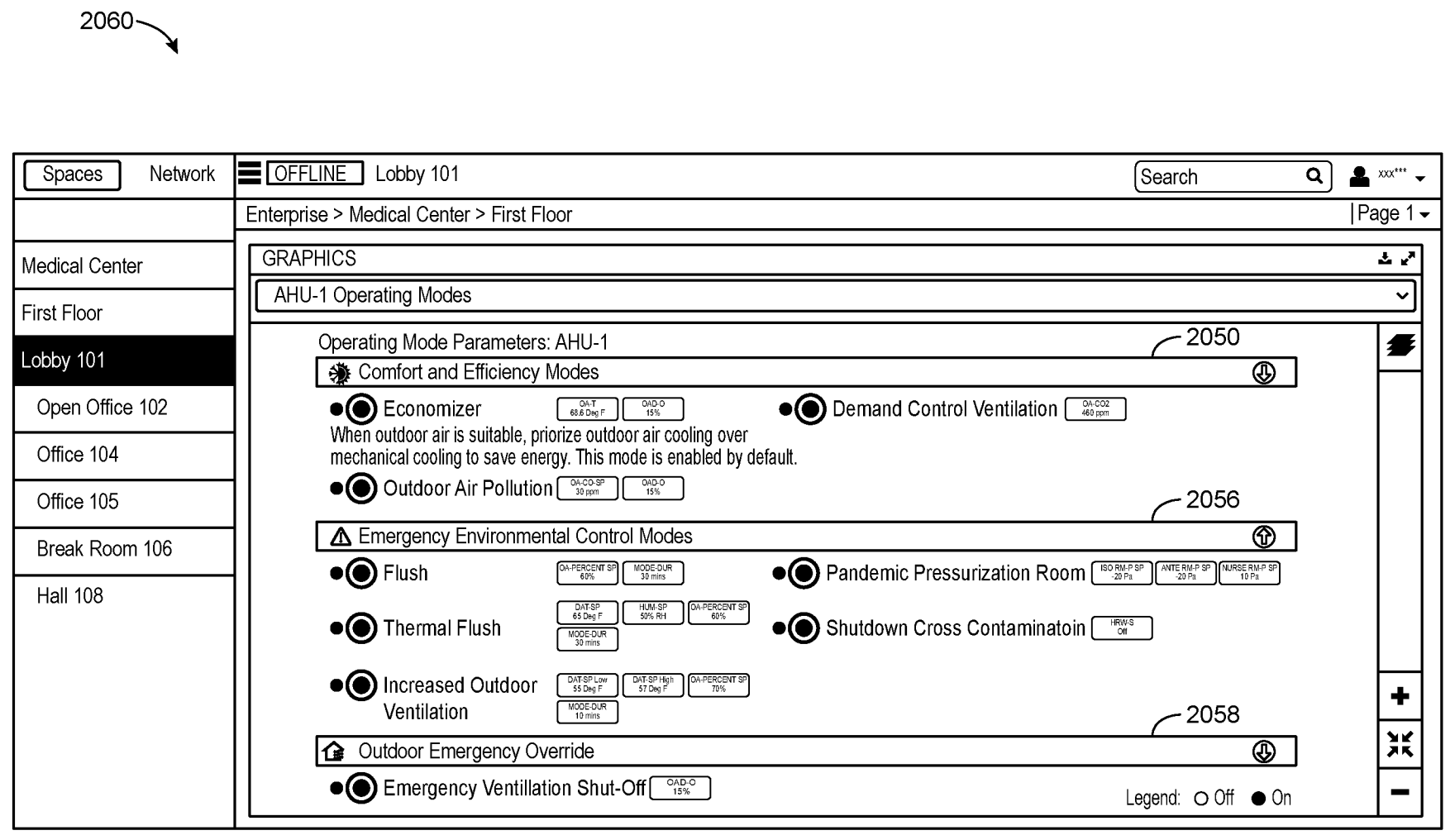

Referring now to FIG. 20I, a user interface 2060 where multiple control modes are available for a building space and an explanation of a flush mode is included. The user interface 2060 may be the same as the user interface 2050 but provide the user with an explanation of the operation of one or each of the modes. A user can interact with the user interface 2060 to activate or deactivate the explanations.

Figure 20J:
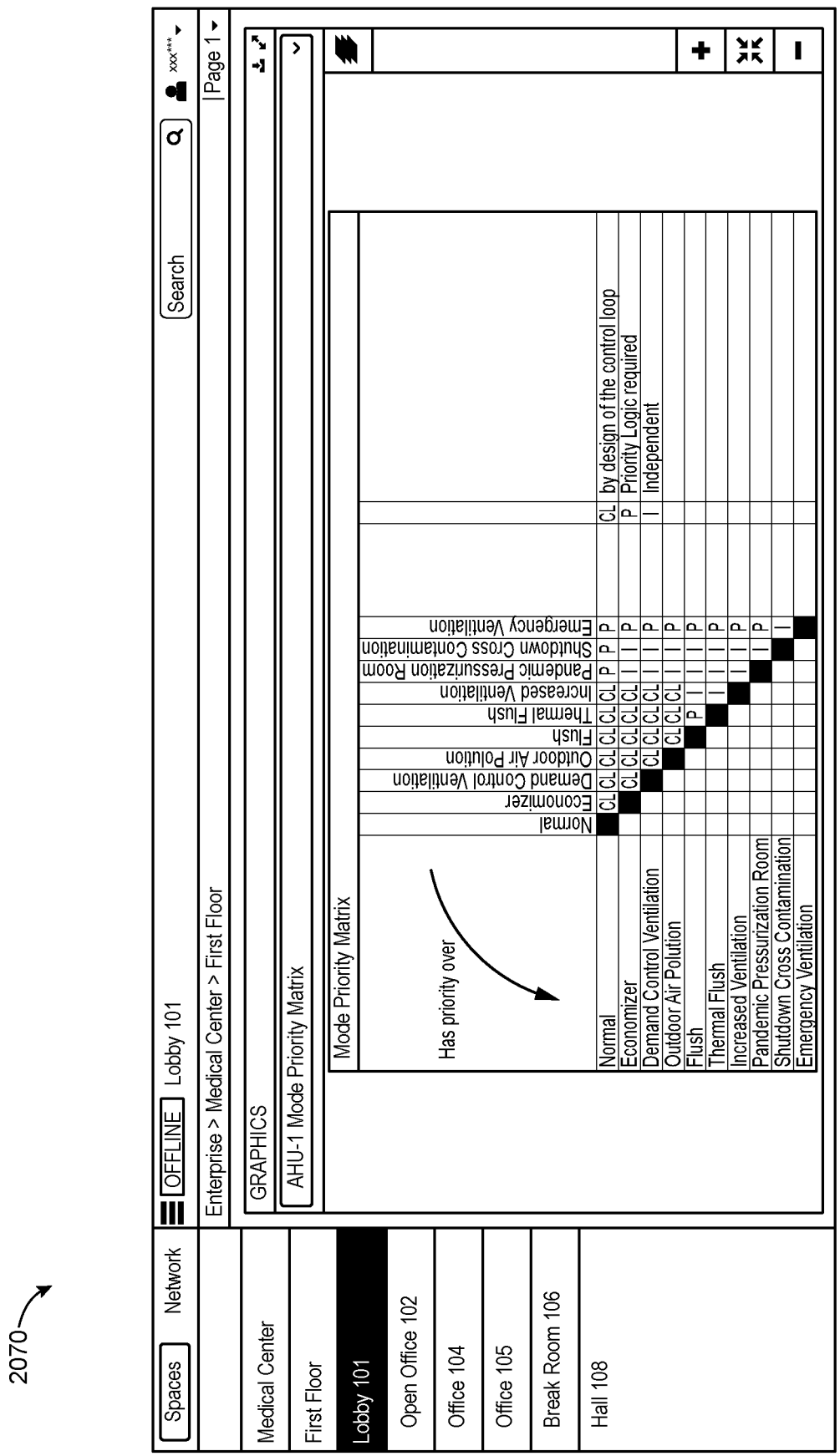
FIG. 20J is a user interface of a mode priority matrix, according to an exemplary embodiment.

Referring now to FIG. 20J, a user interface 2070 of a mode priority matrix is shown, according to an exemplary embodiment. The mode priority matrix indicates the priority of one mode over another mode for a particular AHU, e.g., for a particular space that the AHU serves. A user can review and edit the mode priority matrix to rank one mode over another mode. The operational service 316 can automatically switch between the various modes of the matrix based on the rank of each mode.

Figure 20K:
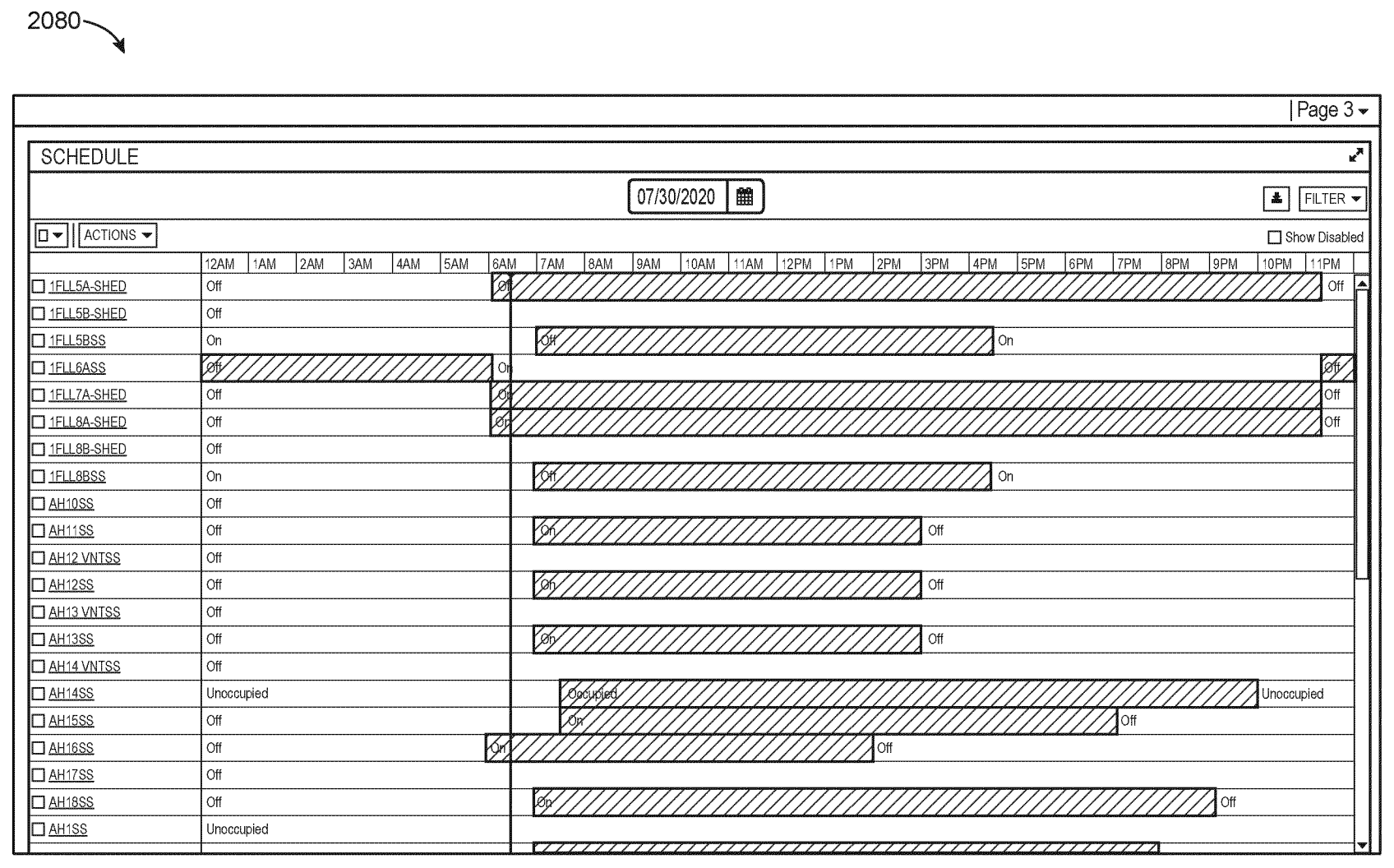

Referring now to FIG. 20K, a user interface 2080 of a schedule that a user can build, according to an exemplary embodiment. The user interface 2080 provides the user the ability to control a schedule of operating modes. The schedule can activate and/or deactivate various modes of the modes 408-442 at various points in time. A user can select times to activate or deactivate one or more of the modes 408-442. Furthermore, the user can indicate occupancy times of spaces of the building. In some embodiments, one or more of the modes 408-442 can trigger activation or deactivation based on the occupied and unoccupied times of the schedule.

Referring now to FIG. 21, a table 2100 illustrating parameters that a user enters via the user interfaces 2000-2014 of FIGS. 20A-20K for various operating modes is shown, according to an exemplary embodiment. Various parameters are shown for the modes of table 2100. The outdoor air pollution mode includes a CO parameter and a PM 2.5 parameter. The demand controlled ventilation mode includes a CO2 parameter. The flush mode includes an OA flow level and a cycle duration parameter. The thermal flush mode includes an OA flow level, a cycle duration, a RH level, and a supply air temperature parameter. The increased ventilation mode includes an OA flow level parameter. The outdoor emergency and pressurization modes do not include any parameters.

Figure 22:
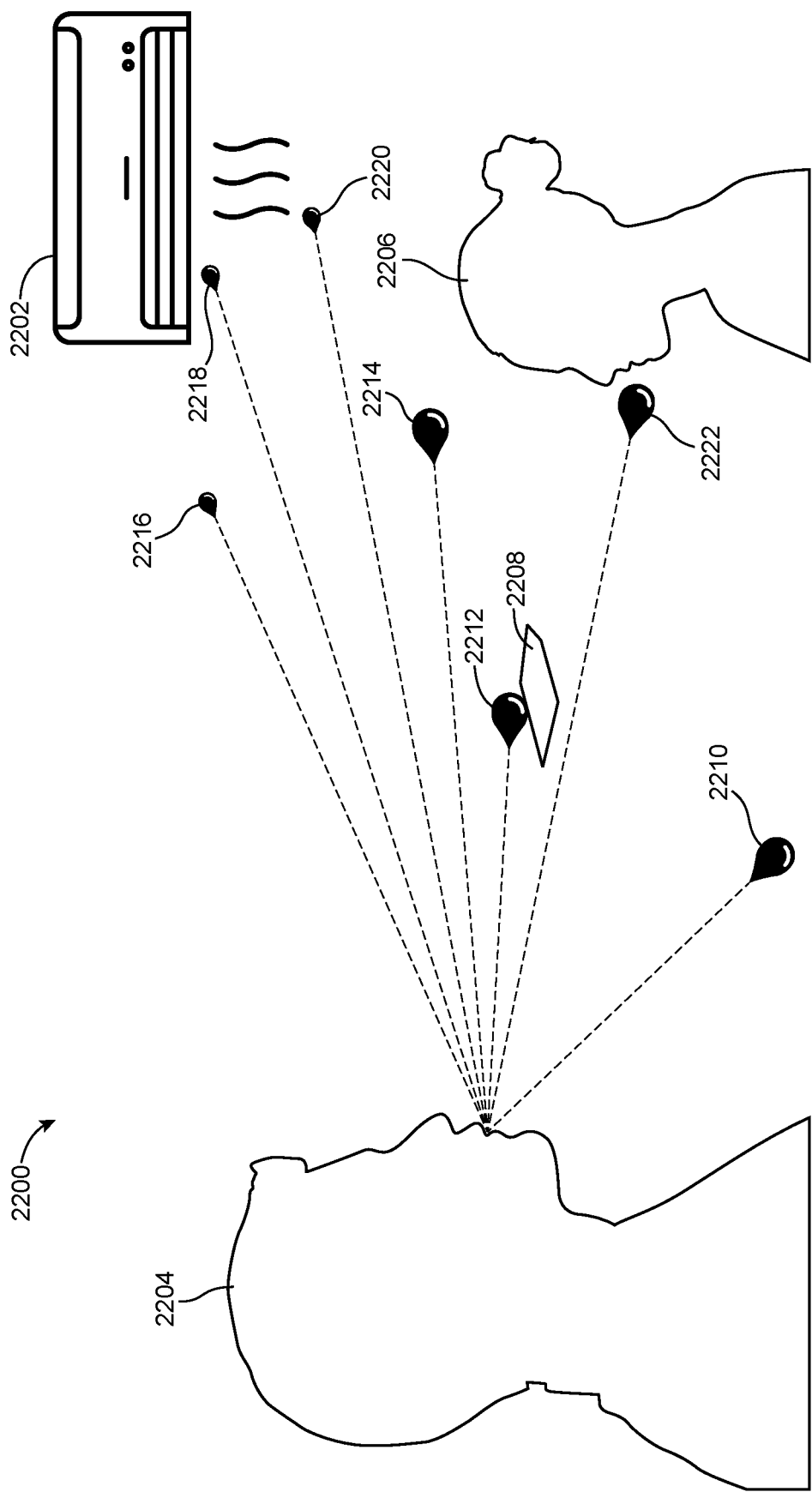
FIG. 22 is a schematic diagram of infected airborne particles in a building that an infected occupant of the building creates, according to an exemplary embodiment.

Referring now to FIG. 22, schematic diagram 2200 of infected airborne particles in a building that an infected occupant of the building creates is shown, according to an exemplary embodiment. In the schematic diagram 2200, infected airborne particles 2210-2222 in a building that an infected occupant 2204 of the building creates. The infected occupant 2204 can be infected with an infectious disease, for example, a respiratory disease. Particles that the infected occupant 2204 breaths out can be dangerous in a building. For example, by breathing, sneezing, or coughing, the infected occupant 2204 can infect the occupant 2206. Small droplets, the particles 2210-2222, are likely to become aerosol and propagate throughout a building.

In some embodiments, the particles 2210-2222 can settle on surfaces, e.g., the surface 2208. Furthermore, the particles 2210-2222 can enter the respiratory tract of the occupant 2206, e.g., the particle 2222 which can infect the occupant 2206. Furthermore, the particles 2210-2222 can enter an HVAC system 2202, e.g., the particles 2216-2220.

Figure 23:
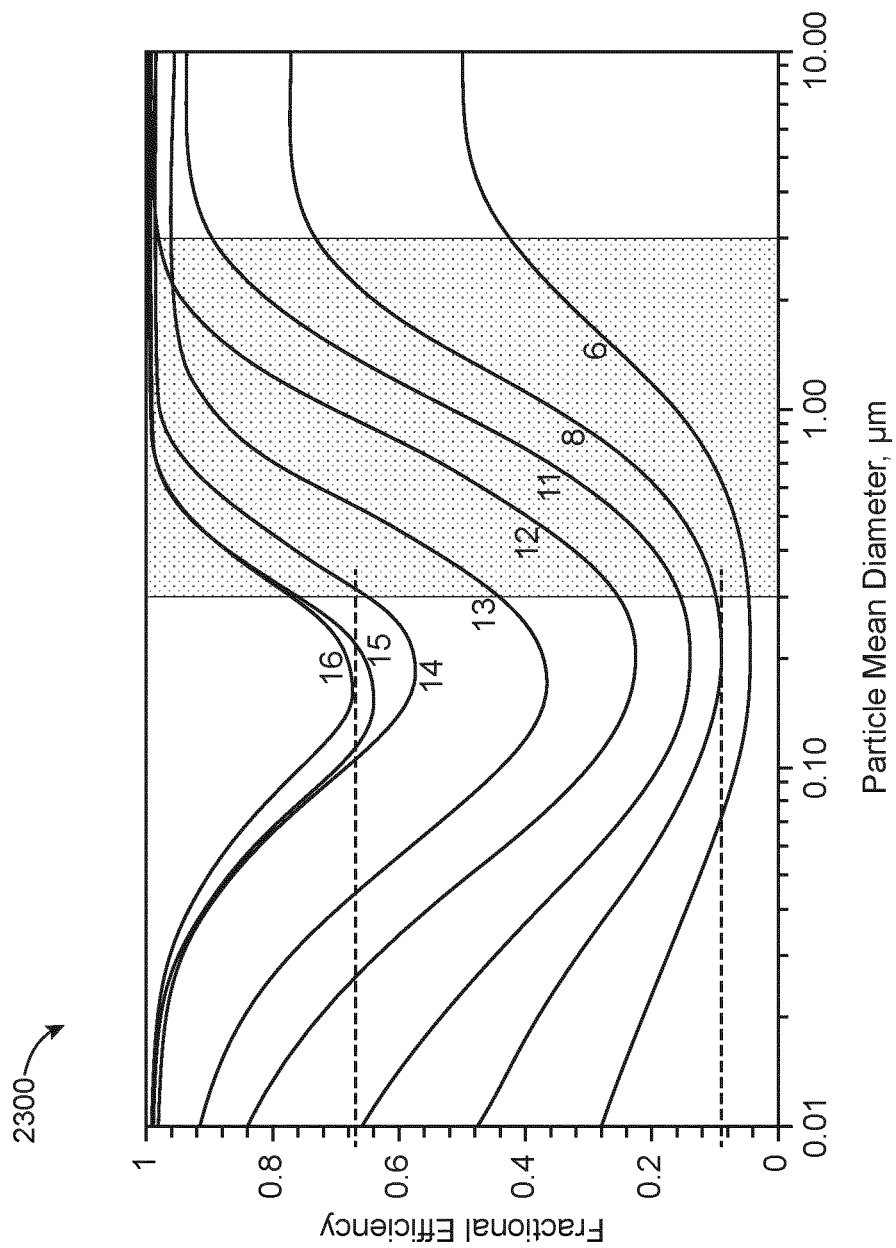
FIG. 23 is a chart indicating the performance of filtration on contaminants, according to an exemplary embodiment.

Referring now to FIG. 23, a chart 2300 indicating the performance of filtration on contaminants is shown, according to an exemplary embodiment. The fractional efficiency of a filter is shown for various particle diameters. For example, a virus such as COVID-19 may have a particle diameter of 0.06-0.14 μm, influenza may have a particle diameter of 0.08-0.12 μm, human droplets (e.g., from coughing or normal activities) may be 0.3 to <3 μm. In some embodiments, changing a filter from MERV8 to MERV14 significantly increases the filter efficacy to the particle sizes considered.

In some embodiments, the retrofit service 320 can generate a recommendation for a filter type based on the particle size of a particular infectious disease and the fractional efficiency (e.g., the chart 2300) at the particular size of the infectious disease. In this regard, the retrofit service 320 can recommend the most cost appropriate filter for a particular infectious disease.

Figure 24:
FIG. 24 is a chart indicating the performance of different rated filters, according to an exemplary embodiment.

Referring now to FIG. 24, a chart 2400 indicating the performance of different rated filters is shown, according to an exemplary embodiment. The chart 2400 indicates MERV filter ratings, depth ratings, airflow ratings, initial pressure delta ratings, media area ratings, and relative cost. The retrofit service 320 can generate filter recommendations for a building based on the chart 2400. In some cases, changing filter frame to a thicker size can be a cheaper option than changing a fan. In some cases, increasing MERV for a fix depth often increases differential pressure. In some embodiments, increasing depth for a given MERV decrease differential pressure and provides longer life. In some cases, the longer the life the higher the fan power.

Figure 25:
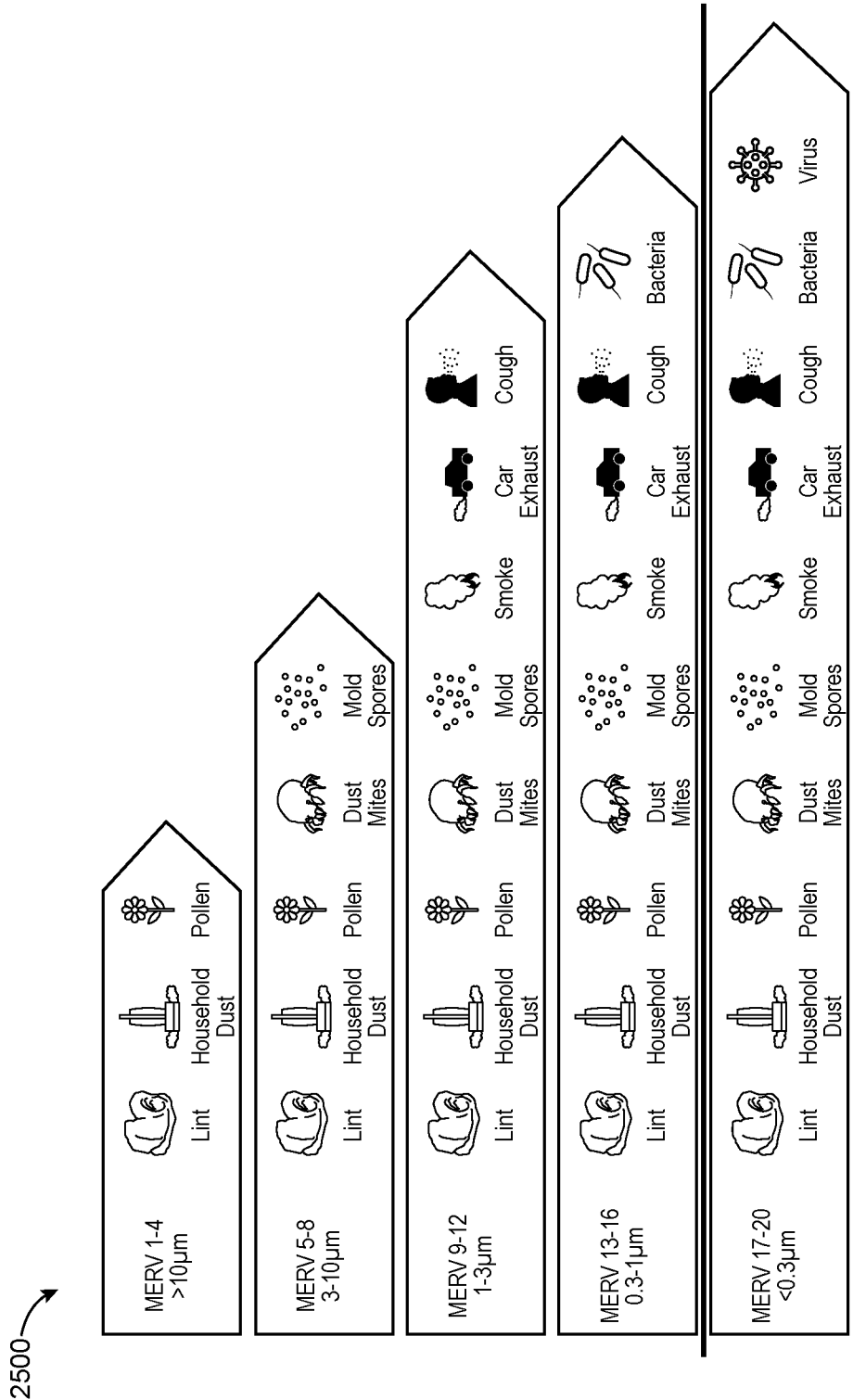
FIG. 25 is a chart illustrating the influence of filtration on contamination, according to an exemplary embodiment.

Referring now to FIG. 25, a chart 2500 illustrating the influence of filtration on contamination is shown, according to an exemplary embodiment. The chart 2500 indicates particles that are blocked for different MERV ratings. For a MERV 1-4 rated filter, the filter blocks lint, household dust, and pollen are blocked. For a MERV 5-8 rated filter, the filter blocks lint, household dust, pollen, dust mites, mold spores. For a MERV 9-12 rated filter, the filter blocks lint, household dust, pollen, dust mites, mold spores, smoke, car exhaust, and particles from a human cough. For a MERV 13-16 rated filter, the filter blocks lint, household dust, pollen, dust mites, mold spores, smoke, car exhaust, particles from a human cough, and bacteria. For a MERV 17-20 rated filter, the filter blocks lint, household dust, pollen, dust mites, mold spores, smoke, car exhaust, particles from a human cough, bacteria, and viruses.

The retrofit service 320 can be configured to select a MERV rating for a new filter for a building based on the chart 2500 and a particular emergency situation. For example, for a virus pandemic, the retrofit service 320 can select a MERV 17-20 filter. For a bacterial infection situation, the retrofit service 320 can select a MERV 13-16 filter.

Figure 26:
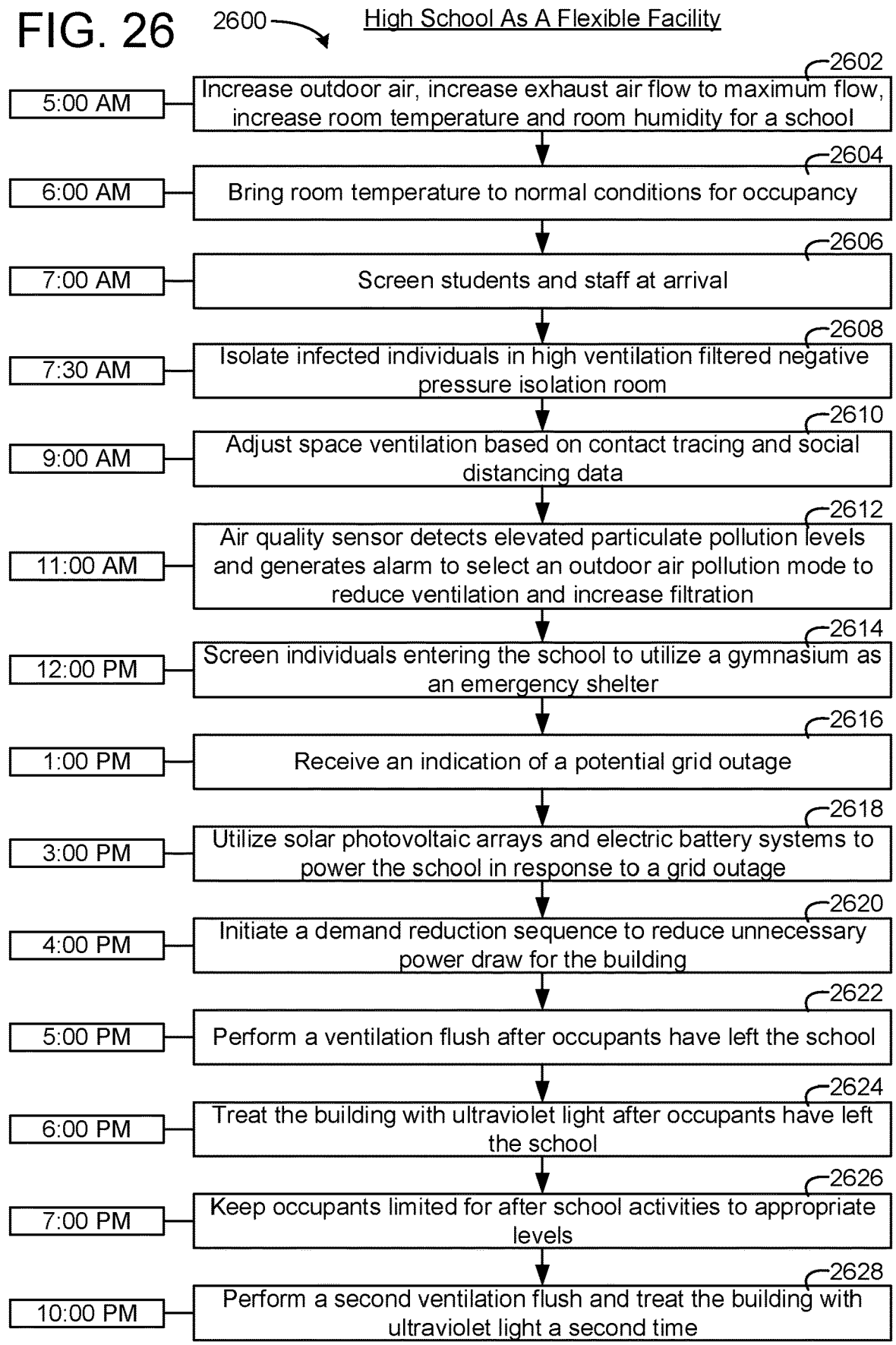
FIG. 26 is a flow diagram of a process 2600 for operating a high school building as a flexible facility that can be performed by the building manager system of FIG. 3, according to an exemplary embodiment.

Referring now to FIG. 26, a flow diagram of a process 2600 for operating a high school building as a flexible facility that can be performed by the operational service 316 is shown, according to an exemplary embodiment. The operational service 316 can allow for a facility, e.g., a school to respond flexibly to health emergencies and/or natural disasters. The operational service 316 can operate building systems with operating strategies and equipment configurations that adapt to new requirements and/or emergencies so that staff and visitors are kept safe and healthy regardless of conditions surrounding the building.

At midnight, at a rural community high school, disease related cases are slowly decreasing with an occasional increase up making vigilance important. The high school is currently empty and is ventilated at a reduced rate while in unoccupied ventilation mode, while disinfectant lights to help disinfect the air in classrooms and other spaces as operated by the operational service 316.

In step 2602, at 5:00 AM, the operational service 316 increases outdoor air and exhaust air flow to maximum flow rates, e.g., operating based on the increasing outdoor air mode 410. The operational service 316 also increases room temperatures and humidity which reduces the transfer of the disease. In step 2604, at 6:00 AM the operational service 316 starts to bring room temperatures back to normal conditions for occupancy, e.g., by operating based on the normal mode 408.

In step 2606, at 7:00 AM, the school opens and students and staff enter the building securely and safely, focused on a day of learning. The occupants are screened at the entrance with thermal scanning cameras operated by the operational service 316. Anyone with an elevated skin temperature waits for 20 minutes in a nearby isolation room maintaining negative pressure based on operation of the operational service 316 to avoid infecting others. If a second temperature measurement indicates a fever or other symptoms, then the student is escorted to the nurse's office.

In step 2608, at 7:30 AM, a student arrives with a high temperature. The student is brought to the nurse's office and the student's parents are contacted and asked to pick up their child. While the student waits, they rest in the nurse's office or an adjacent patient room, both of which are highly ventilated and filtered negative pressure isolation rooms as controlled by the operational service 316. In some embodiments, the operational service 316 operates the pressure isolation rooms based on the space pressurization mode 426.

In step 2610, at 9:00 AM, the occupant detection system installed to enforce social distancing and support student contact tracing for health purposes is also used by the operational service 316 to adjust ventilation rates to actual space occupancy throughout the day, e.g., by operating based on the demand controlled ventilation mode 416. This assures adequate ventilation while reducing unnecessary energy use and cost.

In step 2612, at 11:00 AM, the outdoor air quality sensor detects elevated particulate pollution levels and the operational service 316 sends an alarm to the school district's facility director. There have been a number of wild fires recently one has started close to the school. Despite being off site, the facility director uses a mobile application managed by the user interface manager 314 to select the outdoor air pollution mode 422 for the operational service 316 to operate based on. Operation in the outdoor air pollution mode 422 reduces ventilation rates but increases filtration using high performance filters installed to protect non-acute healthcare patients in quarantine during initial pandemic surge.

In step 2614, at 12:00 PM, the school is notified that a nearby neighborhood is being evacuated by the emergency notification system 304 and they will be using the high school gymnasium as an emergency shelter. The thermal sensing cameras at the entrance will help screen incoming community members for elevated temperatures and other symptoms. Ventilation and filtration is increased in the gym as an extra precaution by the operational service 316, e.g., by operating based on the increasing outdoor air mode 410.

In step 2616, at 1:00 PM, the local utility is warning of potential grid outages due to the increase in wild fires via the emergency notification system 304. The building manager checks the backup generator testing and maintenance compliance report to confirm readiness and prepare the facility to operate on emergency stand-by power. The solar PV and electric battery system, which normally operate to improve efficiency and maximize utility incentives, will instead be used to improve resiliency during a potential grid outage. In step 2618, at 3:00 PM, the electric grid goes out and the facility switches to back-up power generation which maintains power for critical services such as HVAC and lighting.

In step 2620, at 4:00 PM, with an increased electrical demand for charging mobile devices, refrigerating food, and other critical demands, the building manager initiates a demand reduction sequence for reducing non-critical loads, dimming lights and adjusting temperatures which is normally used to capture utility demand response incentives e.g., the building manager causes the operational service 316 to operate based on the energy demand reduction mode 446.

In step 2622, at 5:00 PM, the electric grid comes back on and the local wild fire has been contained. As outdoor air quality improves and full ventilation is restored, community members, students and staff return to their homes. A two hour ventilation flush is initiated to help disinfect the facility in addition to a thorough physical cleaning, e.g., the operational service 316 operates based on the flush mode 432.

In step 2624, at 6:00 PM, because a student was isolated in the nurse's room during the day, after unoccupied conditions are confirmed by the operational service 316, the space is set for disinfectant light treatment by the operational service 316 which helps cleanse viral contamination on surfaces, e.g., by operating based on the disinfectant light sterilization mode 428.

In step 2626, at 7:00 PM, after school activities are in full swing, the baseball team has practice and the debate club is meeting. There is a school board meeting in the auditorium discussing how the district can leverage federal stimulus funding and performance based contracting to meet ASHRAE standards to help keep buildings safe. The access control system managed by the operational service 316 helps keep guests limited to appropriate areas of the building.

In step 2628, at 10:00 PM, the facility again increases ventilation to flush the building while unoccupied and disinfectant lighting is set to do its work over night to help treat viral contamination, e.g., the operational service 316 operates according to the flush mode 432 and/or the disinfectant light sterilization mode 428. This is just one example of the flexible facility operation provided by the operational service 316 that can help schools implement rapid infrastructure renewal to assure safe, efficient and resilient operations and flexible emergency response.

Figure 27:
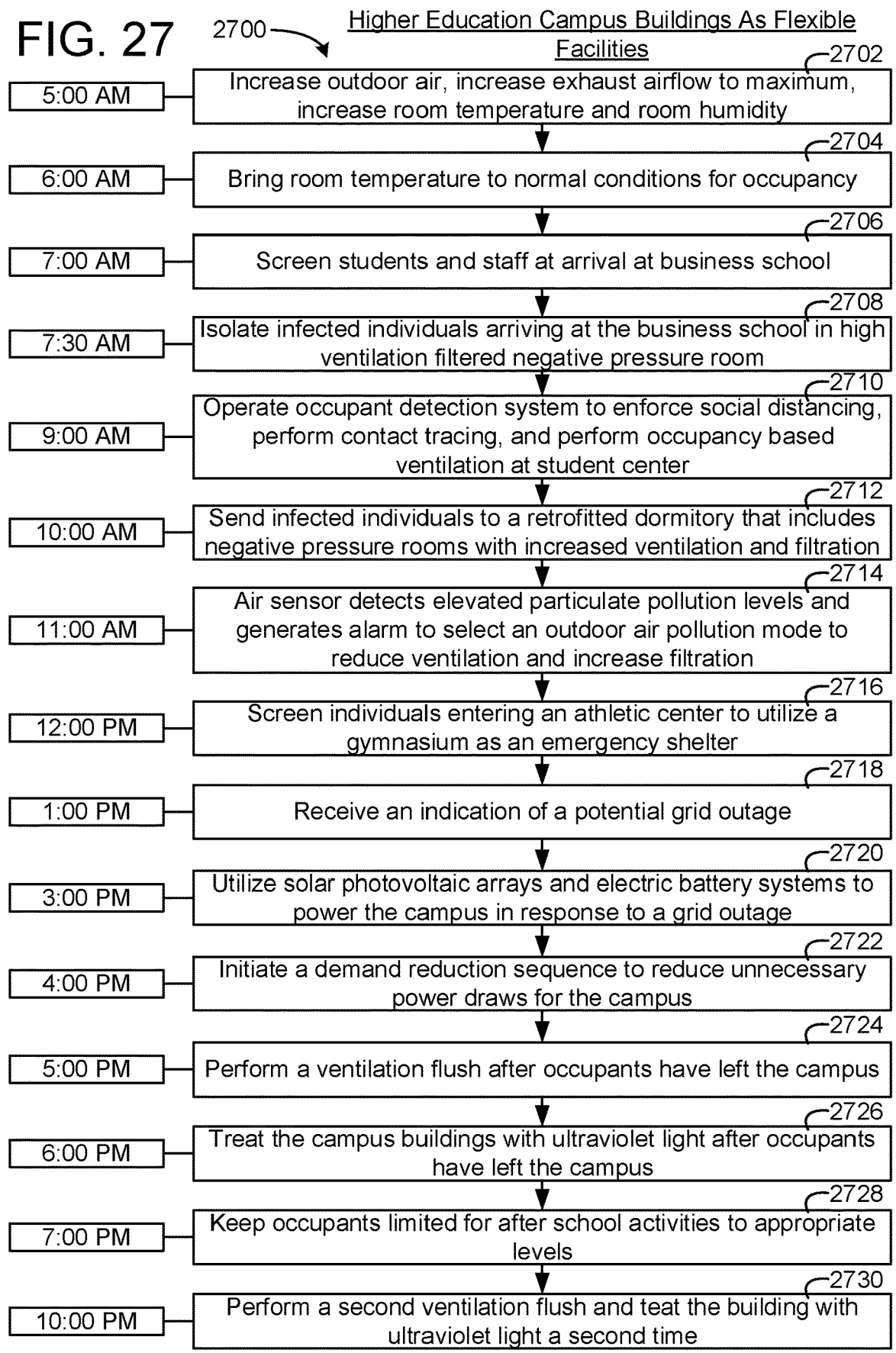
FIG. 27 is a flow diagram of a process 2700 for operating buildings of a higher education campus as flexible facilities that can be performed by the building manager system of FIG. 3, according to an exemplary embodiment.

Referring now to FIG. 27, a flow diagram of a process 2700 is shown for operating buildings of a higher education campus as flexible facilities that can be performed by the operational service 316, according to an exemplary embodiment. The operational service 316 can allow for a higher education campus to respond flexible to health emergencies and natural disasters. The operational service 316 can operate building systems with operating strategies and equipment configurations that adapt to new requirements and emergencies so that staff and visitors are kept safe and healthy regardless of conditions surrounding the building. The process 2700 illustrates the operation of the operational service 316 for a rural private college.

At midnight, it is another day at a rural private college and disease cases continue to slowly decrease with an occasional increase up making vigilance still important. An empty lecture hall of the campus is ventilated at a reduced rate while in unoccupied ventilation mode, while disinfection lights continue to help disinfect the air in classrooms and other spaces as operated by the operational service 316, e.g., the operational service 316 operating based on the disinfectant light sterilization mode 428.

In step 2702, at 5:00 AM, the operational service 316 increases outdoor air and exhaust air flow to maximum flow rates, e.g., operating based on the flush mode 432. The operational service 316 also increases room temperatures and humidity which reduces the transfer of the coronavirus, e.g., operating based on the thermal flush mode 434. In step 2704, at 6:00 AM, the operational service 316 starts to bring room temperatures back to normal conditions for occupancy, e.g., operating based on the normal mode 408.

In step 2706, at 7:00 AM, classes are about to begin and students and faculty are entering buildings across campus securely and safely, focused on a day of learning. They are screened at entrances with thermal scanning cameras. Anyone with an elevated skin temperature waits for 20 minutes in a nearby isolation room maintaining negative pressure to avoid infecting others, the negative pressure room being controlled by the operational service 316 via the space pressurization mode 426. If a second temperature measurement indicates a fever or other symptoms, then the student is sent to the health center.

In step 2708, at 7:30 AM, unfortunately a student arrives at the business school with a temperature. They are sent to the health center for further evaluation. While the student waits, they rest in an adjacent patient room, which is a highly ventilated and filtered negative pressure isolation room that is operated by the operational service 316.

In step 2710, at 9:00 AM, back at the student center, the occupant detection system, controlled by the operational service 316, installed to enforce social distancing and support student contact tracing for health purposes is also used to adjust ventilation rates to actual space occupancy throughout the day, e.g., operating based on the demand controlled ventilation mode 416. This assures adequate ventilation while reducing unnecessary energy use and cost.

In step 2712, at 10:00 AM, the student still has a fever and based upon guidelines, they are sent to a dormitory that has been retrofitted for quarantine as not all students can be sent home. The retrofitted dormitory is operated by the operational service 316. The operational service 316 operates to maintain negative pressure in individual rooms as well as provide increased ventilation rates and filtration to prevent the potential spread of illness, e.g., by operating based on the space pressurization mode 426.

In step 2714, at 11:00 AM, the outdoor air quality sensor detects elevated particulate pollution levels and sends an alarm to the school district's facility director. After severe storms last night, the waste from large-scale nearby industrial farms has drifted to the college campus. Despite being off site, the facility director uses a mobile application to select the outdoor air pollution mode 420 that the operational service 316 operates to reduce ventilation rates but increases filtration using high performance filters.

In step 2716, at 12:00 PM, as a result of the storms, the campus is notified that a nearby neighborhood is being evacuated and they will be using the gymnasium at the athletic center as an emergency shelter via the emergency notification system 304. Thermal sensing cameras at the entrance will help screen incoming community members for elevated temperatures and other symptoms. Ventilation and filtration is increased in the gym as an extra precaution by the operational service 316.

In step 2718, at 1:00 PM, the local utility is warning of potential grid outages due to the recent severe storms. The campus facilities manager checks the backup generator testing and maintenance compliance report to confirm readiness and prepare the facility to operate on emergency stand-by power. The solar PV and electric battery system, which normally operate to improve efficiency and maximize utility incentives, will instead be used to improve resiliency during a potential grid outage.

In step 2720, at 3:00 PM, the electric grid goes out and the campus switches to back-up power generation which maintains power for critical services such as HVAC and lighting. In step 2722, at 4:00 PM, with an increased electrical demand for charging mobile devices, refrigerating food and other critical items at the gym, the building manager initiates the demand controlled ventilation mode 416 that the operational service 316 operates to reduce non-critical loads, dimming lights and adjusting temperatures which is normally used to capture utility demand response incentives.

In step 2724, at 5:00 PM, the electric grid comes back on as crews work to address the downed power lines from the storms. As outdoor air quality improves and full ventilation is restored, community members return to their homes. A two hour ventilation flush is initiated to by the operational service 316, e.g., operating according to the flush mode 432, to help disinfect the gymnasium in addition to a thorough physical cleaning.

In step 2726, at 6:00 PM, because a student was isolated in the health center during the day, after unoccupied conditions are confirmed by the control system, the space is set for disinfection treatment by the operational service 316 through the disinfectant light sterilization mode 428, which helps cleanse viral contamination on surfaces.

In step 2728, at 7:00 PM, evening activities are in full swing, the baseball team has practice and there is an evening microbiology class. The board of trustees is meeting in the auditorium discussing how the campus can leverage federal stimulus funding and performance-based contracting to meet ASHRAE standards to help keep buildings safe. The access control system helps keep guests limited to appropriate areas of the building.

In step 2730, at 10:00 PM, the campus again increases ventilation to flush the building while unoccupied and disinfection lighting is set to do its work over night to help treat viral contamination in classrooms based on the operational service 316 operating according to the flush mode 432 and the disinfectant light sterilization mode 428. This is just one example of the higher education campus operating flexibly as implemented by the operational service 316 to implement rapid infrastructure renewal to assure safe, efficient and resilient operations and flexible emergency response.

Figure 28:
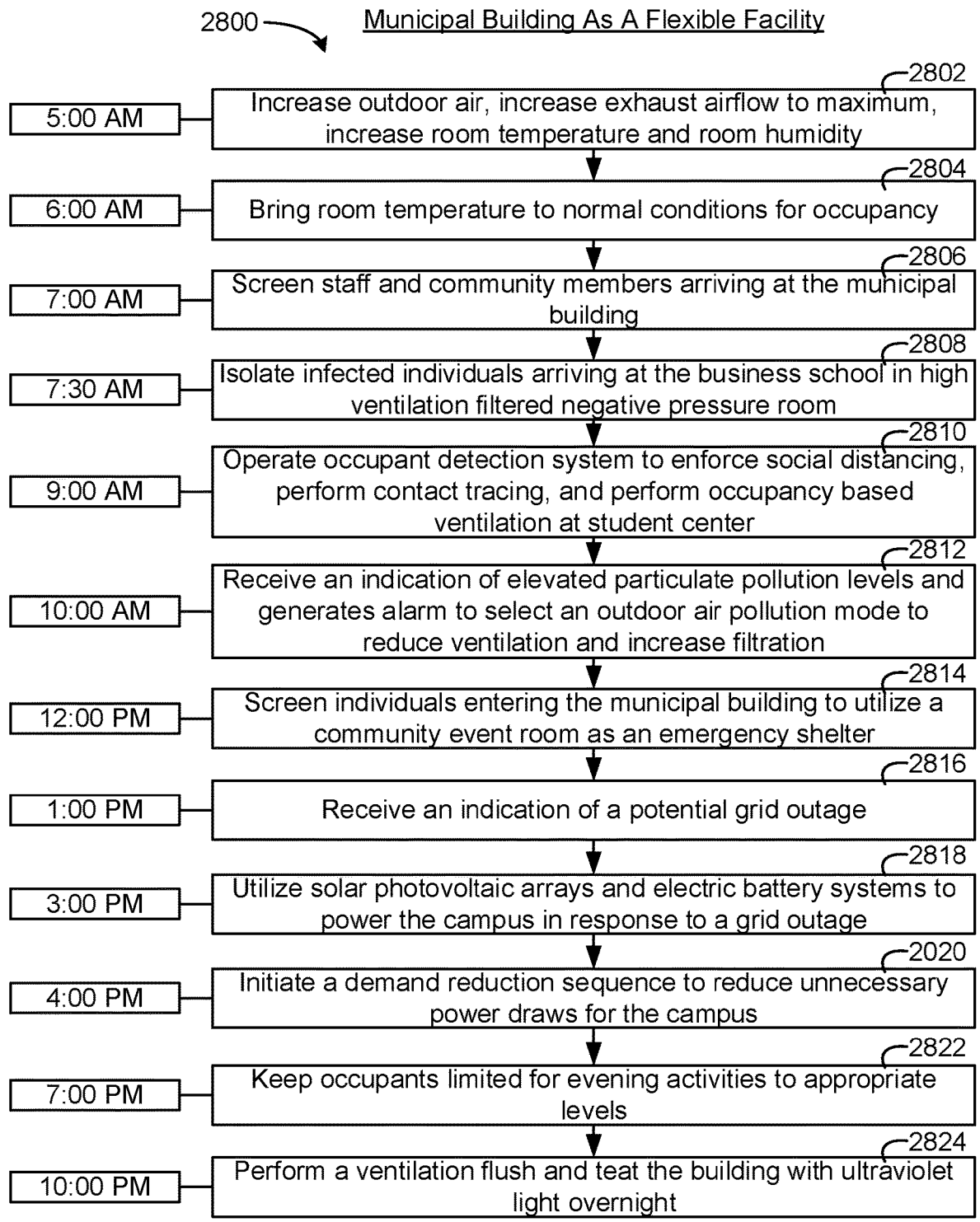
FIG. 28 is a flow diagram of a process 2800 for operating a municipal building as a flexible facility that can be performed by the building manager system of FIG. 3, according to an exemplary embodiment.

Referring now to FIG. 28, is a flow diagram of a process 2800 for operating a municipal building as a flexible facility that can be performed by the building manager 306, according to an exemplary embodiment. The operational service 316 can allow for a municipal civic center to respond flexibly to health emergencies and natural disasters. The operational service 316 can operate building systems with operating strategies and equipment configurations that adapt to new requirements and emergencies so that staff and visitors safe and healthy regardless of conditions surrounding the building.

At midnight, it is a new day for mixed use municipal building in a community where disease cases continue to slowly decrease with an occasional flare up making vigilance still important. The municipal building is ventilated at a reduced rate while in unoccupied ventilation mode by the operational service 316, while disinfection lights, operated by the operational service 316, continue to help disinfect the air in the library, council chamber, treasurer's office, building permits department and other spaces.

In step 2802, at 5:00 AM, the operational service 316 increases outdoor air and exhaust air flow to maximum flow rates. The operational service 316 also increases room temperatures and humidity which reduces the transfer of the coronavirus. In step 2804, at 6:00 AM, the operational service 316 starts to bring room temperatures back to normal conditions for occupancy.

In step 2806, at 7:00 AM, the building opens with staff and community members entering the building securely and safely, focused on community affairs. They are screened at the entrance with thermal scanning cameras operated by the operational service 316. Anyone with an elevated skin temperature waits for 20 minutes in a nearby isolation room operated by the operational service 316 maintaining negative pressure to avoid infecting others. The isolation room can be operated to be a negative pressure area based on the operational service 316 operating based on the space pressurization mode 426. If a second temperature measurement indicates a fever, the individual is directed to check with their health professional and is sent home.

In step 2808, at 9:00 AM, the occupant detection system installed to enforce social distancing and support contact tracing for health purposes is also used to adjust ventilation rates to actual space occupancy throughout the day, e.g., the operational service 316 operates based on the demand controlled ventilation mode 416. This assures adequate ventilation while reducing unnecessary energy use and cost.

In step 2810, at 10:00 AM, the air quality monitoring application, integrated with a weather forecast site, indicates elevated particulate pollution levels due to unusually high pollen count and the facility director gets an alarm message. Despite being off site, the facility director uses a mobile application to select the outdoor air pollution mode 420 operated by the operational service 316 that reduces ventilation rates but increases filtration using high performance filters installed to protect non-acute to maintain adequate indoor environmental quality.

In step 2812, at 11:00 AM, the building manager is notified of potential flooding. There has been heavy rain in the past few days and despite being off site, the facility director uses a mobile application to check the backup generator testing and maintenance compliance report to confirm readiness and prepare the facility to operate on emergency stand-by power.

In step 2814, at 12:00 PM, the municipal building is notified by the emergency notification 402 that a nearby neighborhood is being evacuated due to flooding and the community event room will be used as an emergency shelter. The thermal sensing cameras at the civic center entrance will help screen incoming community members for elevated temperatures and other symptoms. Ventilation and filtration is increased in the civic center as an extra precaution by the operational service 316.

In step 2816, at 1:00 PM, the local utility is warning of potential grid outages due to the rising flood water impacting the pumping station. The solar PV and electric battery system, which normally operate to improve efficiency and maximize utility incentives, will instead be used to improve resiliency during a potential grid outage. In step 2818, at 3:00 PM, the electric grid goes out and the facility switches to back-up power generation which maintains power for critical services such as HVAC and lighting. In step 2820, at 4:00 PM, with an increased electrical demand for charging mobile devices, refrigerating food and other emergency shelter uses, the building manager initiates the operational service 316 to operate the energy demand reduction mode 446 for non-critical loads, dimming lights and adjusting temperatures which is normally used to capture utility demand response incentives.

In step 2822, at 7:00 PM, the municipal building is busy with evening events. The local toastmaster's club is meeting, students are studying in the library and there is a City Council meeting in the chambers room and the access control system helps keep guests limited to appropriate areas of the building. Discussion on how the city can leverage federal stimulus funding and performance-based contracting to meet ASHRAE standards to help keep other public buildings safe, efficient, and resilient.

In step 2824, at 10:00 PM, because of the amount of regular traffic and confirmation of elevated temperatures at the entrance, the isolation room, after unoccupied conditions are confirmed by the control system, the operational service 316 again increase ventilation and the space is set for disinfectant light treatment which helps cleanse viral contamination on surfaces as operated by the operational service 316, e.g., the operational service 316 operates based on the flush mode 432 and/or the disinfectant light sterilization mode 428. At 11:00 PM, the operational service 316 again increases ventilation to flush the civic center buildings when unoccupied and disinfection lighting is set to do its work over night to help treat viral contamination, e.g., the operational service 316 operates based on the flush mode 432. This is just one example of the municipal building operating flexibly as implemented by the operational service 316 to implement rapid infrastructure renewal to assure safe, efficient and resilient operations and flexible emergency response.

Figure 29:
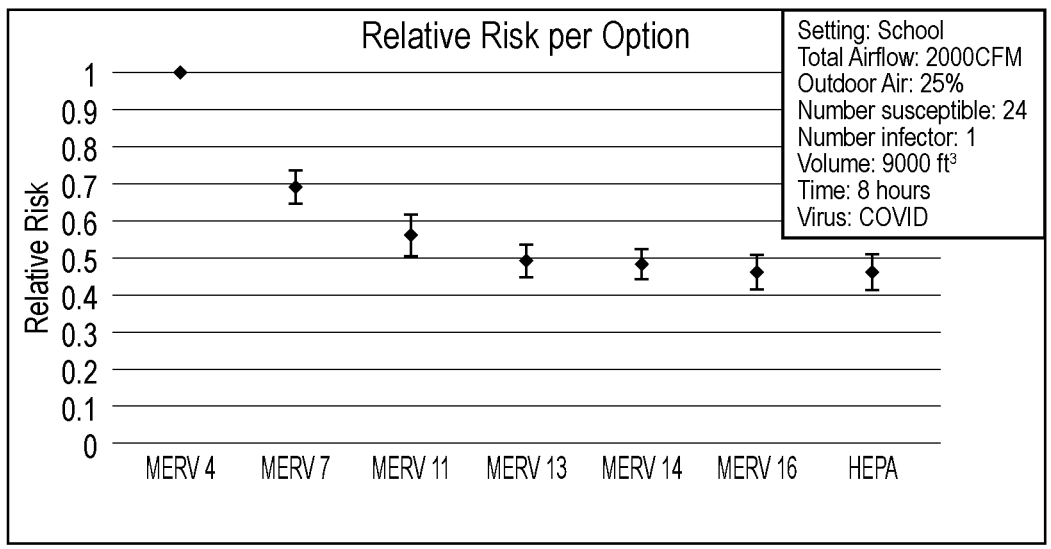
FIG. 29 is a chart illustrating a risk level of infection of an infectious disease for various filter ratings, according to an exemplary embodiment.

Referring now to FIG. 29, a chart 2900 illustrating a risk level of infection of an infectious disease for various filter ratings is shown, according to an exemplary embodiment. The chart 2900 indicates a relative risk level for various MERV filters and a HEPA filter. The chart 2900 indicates risk levels for MERV 4, 7, 11, 13, 14, and 16 MERV filters. The relative risk levels are calculated assuming the filter is implemented in an AHU of a school where there is a total airflow of 2000 CFM, the supply air is 25% outdoor air, there are 24 susceptible in the building, there is one infector, the volume is 9,000 cubic feet, the time is eight hours, and the virus is COVID-19.

The relative risk levels can be calculated by the retrofit service 320 for each filter. In some embodiments, the retrofit service 320 uses the Wells-Riley equation, or a form of the Wells-Riley equation, to calculate the risk levels. The chart 2900 can be used by the retrofit service 320 for selecting a particular filter.

Figure 30:
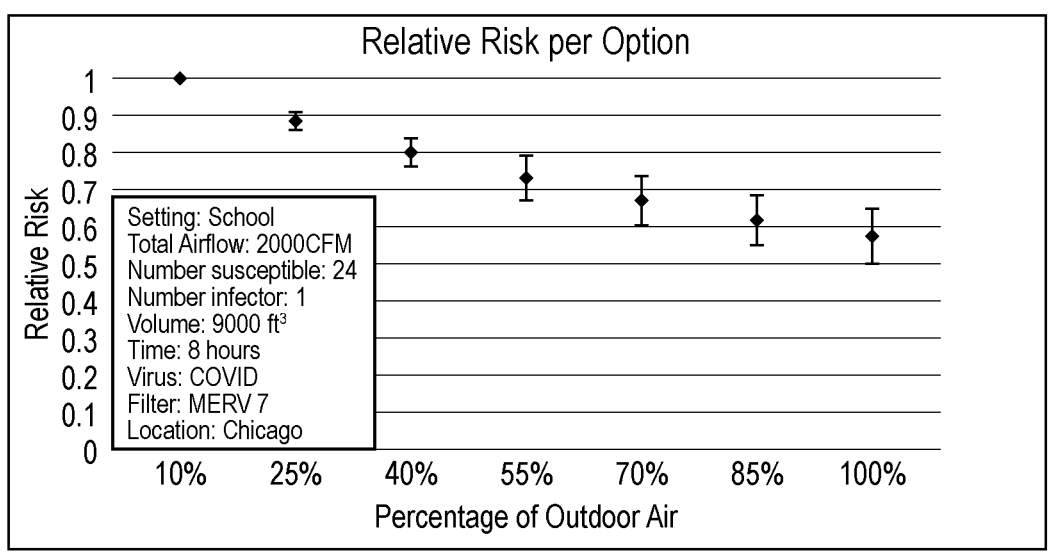
FIG. 30 is a chart illustrating a risk level of infection of an infectious disease for various levels of outdoor air flow, according to an exemplary embodiment.

Referring now to FIG. 30, is a chart 3000 illustrating a risk level of infection of an infectious disease for various levels of outdoor air flow, according to an exemplary embodiment. The chart 3000 indicates a relative risk level for various percentages of outdoor air. An AHU may mix return air with outdoor air and provide the mixed air as supply air to a building. The chart 3000 indicates risk levels for 0 to 100% outdoor air. The setting is a school for the chart 3000 with a total airflow of 2000 CFM, for 24 susceptible, one infector, a volume of 9000 cubic feet, a time of eight hours, for the COVID-19 virus, for a MERV 7 filter, and where the school is located in Chicago.

Figure 31:
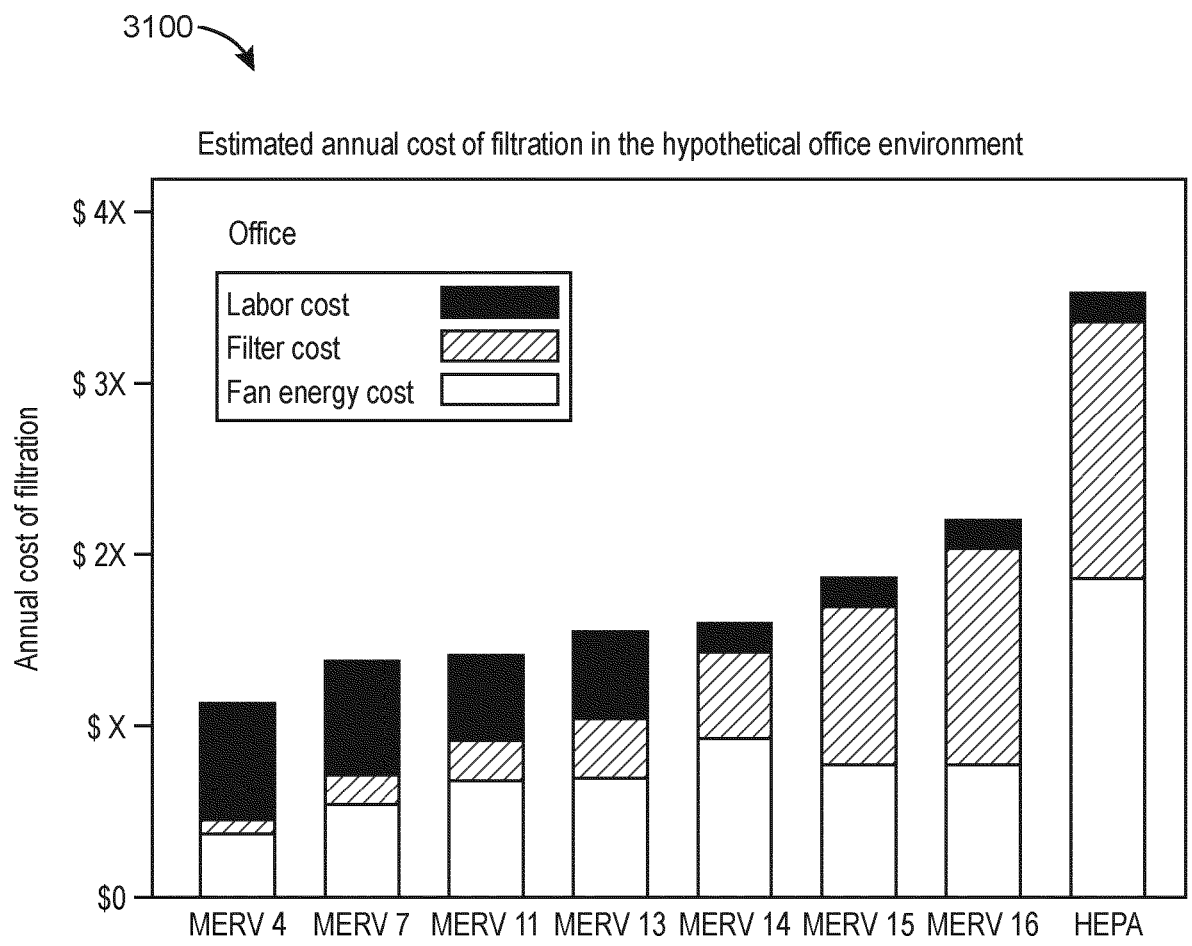
FIG. 31 is a chart illustrating annual costs associated with a filtration system for various filter ratings, according to an exemplary embodiment.

Referring now to FIG. 31, a chart 3100 illustrating annual costs associated with a filtration system for various filter ratings, according to an exemplary embodiment. The chart 3100. The filter costs may be costs of an AHU filter of an AHU. The chart 3100 indicates labor cost, filter cost, and fan energy cost for various MERV ratings and HEPA. The chart 3100 indicates cost for MERV 4, MERV 7, MERV 11, MERV 13, MERV 14, MERV 15, and MERV 16.

In some embodiments, the retrofit service 320 can perform an optimization to identify the appropriate filter for an AHU based on risk levels associated with various filters and annual costs for the filters. Furthermore, the retrofit service 320 can perform an optimization to select a corresponding outdoor air percentage to use in operating the AHU. The retrofit service 320 can perform the optimization with the charts 2900-3100.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed:

1. A building system for a building comprising one or more storage devices storing instructions thereon that, when executed by one or more processors, cause the one or more processors to:
   receive, via a graphical user interface from a user device, a prioritization of a plurality of operating modes comprising a first operating mode and a second operating mode, the prioritization prioritizing the second operating mode over the first operating mode;
   operate one or more pieces of building equipment to supply air to a building space based on the first operating mode, wherein the first operating mode defines one or more first parameters for the one or more pieces of building equipment to control one or more environmental conditions of the building space, wherein the one or more environmental conditions are at least one of a temperature of the supply air or a humidity of the supply air;
   determine to update operation of the building space based on an emergency situation relating to an infectious disease and the prioritization of the second operating mode over the first operating mode; and
   responsive to a determination to update the operation of the building space based on the emergency situation and the prioritization, actively operate the one or more pieces of building equipment based on the second operating mode, wherein the second operating mode is an emergency response mode that defines one or more second parameters for the one or more pieces of building equipment and is adapted to reconfigure the operation of the building space to control the one or more environmental conditions of the building space to reduce a probability of a spread of the infectious disease between occupants located within the building space while the occupants remain within the building space by controlling at least one of the temperature of the supply air or the humidity of the supply air to deactivate the infectious disease while maintaining a particular level of environmental comfort for the occupants.

2. The building system of claim 1, wherein the emergency situation further includes at least one of polluted outdoor air, an electric grid emergency, or a weather emergency.

3. The building system of claim 1, wherein operating the one or more pieces of building equipment based on the first operating mode controls the one or more environmental conditions of the building space based on a primary use of the building space;
   wherein operating the one or more pieces of building equipment based on the second operating mode controls the one or more environmental conditions of the building space to repurpose the building space from the primary use to a temporary alternate use.

4. The building system of claim 1, wherein the instructions cause the one or more processors to:
   receive an indication of one or more existing building systems of the building;
   receive an indication of one or more operating goals of the building;
   identify one or more recommended building systems based on the one or more existing building systems and the indication of the one or more operating goals of the building; and
   cause a display device of the user device of a user to display a recommendation indicating the one or more recommended building systems.

5. The building system of claim 1, wherein the instructions cause the one or more processors to implement a remote service configured to:
   collect data of the one or more pieces of building equipment;
   derive one or more performance insights from the data collected from the one or more pieces of building equipment; and
   cause a display deice of the user device of a user to display at least one of the data or the one or more performance insights.

6. The building system of claim 1, wherein the instructions cause the one or more processors to receive the indication to update the operation of the building space by receiving a selection of the second operating mode from the plurality of operating modes, the plurality of operating modes including the first operating mode and the second operating mode.

7. The building system of claim 6, wherein the plurality of operating modes include one or more comfort and efficiency modes, wherein the one or more comfort and efficiency modes include at least one of:
   a normal mode that includes one or more normal mode parameters to control a temperature of the building; or
   an economizer mode that includes one or more economizer mode parameters that cause an economizer of an air handler unit to operate one or more dampers to utilize outdoor air to meet a cooling demand of the building.

8. The building system of claim 6, wherein the plurality of operating modes include one or more indoor environmental quality modes including at least one of:
   a demand control ventilation mode that includes one or more demand control ventilation mode parameters that cause the one or more pieces of building equipment to ventilate the building based on at least one of carbon dioxide ($CO_2$) measurements of the building, occupancy measurements of the building, or a scheduled occupancy level of the building; or
   an outdoor air pollution mode that includes one or more outdoor air pollution mode parameters that cause the one or more pieces of building equipment to reduce ventilation in the building in response to an outdoor air pollution level exceeding a particular level.

9. The building system of claim 6, wherein the plurality of operating modes include one or more emergency environmental control mode that include at least one of:
   a flush mode that includes one or more flush mode parameters that cause the one or more pieces of building equipment to increase ventilation of the building before a beginning of an occupancy period of the building to remove the infectious disease from the building;
   a thermal flush mode that includes one or more thermal flush mode parameters that cause the one or more pieces of building equipment to increase the ventilation of the building, increase a humidity level of the building, and increase a temperature of the building before the beginning of the occupancy period of the building to perform at least one of destroying the infectious disease within the building or removing the infectious disease from the building; or
   an increased ventilation mode that includes one or more increased ventilation mode parameters that cause the one or more pieces of building equipment to increase the ventilation of the building during the occupancy period to remove the infectious disease from the building.

10. The building system of claim 6, wherein the plurality of operating modes include one or more emergency environmental control modes that include at least one of:
   a pandemic pressurization room mode that includes one or more pandemic pressurization room mode parameters that cause the one or more pieces of building equipment to control a pressure level of the building space to be at a negative pressure compared to another building space to prevent the infectious disease from escaping the building space;
   a shutdown cross contamination mode that includes one or more shutdown cross contamination mode parameters that cause the one or more pieces of building equipment to shutdown to avoid cross contamination between the supply air and a return air to prevent the infectious disease present in the return air from entering the supply air; or
   an emergency ventilation shut off mode including one or more emergency ventilation shut off mode parameters that cause the one or more pieces of building equipment to stop ventilation of the building in response to an outdoor air quality emergency.

11. The building system of claim 6, wherein the plurality of operating modes include a disinfectant light mode;
   wherein the one or more pieces of building equipment include a disinfectant light source located in the building space and an occupancy sensor located in the building space;
   wherein the disinfectant light mode defines one or more parameters that causes the disinfectant light source to generate disinfectant light to destroy the infectious disease within the building space in response to a determination that the building space is unoccupied based on the occupancy sensor.

12. The building system of claim 6, wherein the plurality of operating modes include an energy demand mode including one or more parameters that cause the one or more pieces of building equipment to reduce a power consumption of the one or more pieces of building equipment.

13. The building system of claim 1, wherein the instructions cause the one or more processors to receive the indication to update the operation of the one or more pieces of building equipment from the user device of a user.

14. The building system of claim 13, wherein the instructions cause the one or more processors to:
   generate a user interface including a plurality of elements representing a status of the plurality of operating modes, wherein the plurality of operating modes include the first operating mode and the second operating mode;
   cause a display device of the user device to display the user interface; and
   receive the indication to update the operation of the one or more pieces of building equipment from the user device based on a user interaction with at least one of the plurality of elements via the user device.

15. The building system of claim 14, wherein the user interface includes a plurality of input elements indicating parameters for each of the plurality of operating modes.

16. The building system of claim 1, wherein at least one of the temperature of the supply air or the humidity of the supply air are controlled based on a type of the infectious disease.

17. A method of a building system of a building comprising:
   receiving, by a processing circuit, via a graphical user interface from a user device, a prioritization of a plurality of operating modes comprising a first operating mode and a second operating mode, the prioritization prioritizing the second operating mode over the first operating mode;
   operating, by the processing circuit, one or more pieces of building equipment to supply air to a building space based on the first operating mode, wherein the first operating mode defines one or more first parameters for the one or more pieces of building equipment to control one or more environmental conditions of the building space, wherein the one or more environmental conditions are at least one of a temperature of the supply air or a humidity of the supply air;
   determining, by the processing circuit, an indication to update operation of the building space based on an emergency situation occurring relating to an infectious disease and the prioritization of the second operating mode over the first operating mode; and
   responsive to a determination to update the operation of the building space based on the emergency situation and the prioritization, actively operating, by the processing circuit, the one or more pieces of building equipment based on the second operating mode, wherein the second operating mode is an emergency response mode that defines one or more second parameters for the one or more pieces of building equipment and is adapted to reconfigure the operation of the building space to control the one or more environmental conditions of the building space to reduce a probability of a spread of the infectious disease between occupants located within the building space while the occupants remain within the building space by controlling at least one of the temperature of the supply air or the humidity of the supply air to deactivate the infectious disease while maintaining a particular level of environmental comfort for the occupants.

18. The method of claim 17, wherein the emergency situation further includes at least one of polluted outdoor air, an electric grid emergency, or a weather emergency.

19. The method of claim 17, wherein operating, by the processing circuit, the one or more pieces of building equipment based on the first operating mode controls one or more conditions of the building space based on a primary use of the building space;
   wherein operating, by the processing circuit, the one or more pieces of building equipment based on the second operating mode controls the one or more environmental conditions of the building space to repurpose the building space from the primary use to a temporary alternate use.

20. The method of claim 17, further comprising:
   receiving, by the processing circuit, an indication of one or more existing building systems of the building;
   receiving, by the processing circuit, an indication of one or more operating goals of the building;
   identifying, by the processing circuit, one or more recommended building systems based on the one or more existing building systems and the indication of the one or more operating goals of the building; and
   causing, by the processing circuit, a display deice of the user device of a user to display a recommendation indicating the one or more recommended building systems.

21. The method of claim 17, further comprising implementing, by the processing circuit, a remote service configured to:
- collect data of the one or more pieces of building equipment;
- derive one or more performance insights from the data collected from the one or more pieces of building equipment; and
- cause a display deice of the user device of a user to display at least one of the data or the one or more performance insights.

22. The method of claim 17, wherein receiving, by the processing circuit, the indication to update the operation of the building space includes receiving a selection of the second operating mode from a plurality of operating modes, the plurality of operating modes including the first operating mode and the second operating mode.

23. The method of claim 17, wherein the method includes receiving, by the processing circuit, the indication to update the operation of the building space from the user device of a user.

24. The method of claim 23, further comprising:
- generating, by the processing circuit, a user interface including a plurality of elements representing a status of a plurality of operating modes, wherein the plurality of operating modes include the first operating mode and the second operating mode;
- causing, by the processing circuit, a display device of the user device to display the user interface; and
- receiving, by the processing circuit, the indication to update the operation of the building space from the user device based on a user interaction with at least one of the plurality of elements via the user device.

25. The method of claim 24, wherein the user interface includes a plurality of input elements indicating parameters for each of the plurality of operating modes.

26. A building system for a building comprising:
- one or more storage devices storing instructions thereon; and
- one or more processors configured to execute the instructions to:
  - receive, via a graphical user interface from a user device, a prioritization of a plurality of operating modes comprising a first operating mode and a second operating mode, the prioritization prioritizing the second operating mode over the first operating mode;
  - operate one or more pieces of building equipment to supply air to a building space based on the first operating mode, wherein the first operating mode defines one or more first parameters for the one or more pieces of building equipment to control one or more environmental conditions of the building space, wherein the one or more environmental conditions are at least one of a temperature of the supply air, a humidity of the supply air, or a mixture of indoor and outdoor air of the supply air;
  - determine to update operation of the building space based on an infectious disease and the prioritization of the second operating mode over the first operating mode; and
  - responsive to a determination to update the operation of the building space based on the infectious disease and the prioritization, actively operate the one or more pieces of building equipment based on the second operating mode, wherein the second operating mode is an emergency response mode that defines one or more second parameters for the one or more pieces of building equipment to control the one or more environmental conditions of the building space to reduce a probability of a spread of the infectious disease between occupants located within the building space while the occupants remain within the building space and are exposed to the supply air by controlling at least one of the temperature of the supply air, the humidity of the supply air, or the mixture of indoor and outdoor air of the supply air to deactivate the infectious disease or remove the infectious disease from the building space while maintaining a particular level of environmental comfort for the occupants.

27. The building system of claim 26, wherein the one or more pieces of building equipment includes first building equipment of a first building domain and second building equipment of a second building domain;
- wherein the instructions cause the one or more processors to operate the first building equipment based on the one or more first parameters defined by the first operating mode and operate the second building equipment based on the one or more second parameters defined by the first operating mode;
- wherein the instructions cause the one or more processors to operate the first building equipment based on one or more third parameters defined by the second operating mode and operate the second building equipment based on one or more fourth parameters defined by the second operating mode.

* * * * *